United States Patent [19]

Forney, Jr. et al.

[11] Patent Number: 5,150,381
[45] Date of Patent: Sep. 22, 1992

[54] TRELLIS SHAPING FOR MODULATION SYSTEMS

[75] Inventors: G. David Forney, Jr., Cambridge; Vedat M. Eyuboglu, Boston, both of Mass.

[73] Assignee: Codex Corporation, Mansfield, Mass.

[21] Appl. No.: 421,610

[22] Filed: Oct. 13, 1989

Related U.S. Application Data

[63] Continuation-in-part of Ser. No. 312,254, Feb. 16, 1989, abandoned.

[51] Int. Cl.$^5$ .................. H04L 5/12; H04L 25/49
[52] U.S. Cl. ........................ 375/39; 371/43; 375/60
[58] Field of Search ............. 375/24, 39, 41, 42, 375/60, 51, 8, 101; 371/43; 332/103, 120

[56] References Cited

U.S. PATENT DOCUMENTS

| | | | |
|---|---|---|---|
| 4,581,601 | 4/1986 | Calderbank et al. | 340/347 |
| 4,586,182 | 4/1986 | Gallager | 375/39 X |
| 4,755,998 | 7/1988 | Gallager | 371/30 |
| 4,807,253 | 2/1989 | Hagenauer et al. | 375/37 |
| 4,873,701 | 10/1989 | Tretter | 375/27 |
| 4,888,779 | 12/1989 | Karabed et al. | 371/43 |
| 4,894,844 | 1/1990 | Forney, Jr. | 375/42 |
| 4,959,842 | 9/1990 | Forney, Jr. | 375/39 |

FOREIGN PATENT DOCUMENTS

| | | |
|---|---|---|
| 0297375 | 6/1988 | European Pat. Off. |
| 0351186 | 7/1989 | European Pat. Off. |
| 88/04500 | 6/1988 | PCT Int'l Appl. |

OTHER PUBLICATIONS

Calderbank et al., "An Eight-Dimensional Trellis Code", Proceedings of the IEEE, May 1986, pp. 757-759.
Forney, "Coset Codes—Part I: Introduction and Geometrical Classification", IEEE Transactions on Information Theory, vol. 34, No. 5, Sep. 1988, pp. 1123-1151.
Ungerboeck, "Channel Coding with Multilevel/Phase Signals", IEEE Trans. on Information Theory, vol. IT-28, No. 1, Jan. 1982, pp. 55-67.
Conway et al., "A Fast Encoding Method for Lattice Codes and Quantizers", IEEE Trans. on Information Theory, vol. IT-29, No. 6, Nov. 1983, pp. 820-824.
Calderbank et al., "New Trellis Codes Based on Lattices and Cosets", IEEE Trans. on Information Theory, vol. IT-33, No. 2, Mar. 1987, pp. 177-195.
Wei, "Trellis-Coded Modulation with Multidimensional Constellations", IEEE Trans. on Information Theory, vol. IT-33, No. 4, Jul. 1987, pp. 483-501.
Calderbank et al., "Nonequiprobable Signaling on the Gaussian Channel", IEEE Trans. on Information Theory, vol. 36, No. 4, Jul. 1990, pp. 726-740.
Forney, "The Viterbi Algorithm", Proceedings of the IEEE, vol. 61, No. 3, Mar. 1973, pp. 268-278.
Marcellin et al., "Trellis Coded Quantization of Memoryless and Gauss-Markov Sources", pp. 1-46.

(List continued on next page.)

Primary Examiner—Benedict V. Safourek
Assistant Examiner—Tesfaldet Bocure
Attorney, Agent, or Firm—Fish & Richardson

[57] ABSTRACT

A digital data sequence is mapped into a signal point sequence for transmission, by selecting the signal point sequence from a subset of all possible signal point sequences based on the digital data sequence, all possible signal point sequences in the subset lying in a fundamental region of a trellis code, the fundamental region being other than a simple Cartesian product of finite-dimensional regions. In another aspect, a digital data sequence is mapped into a sequence of signal points for transmission, by specifying a class of possible sequences based on the digital data, and selecting the signal point sequence from the class, the selection being based on the respective average powers of the possible sequences of the class, the selection being based on not only a fixed-length block of the digital data.

75 Claims, 22 Drawing Sheets

OTHER PUBLICATIONS

Forney et al., "Multidimensional Constellations—Part I: Introduction, Figures of Merit, and Generalized Cross Constellations", IEEE Journal on Selected Areas in Communications, vol. 7, No. 6, Aug. 1989, pp. 877–892.

Calderbank et al., "An Eight-Dimensional Trellis Code", Proceedings of the IEEE, May 1986.

Forney et al., "Efficient Modulation for Band-Limited Channels", IEEE Journal on Selected Areas in Communications, vol. SAC-2, No. 5, Sep. 1984, pp. 632–647.

Sloane, "Tables of Sphere Packings and Spherical Codes", IEEE Trans. on Information Theory, vol. IT-27, No. 3, May 1981, pp. 327–338.

Eyuboglu et al., "Trellis Precoding: Combined Coding, Precoding and Shaping for Intersymbol Interference Channels", IEEE Trans. on Information Theory, Jun. 1990.

Forney, "Convolutional Codes I: Algebraic Structure", IEEE Trans. on Information Theory, vol. IT-16, No. 6, Nov. 1970, pp. 720–738.

Forney, "Structural Analysis of Convolutional Codes Via Dual Codes", IEEE Trans. on Information Theory, vol. IT-19, No. 4, Jul. 1973, pp. 512–518.

Conway et al., "A Lower Bound on the Average Error of Vector Quantizers", IEEE Trans. on Information Theory, vol. IT-31, No. 1, Jan. 1985, pp. 106–109.

Forney et al., "Multidimensional Constellations II: Voronoi Constellations", Mar. 1988. pp. 1–64.2.

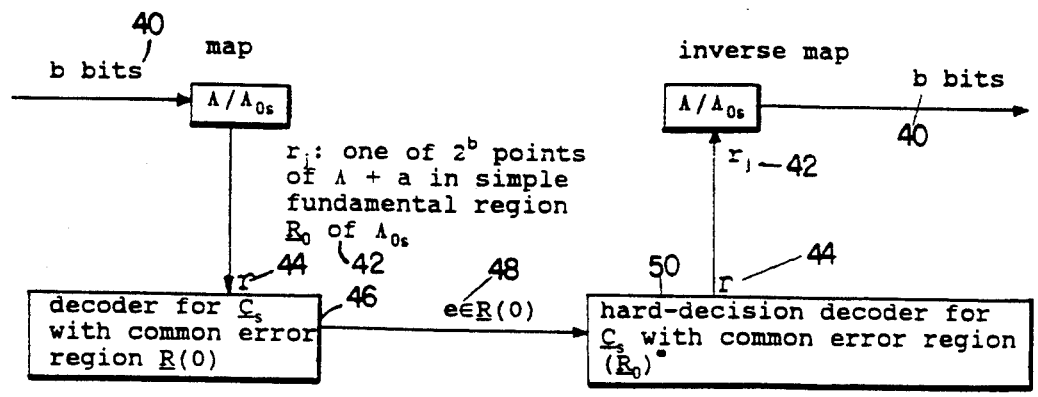
FIG. 4
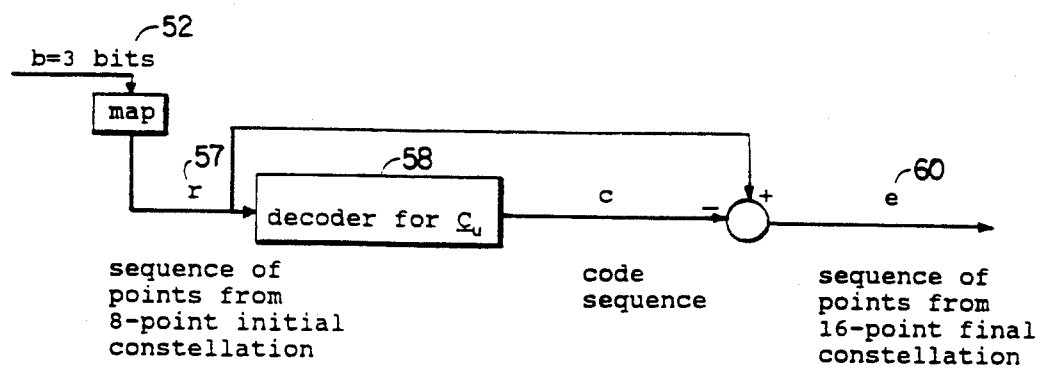
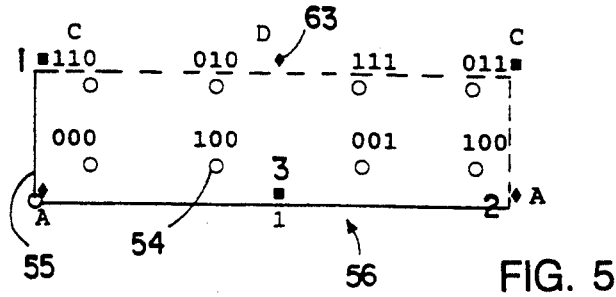
FIG. 5

FIG. 5A
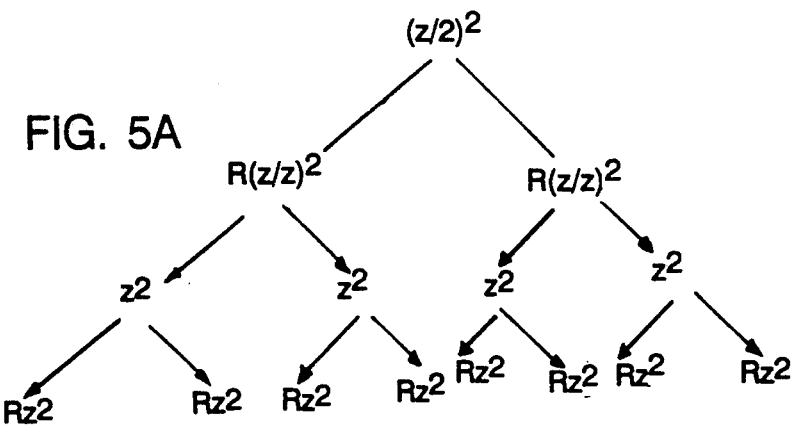
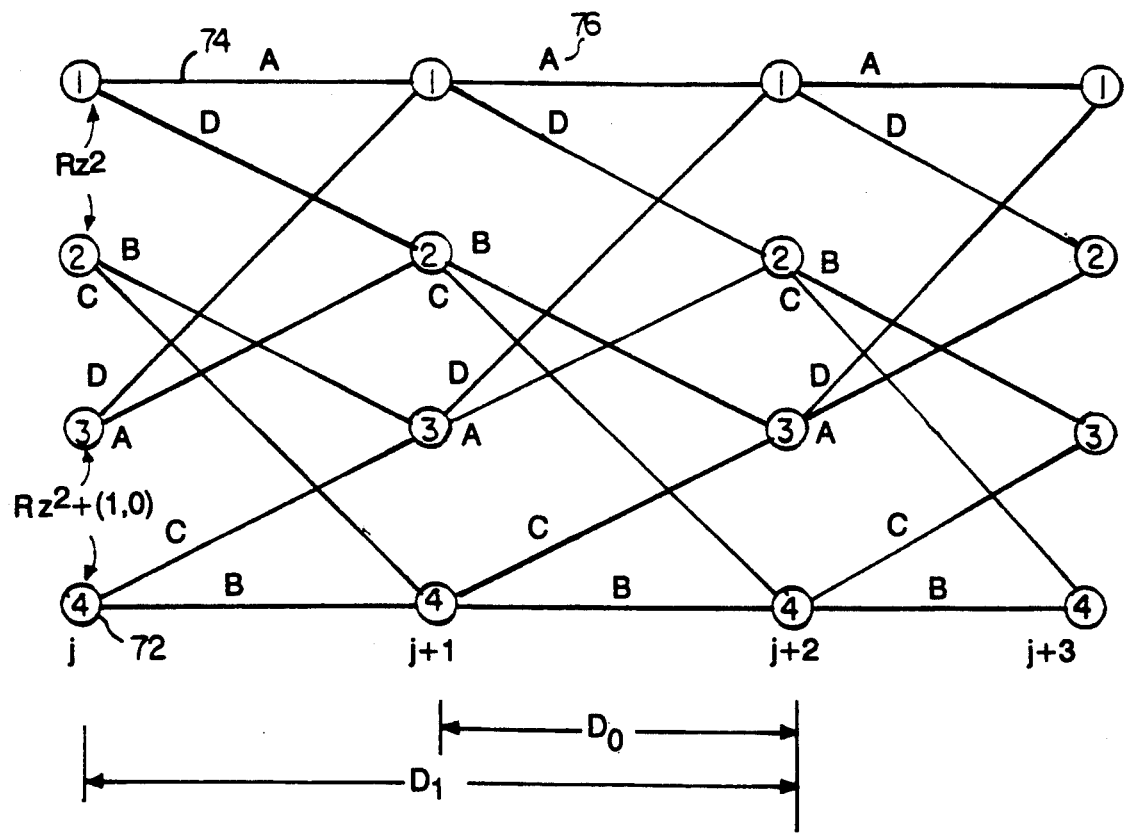
FIG. 5B $$G_c = \begin{bmatrix} 1+D & 1 & D & 0 \\ 1+D+D^2 & D^2 & 1 & 0 \\ 1 & 1 & 1 & 1 \end{bmatrix} \quad H_c = \begin{bmatrix} 1+D^3 & 1+D^2+D^3 & 1+D+D^3 & 1+D \\ \end{bmatrix} \quad 1+D+D^2+D^3$$

$$(H_c^{-1})^T = 1+D \quad D \quad 0 \quad 0 \qquad (G_c^{-1})^T = \begin{bmatrix} D & 1+D & D & 1+D \\ D^2 & D+D^2 & 1+D^2 & 1+D+D^2 \\ 0 & 0 & 0 & 0 \end{bmatrix}$$

FIG. 14

$$G_c = \begin{bmatrix} 1+D+D^2 & 1 & D^2 & 0 \\ 1+D+D^2 & D+D^2 & 1 & 0 \\ 1 & 1 & 1 & 1 \end{bmatrix} \quad H_c = 1+D^3+D^4 \quad 1+D^2+D^3 \quad 1+D^3+D^4 \quad 1+D^2+D^4 \quad 1+D+D^2+D^4$$

$$(H_c^{-1})^T \; 1+D \quad 0 \quad D \quad 0 \qquad (G_c^{-1})^T = \begin{bmatrix} D^2+D^3 & D & D^3 & D+D^3 & 1+D+D^3 \\ D & 0 & 1+D & 1+D & 1+D \\ 0 & 0 & 0 & 0 & 1 \end{bmatrix}$$

FIG. 15

CODE SYMBOLS

TRELLIS SHAPING FOR MODULATION SYSTEMS

BACKGROUND OF THE INVENTION

This application is a continuation-in-part of Forney et al., U.S. patent application Ser. No. 312,254, filed Feb. 16, 1989, now abandoned.

This invention relates to modulation systems for sending digital data via a channel.

In traditional uncoded modulation systems, to send n bits per N signaling dimensions, a $2^n$-point N-dimensional signal constellation is used. Each group of n bits is independently mapped into one of the $2^n$ signal points. The selected signal point is then transmitted over a channel, e.g., by N uses of a pulse amplitude modulation (PAM) transmitter, or by N/2 uses of a quadrature amplitude modulation (QAM) transmitter. The signal points in the constellation may be selected and organized to achieve a good signal to noise ratio (SNR) efficiency. The key parameters that determine SNR efficiency are the minimum squared distance between the constellation signal points and their average power.

In coded modulation systems, by contrast, the digital data are encoded as a sequence drawn from a set of allowable sequences of signal points. The allowable sequences are selected in such a way that the minimum squared distance between allowable sequences in the code is greater than the minimum squared distance between the components of the sequences, namely the signal points. This requires that not all possible sequences be allowable, which in turn means that the number of signal points in the constellation must be expanded. Expansion of the constellation leads to some increase in the average power required to send n bits per N dimensions, but the increase in minimum squared sequence distance outweighs the increase in average power and a net 'coding gain' is achieved.

There are two basic types of coded modulation systems, block and trellis.

In block coded systems, the code sequences are finite length blocks of signal points and are often called code words. Within a given block, the signal points depend on one another, but there is no interdependence between signal points of different blocks. Lattice codes (in which a code word is a point on a translate of a multidimensional lattice) may be regarded as block coded systems, if the code words are construed as defining sequences of signal points.

In trellis-coded modulation (Ungerboeck, "Channel Coding with Multilevel/Phase Signals," IEEE Transactions on Information Theory, Vol. IT-28, No. 1, pp. 56–67, January, 1982), on the other hand, code sequences of signal points are in principle infinitely long, and there are signal point interdependencies that extend over the whole sequence.

Typically, coded modulation systems have been designed jointly with an associated signal constellation or family of constellations. The constellation itself generally has been of the block type in which the subset of allowable sequences has been the subset of all sequences in the code whose N-dimensional signal points lay in some finite (e.g., $2^{n+r}$-point) N-dimensional signal constellation. Thus, the constellation was the same in each N dimensions and not dependent on signal points outside those N dimensions.

It has been recognized that such constellations can achieve improved SNR efficiency if they are shaped to be as nearly spherical as possible.

Forney, U.S. patent application Ser. No. 062,497, filed Jun. 12, 1987, assigned to the same assignee as this application and incorporated herein by reference, describes signal constellations which comprise points of a lattice (or a coset of a lattice) that lie within a so-called Voronoi region of a sublattice of the original lattice. A Voronoi region of a lattice is the set of points that are as close to the origin as to any other lattice point. Thus, the use of a Voronoi region of a lattice to define the constellation boundary achieves the advantages of a quasi-spherical constellation. Such Voronoi constellations are also discussed in Conway and Sloane, "A Fast Encoding Method for Lattice Codes and Quantizers," IEEE Trans. Inform. Theory, Vol. IT-29, pp. 820–824, 1983, and Forney, U.S. patent application Ser. No. 181,203, filed Apr. 13, 1988 (which uses some points of the Voronoi constellation to support a secondary channel).

SUMMARY OF THE INVENTION

The invention concerns so-called trellis shaping modulation systems that achieve improved performance. In some aspects of the invention, instead of mapping a digital data sequence into a sequence of signal points drawn from a signal point constellation as described above, the data sequence is mapped into a sequence of signal points drawn from a so-called sequence space of available sequences that is not merely the Cartesian product of a single N-dimensional constellation used repeatedly in each N dimensions. The region occupied by the available sequences in sequence space is shaped to minimize the required power, e.g., the region may consist of a fundamental region of a trellis code, and more particularly, an approximation to the Voronoi region of a trellis code (where the trellis code is not just a repeated lattice code).

In general, in one aspect, the invention features mapping a digital data sequence into a signal point sequence for transmission, by selecting the signal point sequence from a subset of all possible signal point sequences based on the digital data sequence, all possible signal point sequences in the subset lying in a fundamental region of a trellis code, the fundamental region being other than a simple Cartesian product of finite dimensional regions.

In general, in another aspect, the invention features mapping a digital data sequence into a sequence of signal points for transmission, by specifying a class of possible sequences based on the digital data, and selecting the signal point sequence from the class, the selection being based on the respective average powers of the possible sequences of the class, the selection being based on not only a fixed-length block of the digital data.

Preferred embodiments of the invention include the following features. The class corresponds to a set of sequences specified by a finite-state trellis diagram of unbounded length. The selection is performed by applying a search procedure to the class, e.g., a search procedure of the Viterbi algorithm type. The set of all possible sequences that could be selected from the class lies within a fundamental region of a trellis code, the fundamental region being other than a simple Cartesian product of finite-dimensional regions. The possible signal point sequences are code sequences from a translate of a second code, the second code being of the trellis or lattice type. The fundamental region comprises approximately a Voronoi region of the trellis code. More generally, the fundamental region comprises the set of possible signal point sequences that are decoded to the zero sequence in the trellis code by a decoder for the code. For example, the fundamental region comprises the set of possible signal point sequences that are decoded to the zero sequence in the trellis code by an approximation to a minimum distance decoder for the code having delay M, M greater than or equal to 1. The fundamental region comprises the set of possible signal point sequences that are decoded to a common error region by a fair, exhaustive decoder for the trellis code.

The digital data sequence is mapped into an initial signal point sequence belonging to and representing a congruence class of the trellis code, and a signal point sequence is chosen which belongs to the congruence class and has no greater average power than the initial signal point sequence. The digital data sequence is mapped into a sequence of signal points belonging to an initial constellation comprising points lying within a fundamental region of a time-zero lattice of the trellis code. The mapping includes applying a portion of the elements of the digital data sequence to a coset representative generator for forming a larger number of digital elements representing a coset representative sequence. The coset representative generator multiplies a portion of the elements of the digital data sequence by a coset representative generator matrix $(H^{-1})^T$ which is inverse to a syndrome-former matrix $H^T$ for the code.

The digital data sequence is recovered from a possibly noise-corrupted version of the signal point sequence, by decoding the signal point sequence to a sequence of estimated digital elements and forming a syndrome of fewer digital elements based on a portion of the estimated digital elements using a feedback-free syndrome former $H^T$.

In general, in another aspect, the invention features mapping a digital data sequence into a sequence of signal points to be sent, comprising determining a class of possible sequences from which to select the sequence to be sent, based at least on digital data appearing in the digital data sequence up to a time j, and for every time j, selecting the sequence to be sent from the class of possible sequences based on digital data appearing in the sequence after time j.

Preferred embodiments include the following features. The mapping of each element is done independently of the mapping of any other element. Decoding the sequence of sent signal points is done at time j based on the sent points only up to time j. The trellis code is either a linear trellis code or a non-linear trellis code. If linear, the trellis code may be a 4-state Ungerboeck code or a dual Wei code. The trellis code is based on a partition of binary lattices, or in some cases a partition of ternary or quaternary lattices.

Each signal point in the sequence is selected from an N dimensional constellation divided into regions containing predetermined possible signal points, the regions to which successive signal points in the sequence belong being determined in a manner tending to minimize the energy required to transmit the signal points.

In general, in another aspect, the regions are not all fundamental regions of a lattice.

At least some of the regions have different average powers. The regions are N-dimensional and are bounded approximately by N-spheres centered on the origin of the constellation. N=2 and there are four regions. The constellation comprises a two-dimensional constellation of signal points lying on the half-integer rid $Z^2+(\frac{1}{2},\frac{1}{2})$. The regions are organized so that rotation of a signal point by 0, 90, 180, or 270 degrees produces another signal point in the same region. The regions have equal numbers of signal points.

The regions from which successive signal points in the signal point sequence are drawn based upon the average energies of signal points in the regions. For example, the regions may be determined by decoding a sequence of values derived from the digital data sequence using a decoder for a convolutional code. Each region includes signal points belonging to different cosets of a lattice and each region has an equal number of signal points belonging to each respective coset. The coset from which each signal point is to be drawn is based on a coset representative sequence generated in accordance with a convolutional code. The convolutional code comprises code sequences comprising symbols from a label alphabet, and the sequence of values is generated by passing a sequence of bits of the digital data sequence through a coset representative generator to produce a coset representative sequence, and decoding the coset representative sequence to a minimum weight sequence of labels from the label alphabet. The decoding is by a minimum weight decoding technique, which includes assigning to a branch in a trellis corresponding to the code a weight equal to the average energy of the region of signal points corresponding to that branch of the trellis. The decoding technique comprises assigning to a branch in a trellis corresponding to the code a weight corresponding to the energy of a particular signal point within the region corresponding to that branch of the trellis.

The trellis code may be a pseudo-linear trellis code. The signal points in the sequence belong to a 2D constellation and the step of selecting the signal point sequence is constrained so that the signal points in the sequence will usually be within some radius $R_c$ of the origin of the 2D constellation. The step of choosing a signal point sequence belonging to the congruence class is further constrained so as to reduce the peak power of the signal point sequence where the peak power represents the maximum energy of the signal point sequence in some number of dimensions N. The step of choosing a signal point sequence belonging to the congruence class comprises decoding the initial signal point sequence into a final signal point sequence comprising signal points belonging to a 2D constellation, the decoding being constrained so that only final signal point sequences whose signal points usually have magnitudes no greater than some predetermined radius $R_c$ from the origin of the constellation are used.

The step of choosing a signal point sequence belonging to the congruence class comprises decoding the initial signal point sequence into a code sequence using a Viterbi algorithm, and in each recursion of the Viterbi algorithm, effecting an operation that will assure that the code sequence is an allowable sequence in the second code. The operation comprises adjusting the metrics of selected historical paths in the trellis of the Viterbi algorithm, so that none of the selected paths will become the most likely path in the next recursion of the Viterbi algorithm. The historical paths are chosen based on whether they include particular state transitions at particular locations in the trellis of the Viterbi algorithm. The operation comprises assigning a large metric to selected historical paths in the trellis. The signal point sequence is selected in a manner to ensure that the digital data sequence can be recovered from a channel-affected version of the signal point sequence which has been subjected to one of a number of predetermined phase rotations.

The step of mapping said digital data sequence into a sequence of signal points belonging to an initial constellation includes converting the data elements in the data sequence into groups of bits for selecting signal points from the initial constellation, and the groups of bits are arranged to ensure that the bits can be recovered from a channel-affected version of the transmitted sequence which has been subjected to phase rotations of one, two, or three times 90 degrees.

In general, in another aspect, the invention features a modem for transmitting and receiving digital data sequences via a channel comprising means for mapping a digital data sequence into a sequence of signal points to be sent, including a sequence selector for selecting the signal point sequence from a subset of all possible signal point sequences based on the digital data sequence, all possible signal point sequences in the subset lying in a fundamental region of a trellis code, the fundamental region being other than a simple Cartesian product of finite-dimensional regions, a modulator for sending the signal points of the sequence via the channel, a demodulator for receiving a possibly channel-affected version of the signal point sequence from the channel, and means for recovering a digital data sequence from the possibly channel-affected version of the signal point sequence.

The invention achieves large shaping gains and total gains with relatively low complexity.

Other advantages and features will become apparent from the following description of the preferred embodiment and from the claims.

DESCRIPTION OF THE PREFERRED EMBODIMENT

We first briefly describe the drawings.

FIG. 4 is a block diagram of a map from b-bit words to a transmitted sequence e, and vice versa.

FIG. 5 is a block diagram of a map using an Ungerboeck 4-state, 2D code.

FIG. 5A is a chart illustrating lattice partitioning for the map of FIG. 5.

FIG. 5B is a trellis diagram corresponding to FIG. 5.

FIGS. 14 and 15 are matrices associated with 8-state and 16-state 4D Wei codes, respectively.

Figure 16:
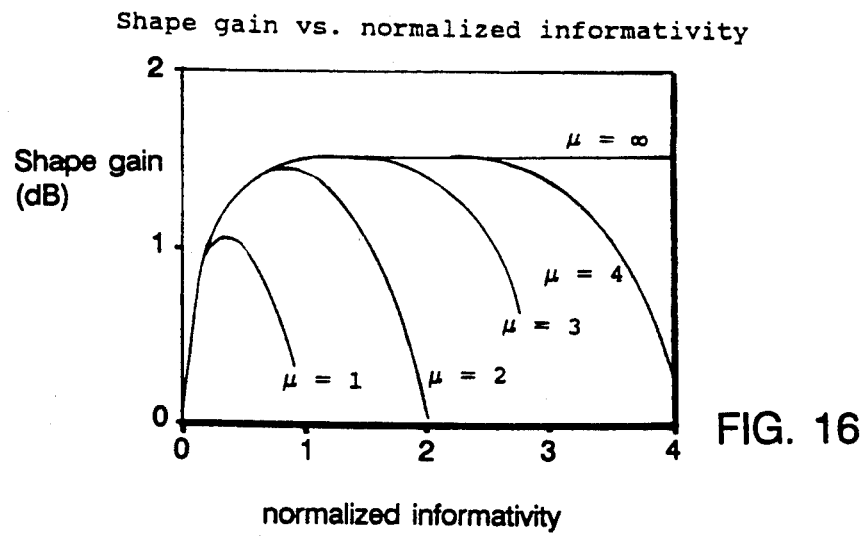

FIG. 16 is a graph of shape gain versus normalized informativity for trellis constellations.

Figure 17:
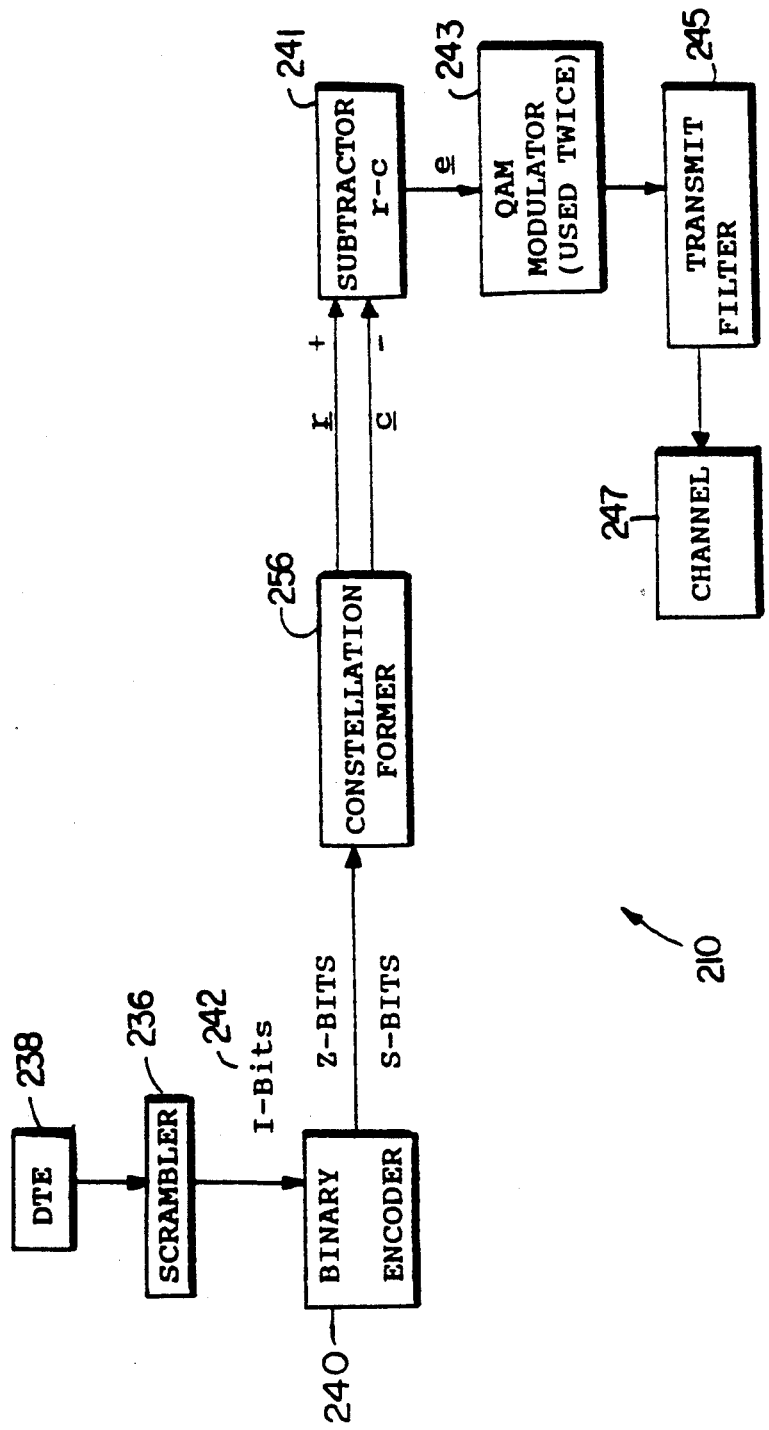

FIG. 17 is a block diagram of modem transmitter circuitry.

Figure 18:
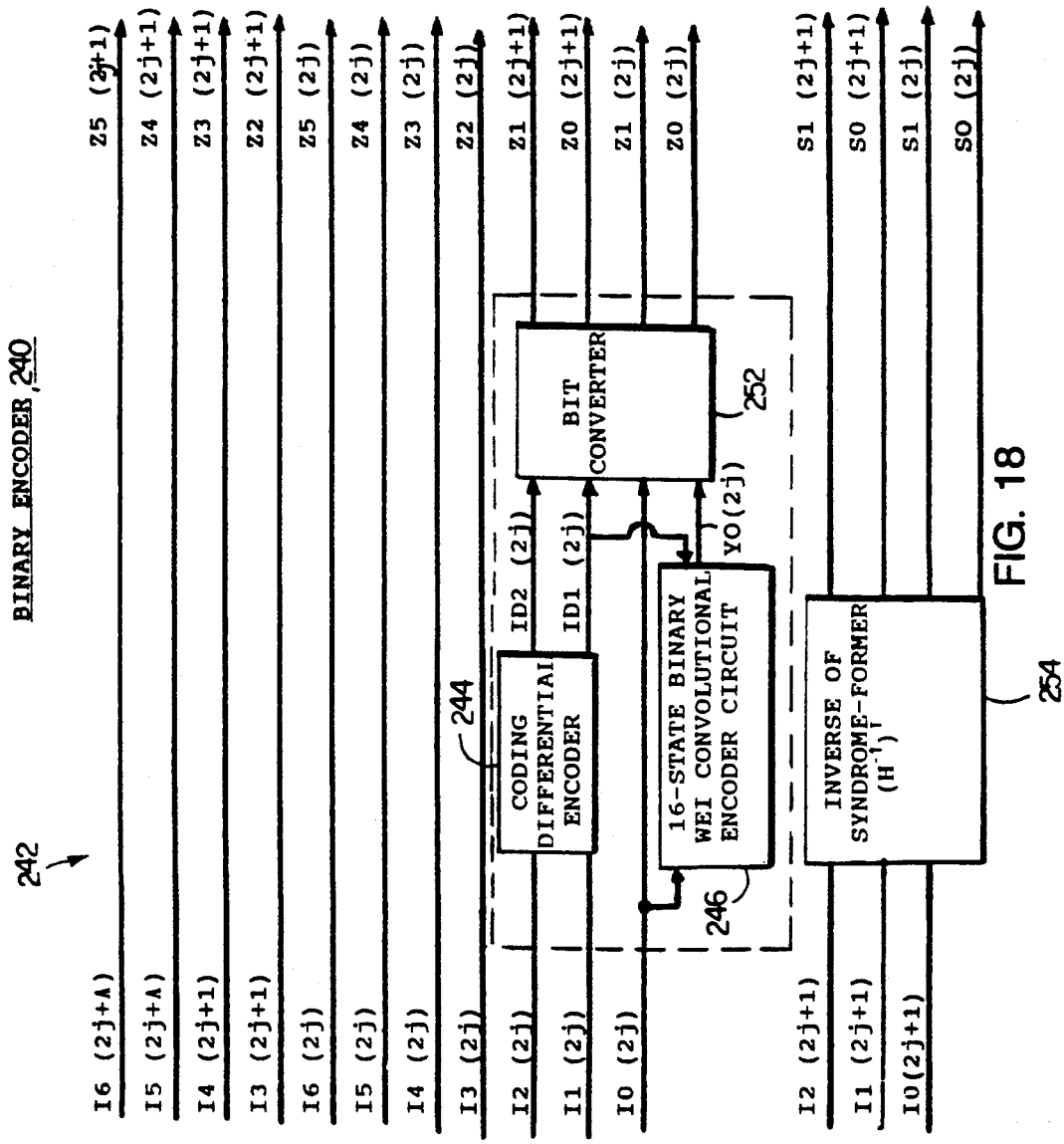

FIG. 18 is a block diagram of the binary encoder of the circuitry of FIG. 17.

Figure 19:
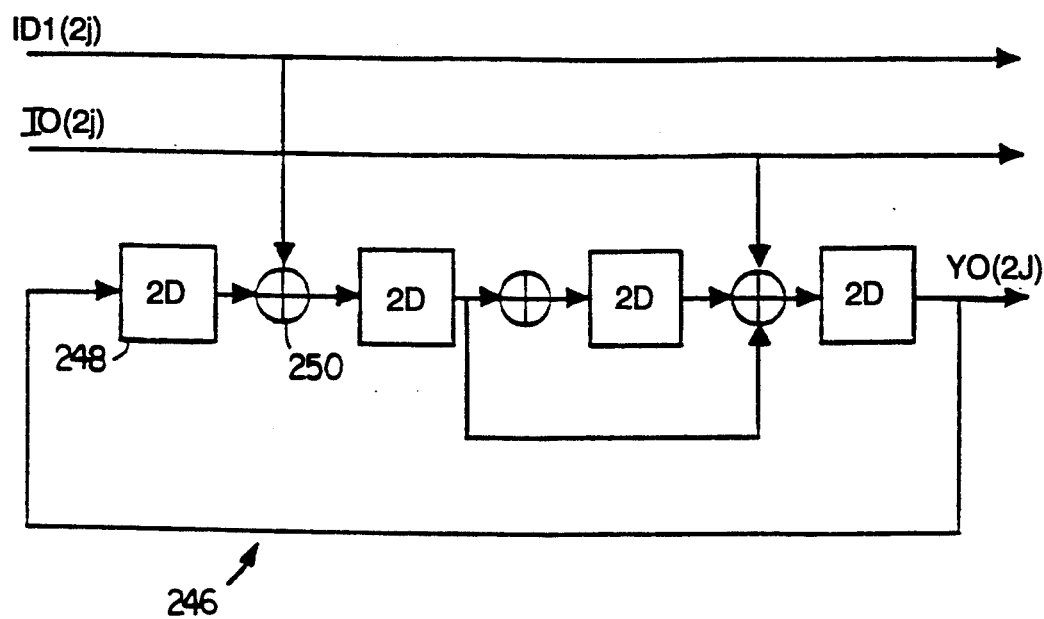

FIG. 19 is a block diagram of the 16-state binary Wei convolutional encoder of FIG. 18.

Figure 20:
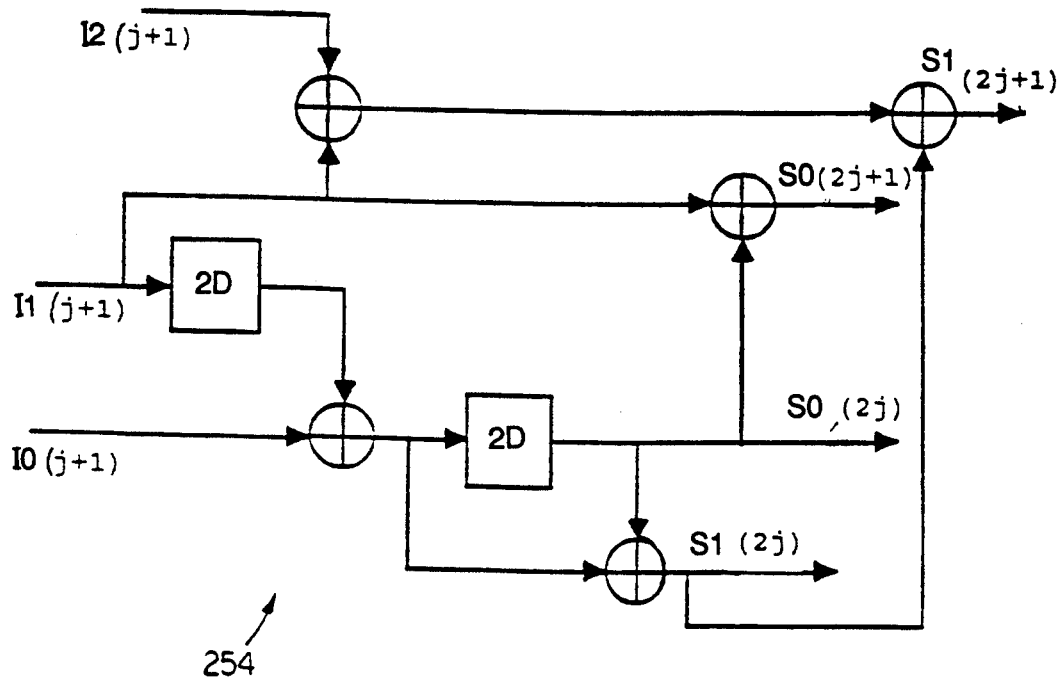

FIG. 20 is a block diagram of the syndrome former of FIG. 18.

Figure 21:
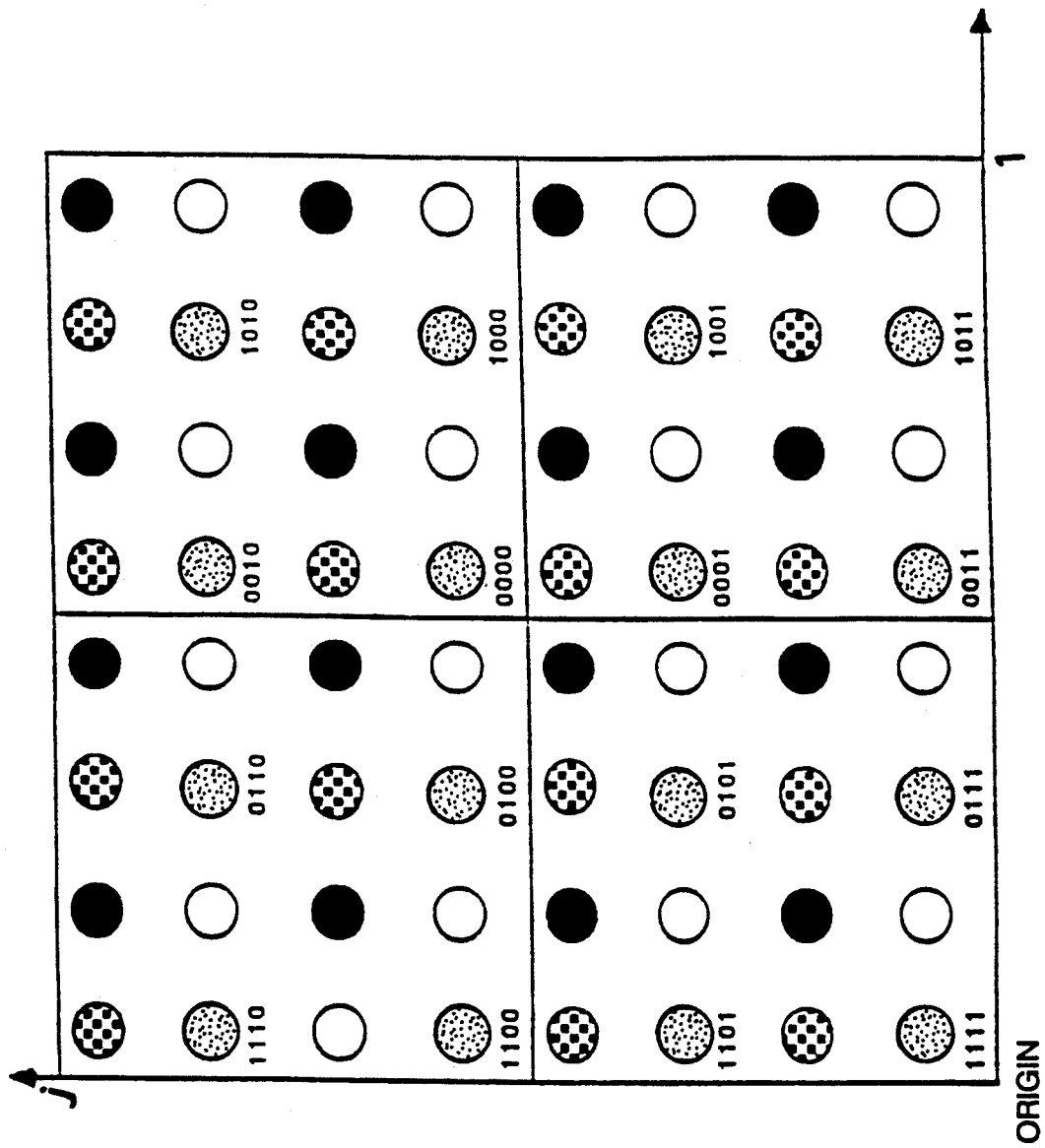

FIG. 21 is a constellation for FIG. 18.

Figure 22:
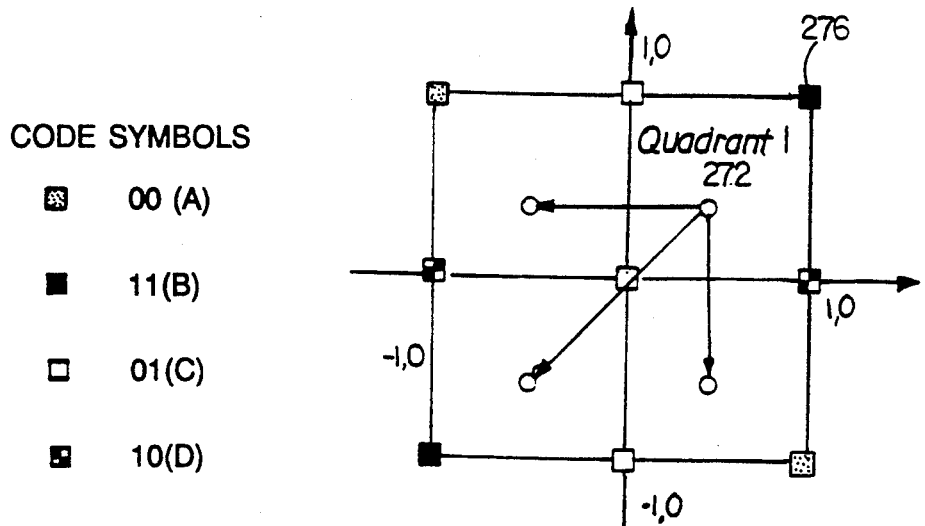

FIG. 22 is a 2D constellation for FIG. 18.

Figure 23:
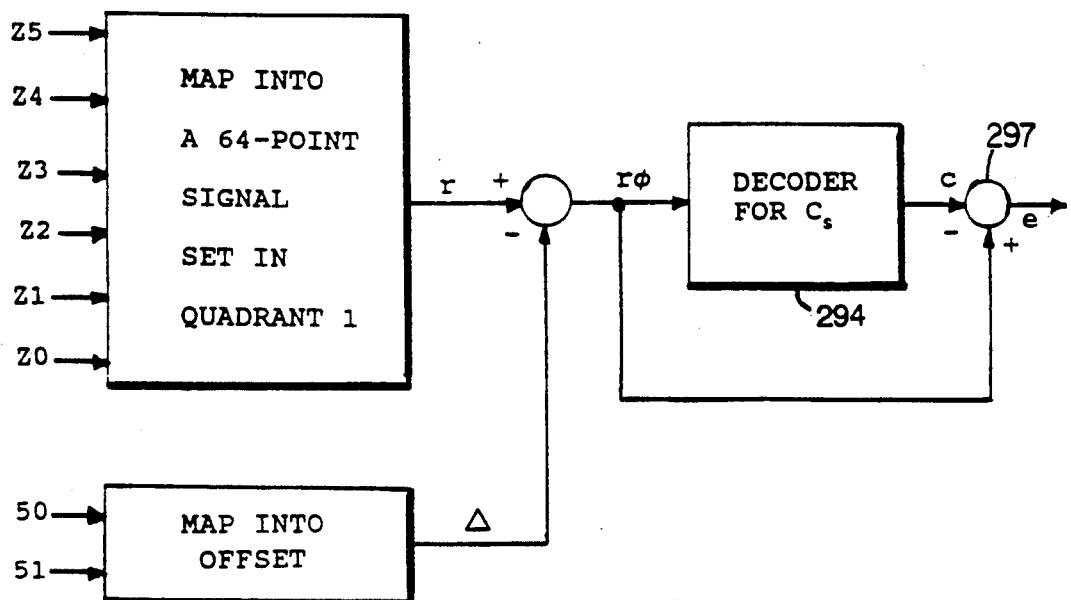

FIG. 23 is a block diagram illustrating the operation of the decoder for the shaping code.

Figure 24:
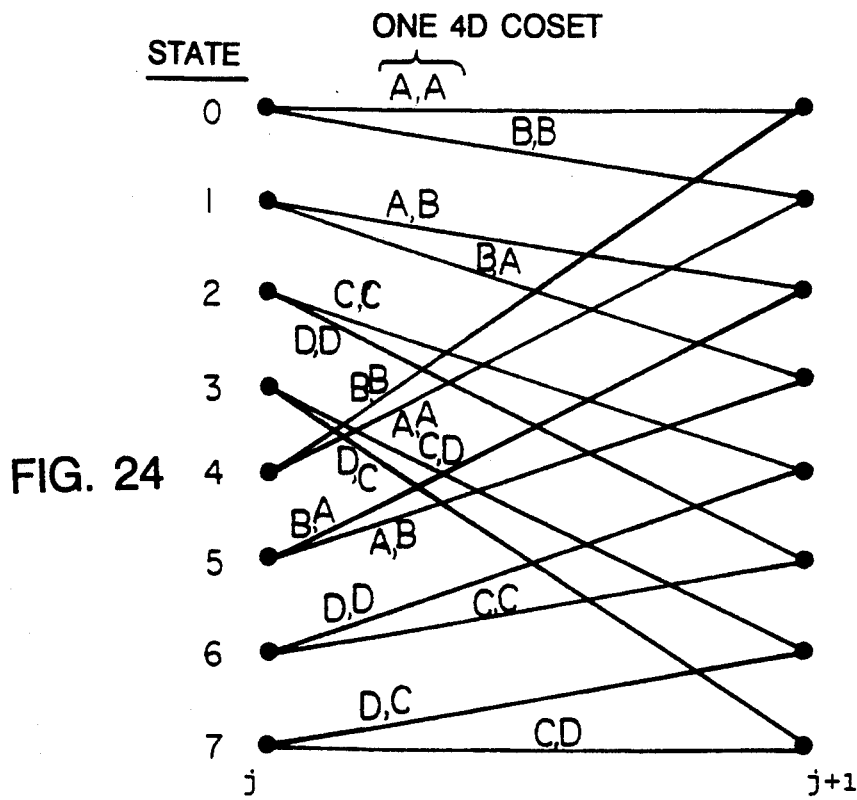

FIG. 24 is a trellis diagram for the 8-state 4D dual Wei code.

Figure 25:
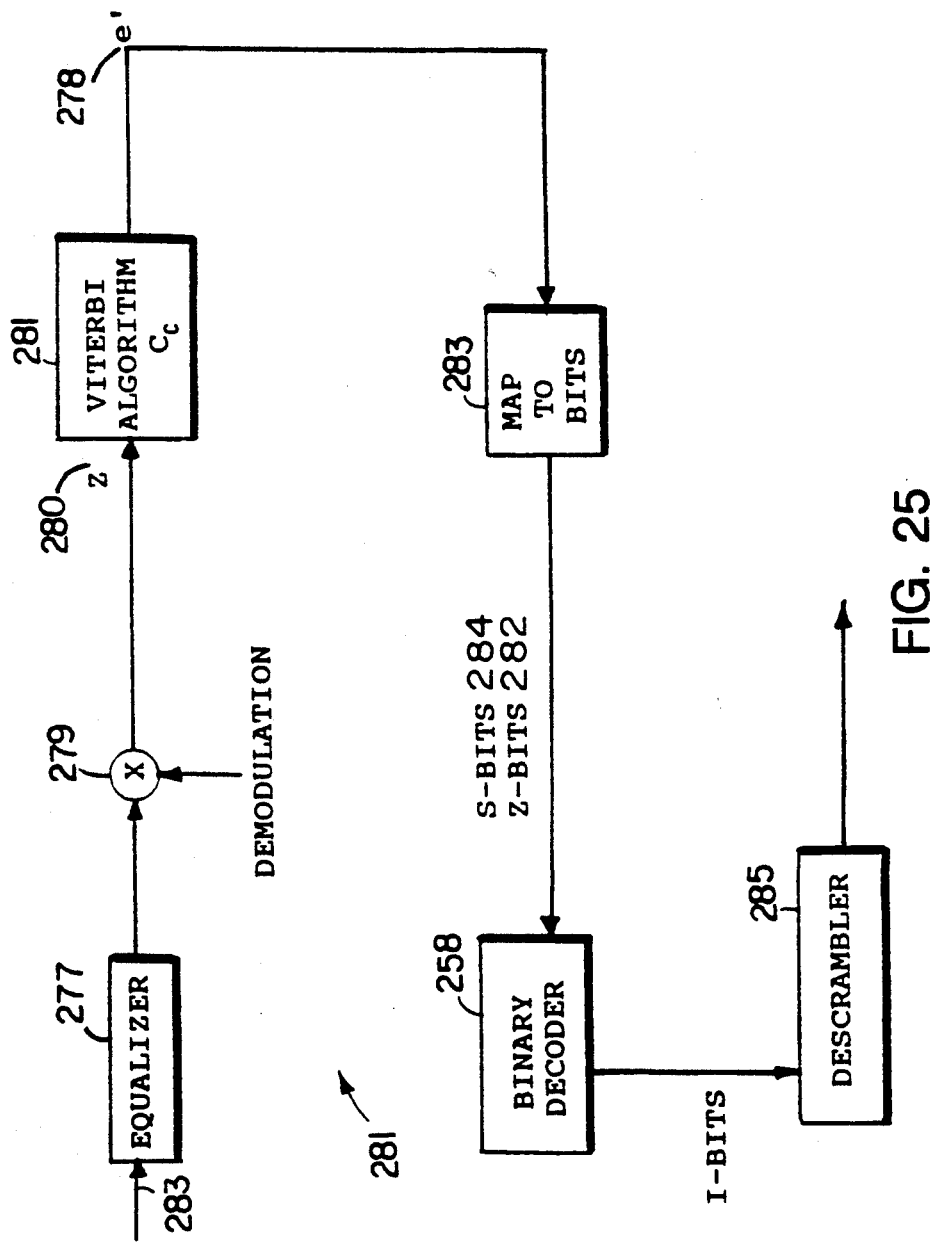

FIG. 25 is a block diagram of modem receiver circuitry.

Figure 26:
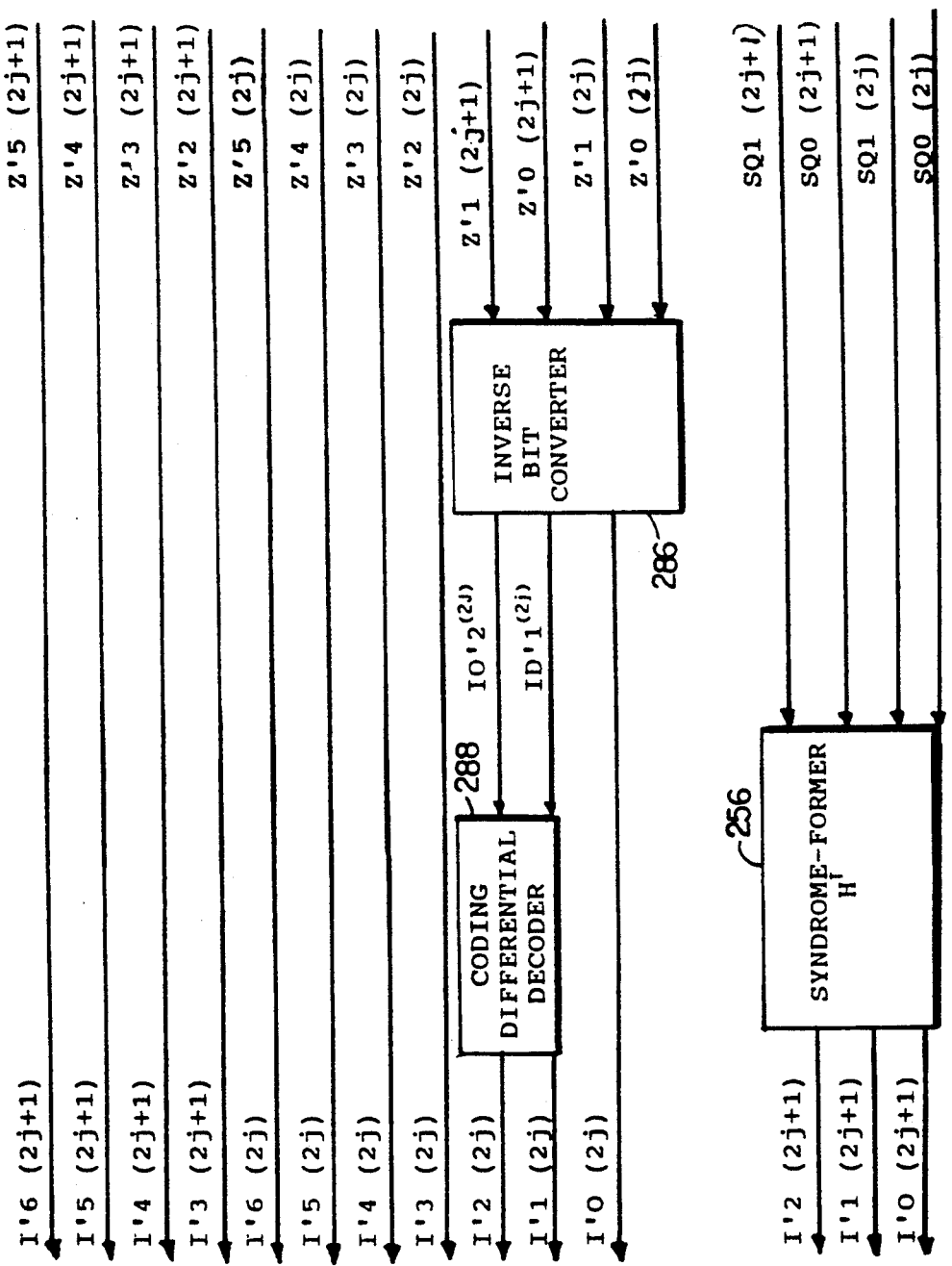

FIG. 26 is a block diagram of the binary decoder of FIG. 25.

Figure 27:
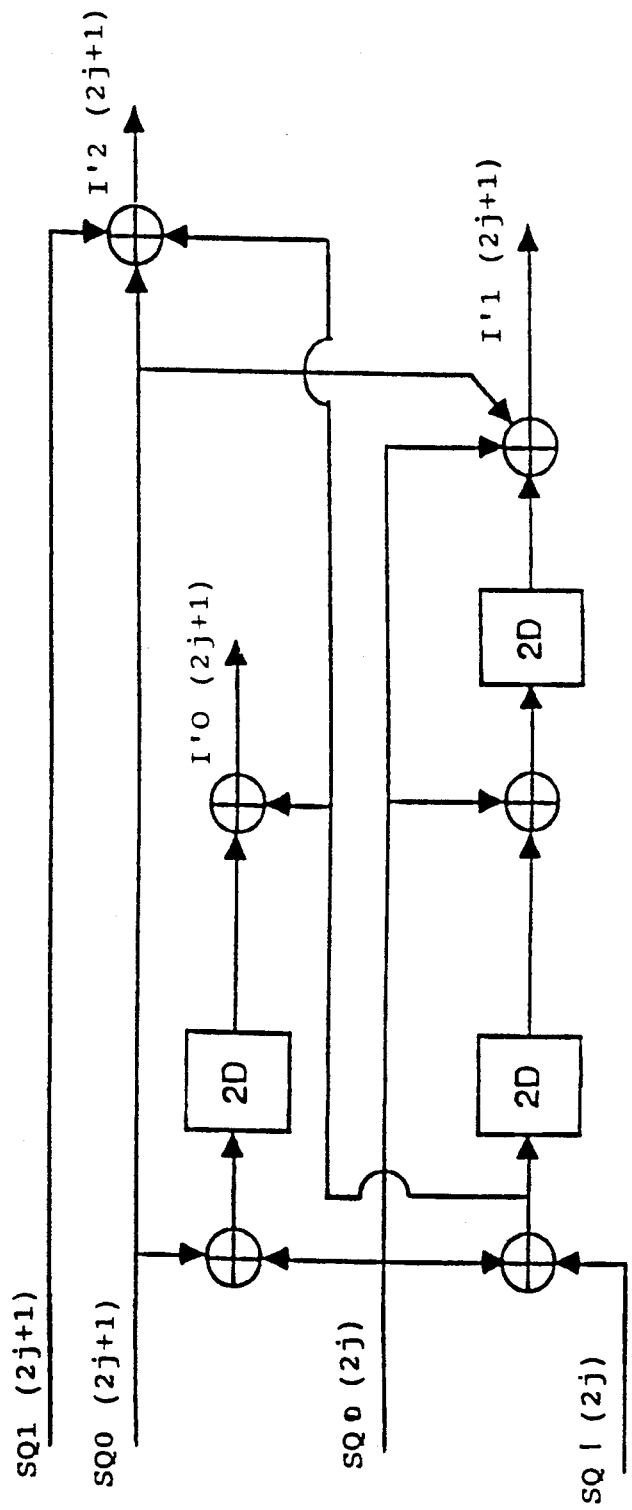

FIG. 27 is a block diagram of the syndrome former of FIG. 26.

Figures 28, 30:
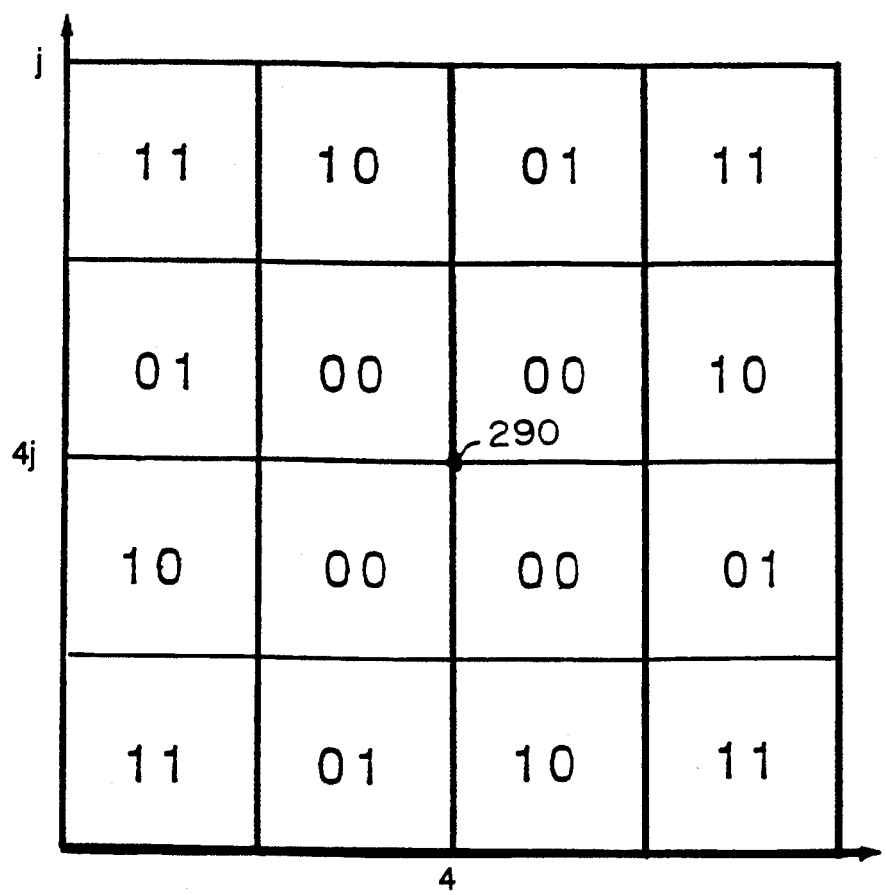

FIG. 28 illustrates quadrant partitioning.

Figure 29:
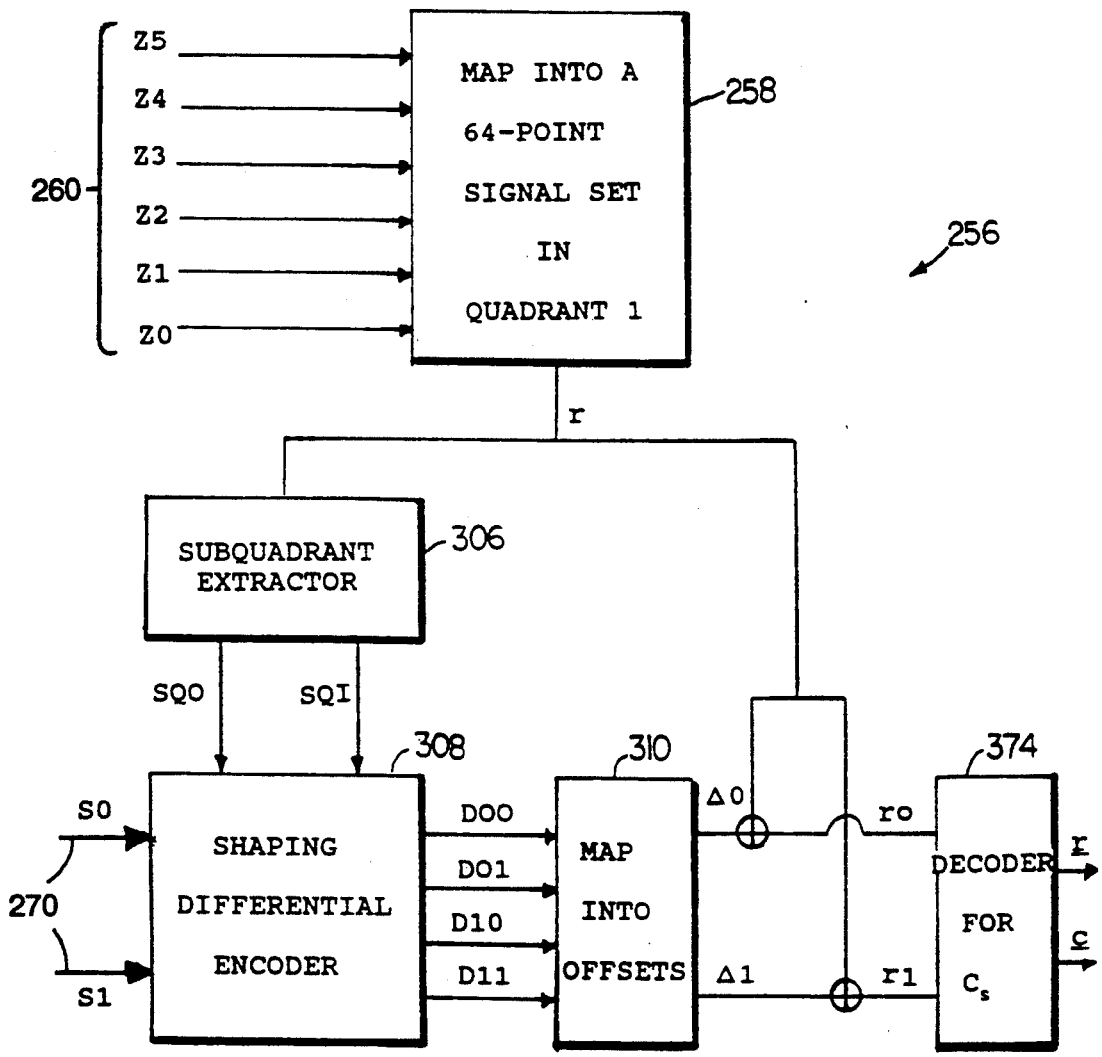

FIG. 29 is a block diagram of the constellation former of FIG. 18.

FIG. 30 illustrates a quadrant labeling scheme.

Figure 31:
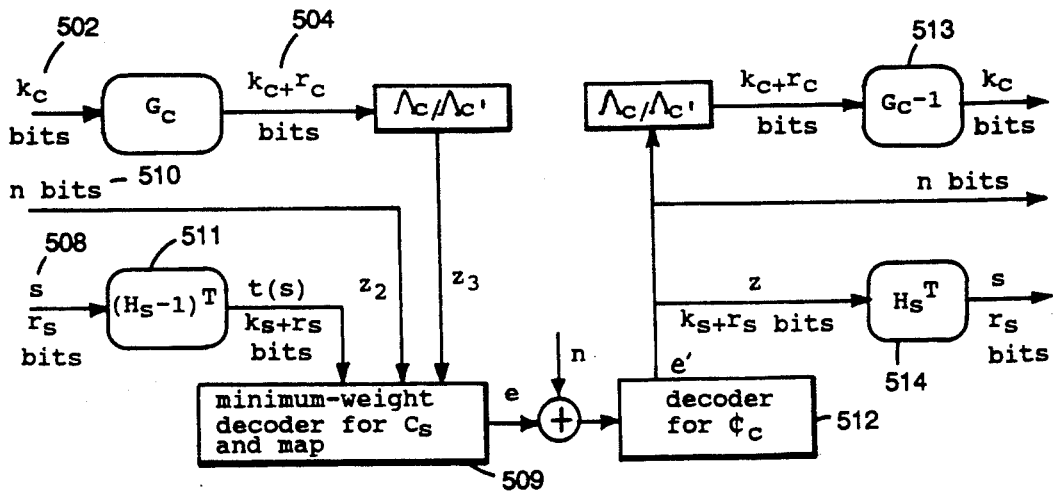

FIG. 31 is a block diagram of a modulation system using trellis shaping on regions.

Figure 32A:
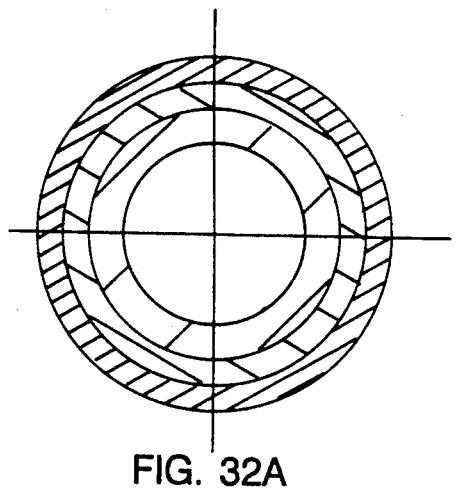

FIG. 32($a-b$) is a diagram of constellation regions with circular boundaries and boundaries defined by 256 unit squares.

Figure 33:
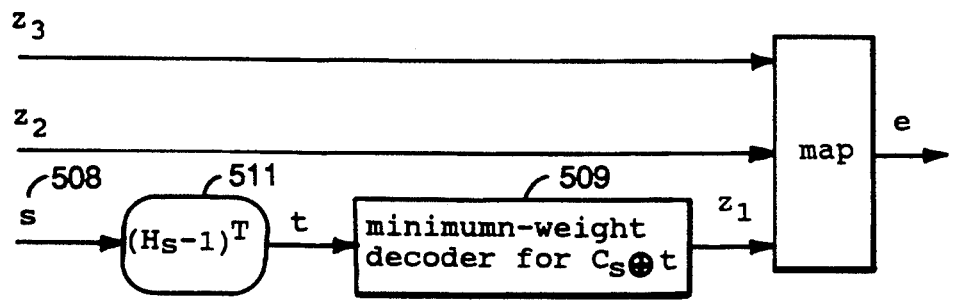

FIG. 33 is a block diagram of an encoder which weights labels based on average energy of points in a region.

Figure 34:
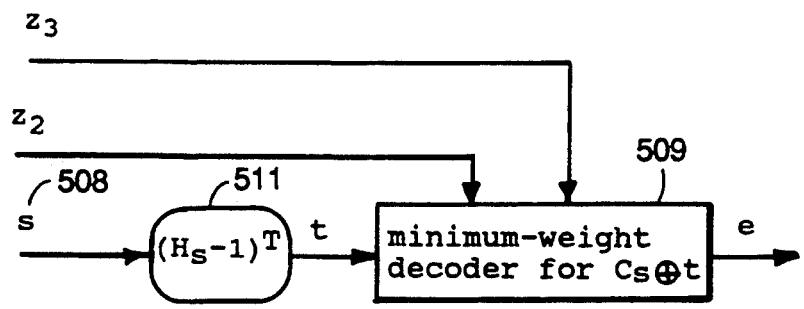

FIG. 34 is a block diagram of an encoder which weights labels based, on energies of individual points.

Figure 35:
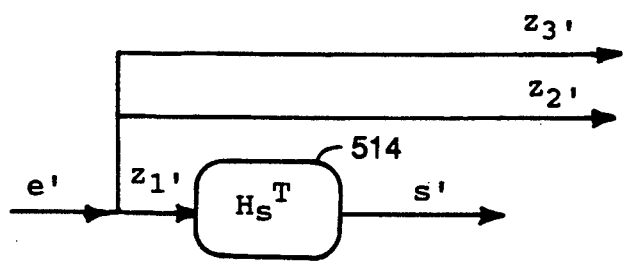

FIG. 35 is a block diagram of a receiver for use in a modulation system using trellis shaping on regions.

Figure 36:
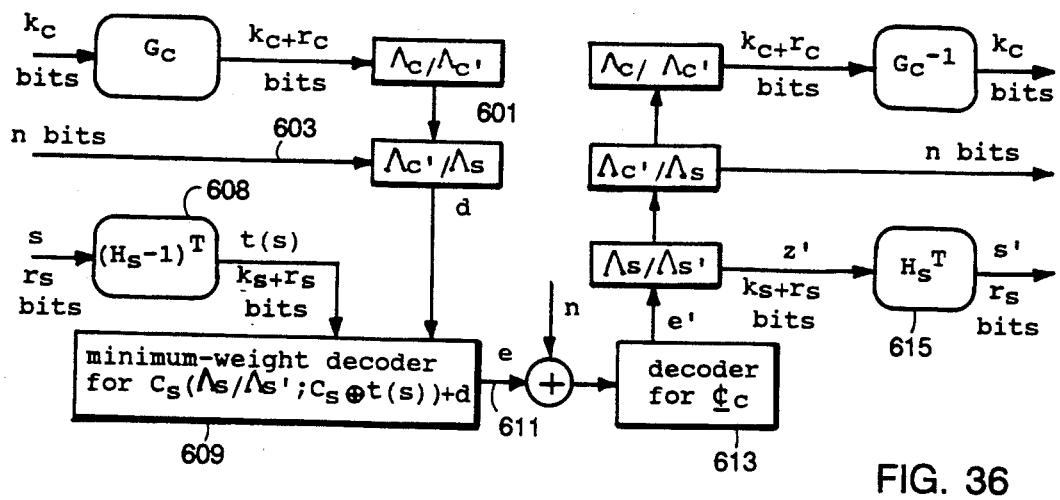

FIG. 36 is a block diagram of a modulation system using label translates of a pseudolinear code.

Figure 37:
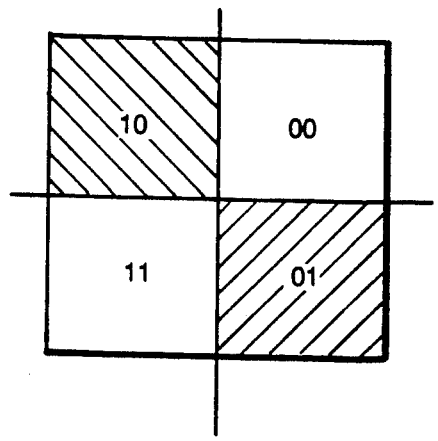

FIG. 37 illustrates regions for the encoder of FIG. 36.

Figure 38:
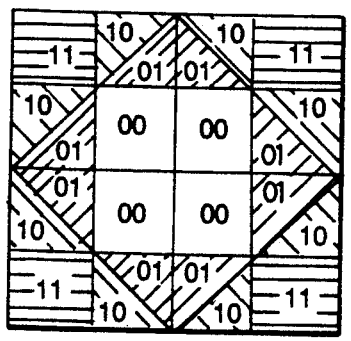

FIG. 38 illustrates four rotationally invariant fundamental regions.

OUTLINE OF TEXT

Terminology and Principles
Lattices
   Fundamental Regions of Lattices
   Partitions of Lattices
   Binary Lattices
   Constituent 2D Lattices, Redundancy, Informativity
Lattice-type Trellis Codes
Linear Trellis Codes
The Time-Zero Code and Lattice
Fundamental Regions of Linear Trellis Codes
Decoders
Simple Fundamental Regions
The Voronoi Region of a Linear Trellis Code
Finite-Memory Viterbi Decoders
Mapping Between Fundamental Regions
Shape Gain
Constellation Expansion Ratio
Construction of Trellis Constellations
Example Based on Ungerboeck 2D Code Shaping Gain Combined with Coding Gain
Ungerboeck Code Example of Combined Coding and Shaping
  Combined Shaping with Coding, In General
  Algebraic Theory, Duality, and Error Propagation
  Algebraic Theory of Convolutional Codes
    Trellis Constellations
    Ungerboeck Code Example
    Algebraic Theory of Mod-2 Trellis Codes
    Generation of Trellis Constellations Based on Mod-2 Trellis Codes
    Construction of Lattice-Type Trellis Codes with Trellis Constellations
    Wei Code Example of Combined Coding and Shaping in Four Dimensions
  Constellation Boundary Constraints
  Modem Implementation of 8-State 4D Dual Wei Code
    Differential Coding for Shaping
    Bounds on Shape Gain of Trellis Constellations
    Extension to Nonlinear Trellis Codes
    Hexagonal 2D Constellations
    Trellis Shaping on Regions
    Embodiment of Trellis Shaping on Regions
    Weighting
    Selection of Shaping Bits
    Preferred Embodiment
    Constellation Boundary Constraints
    Alternative Extension to Pseudo Linear (Non Linear Mod-4) Codes
    Differential Coding for Trellis Shaping on Regions

Structure and Operation

Terminology and Principles

We first discuss some of the terminology and principles which underlie the invention.

Lattices

An N-dimensional real lattice $\Lambda$ is a discrete set of N-tuples (or points), i.e., elements of real Euclidean N-space $R^N$ (assumed to span $R^N$), that has the group property: the sum or difference of any two lattice points under vector addition is another lattice point. Two elements of $R^N$ (whether or not they are points of the lattice) are said to be congruent mod $\Lambda$ if their difference is a point in $\Lambda$. The set of all elements congruent to a given N-tuple a is called the coset (or congruence class, or translate) $\Lambda + a$ of $\Lambda$.

Geometrically, a lattice $\Lambda$ is characterized by the minimum squared distance $d_{min}^2(\Lambda)$ between its points, and by its fundamental volume $V(\Lambda)$, which is the volume of N-space associated with each lattice point.

Fundamental Regions of Lattices

A fundamental region $R(\Lambda)$ of $\Lambda$ is defined as a region of N-space that contains one and only point from each congruence class mod $\Lambda$. The volume of any fundamental region of $\Lambda$ is $V(\Lambda)$.

The Voronoi region $R_V(\Lambda)$ of $\Lambda$ is the set of all elements in $R^N$ that are at least as close to the origin as to any other point in $\Lambda$. The Voronoi region $R_V(\Lambda)$ is the closure of a fundamental region of $\Lambda$ and has volume $V(\Lambda)$.

Partitions of Lattices

A sublattice $\Lambda'$ of $\Lambda$ is a subset of the points in $\Lambda$ that itself is a lattice. We say also that $\Lambda$ is a superlattice of $\Lambda'$. Since $\Lambda'$ is a subgroup of $\Lambda$, $\Lambda$ is the union of some number $|\Lambda/\Lambda'|$ of cosets (congruence classes) of $\Lambda'$; thus $\Lambda'$ induces a $|\Lambda/\Lambda'|$-way partition of $\Lambda$. The partition is denoted as $\Lambda/\Lambda'$. (More generally, any translate $\Lambda + a$ of $\Lambda$ is the union of $|\Lambda/\Lambda'|$ cosets of $\Lambda'$.) The number $|\Lambda/\Lambda'|$ is called the order of the partition $\Lambda/\Lambda'$ (or the index of $\Lambda'$ in $\Lambda$). A set of coset representatives for the $|\Lambda/\Lambda'|$ cosets of $\Lambda'$ in $\Lambda$ is any set of $|\Lambda/\Lambda'|$ N-tuples that includes one from each coset, and is denoted by $[\Lambda/\Lambda']$.

If $\Lambda'$ is sublattice of $\Lambda$, then the fundamental volume $V(\Lambda')$ of $\Lambda'$ is equal to $|\Lambda/\Lambda'|V(\Lambda)$.

Binary Lattices

A binary lattice $\Lambda$ is an integer lattice (a sublattice of the N-dimensional lattice $Z^N$ of integer N-tuples) that has $2^n Z^N$ as a sublattice, so that $Z^N/\Lambda/2^n Z^N$ is a lattice partition chain. The least such n is called the 2-depth of the lattice $\Lambda$, and $\Lambda$ is then called a mod-$2^n$ lattice.

A mod-2 lattice $\Lambda$ is thus an N-dimensional integer lattice that has $2Z^N$ as a sublattice. Every mod-2 lattice may be characterized as the set of all integer N-tuples that are congruent mod 2 to a codeword in some linear binary block code C of length N. If C is an (N,K) code, then the orders of the partitions $Z^N/\Lambda$ and $\Lambda/2Z^N$ are $|Z^N/\Lambda| = 2^{N-K}$ and $|\Lambda/2Z^N| = 2^K$, respectively, and the $2^K$ codewords of C may be regarded as a set of $[\Lambda/2Z^N]$ of coset representatives for the $|\Lambda/2Z^N|$-way partition $\Lambda/2Z^N$, while any set of coset representatives $[(N,N)/C]$ for the cosets of C in the set (N,N) of all binary N-tuples may be taken (as integer N-tuples) as a set of coset representatives $[Z^N/\Lambda]$ for the cosets of $\Lambda$ in $Z^N$. We denote such a mod-2 lattice by the notation $\Lambda_{(N,K)}$.

Constituent 2D Lattices, Redundancy, Informativity

The constituent 2D lattice $\Lambda_2$ of an N-dimensional lattice $\Lambda$ is the projection of $\Lambda$ onto two dimensions (assumed to be the same for any choice of two of the N dimensions). Normally we scale integer lattices so that $\Lambda_2$ is $Z^2$, the two-dimensional lattice of integer 2-tuples. If N is even and $\Lambda_2$ is the same for each pair of dimensions, then $\Lambda$ is a sublattice of $(\Lambda_2)^{N/2}$. The redundancy $r(\Lambda)$ of $\Lambda$ is then defined so that $2^{r(\Lambda)} = |(\Lambda_2)^{N/2}/\Lambda|$, or $|Z^N/\Lambda|$ if $\Lambda_2 = Z^2$. The normalized redundancy $\rho(\Lambda)$ of $\Lambda$ (per two dimensions) is defined as $\rho(\Lambda) = 2r(\Lambda)/N$. Thus the redundancy of a mod-2 lattice $\Lambda_{(N,K)}$ is N-K, and its normalized redundancy is 2(1-K/N).

The constituent 2D sublattice $\Lambda_2'$ of an -dimensional lattice $\Lambda$ is the set of all elements of $\Lambda$ whose components are all zero except in two specified dimensions, projected onto those two dimensions (assumed to be the same for any choice of two dimensions). If N is even and $\Lambda_2'$ is the same for each pair of dimensions, then $(\Lambda_2')^{N/2}$ is a sublattice of $\Lambda$.

For binary lattices, the constituent 2D sublattice $\Lambda_2'$ is some lattice in the infinite chain $Z^2/RZ^2/R^2Z^2/\ldots$ of versions $R^j Z^2$ of the lattice $Z^2$, where R is the two-dimensional norm-doubling rotation operator specified by the 2×2 matrix $R = \{[1,1], [-1,1]\}$, so that the order of each partition $R^j Z^2/R^{j+1} Z^2$ is 2. Note that $R^2 Z^2 = 2Z^2$N The depth $\mu$ of a binary lattice $\Lambda$ is the least integer $\mu$ such that $R^\mu Z^2$ is a sublattice of $\Lambda$. The informativity $k(\Lambda)$ of $\Lambda$ is then defined so that $2^{k(\Lambda)} = |\Lambda/(\Lambda_2')^{N/2}|$, or $|\Lambda/R^\mu Z^N|$ if $\Lambda_2' = R^\mu Z^2$, where $R^\mu Z^N$ means $(R^\mu Z^2)^{N/2}$. The normalized informativity $\kappa(\Lambda)$ of $\Lambda$ (per two dimensions) is defined as $\kappa(\Lambda) = 2k(\Lambda)/N$. Thus the informativity of a mod-2 (and depth-2) lattice $\Lambda_{(N,K)}$ is K, and its normalized informativity is 2K/N.

Lattice-type Trellis Codes

Sequences

A sequence $x = (x_0, x_1, \ldots)$ of elements $x_j$ from an alphabet A is defined to start at time $j=0$. The set of all possible such sequences will be denoted as $A^\infty$. Thus the set of all sequences whose elements belong to a lattice $\Lambda$ is denoted as $\Lambda^\infty$. For any lattice $\Lambda$, the set $\Lambda^\infty$ has the group property under sequence addition and is thus an infinite-dimensional lattice.

Trellis Codes

A lattice-type trellis code C (hereafter, simply a trellis code) is defined by a lattice partition $\Lambda/\Lambda'$ and a convolutional encoder E (or a convolutional code C). Hereafter, $\Lambda$ and $\Lambda'$ will always be taken to be binary lattices; then the order $|\Lambda/\Lambda'|$ of the partition $\Lambda/\Lambda'$ is a power of two, say $2^{k+r}$. Thus each of the $2^{k+r}$ cosets of $\Lambda'$ in $\Lambda$ may be identified by a (k+r)-bit label.

Figure 1:
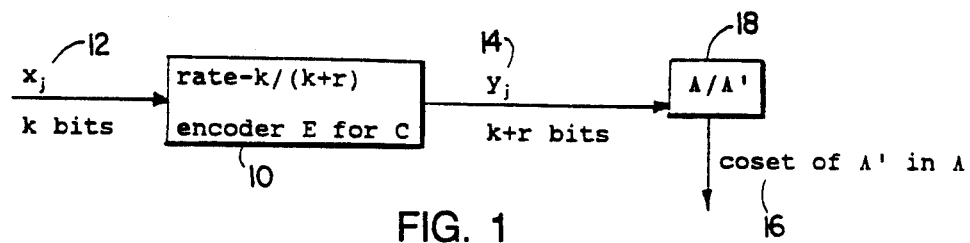
FIG. 1 is a block diagram of an encoder for a trellis code.

Referring to FIG. 1, encoder E 10 is a rate-k/(k+r) binary convolutional encoder; i.e., a finite state machine whose input sequence $x = (x_0, x_1, \ldots)$ is a sequence of binary k-tuples $x_j$ 12, and whose output sequence $y = (y_0, y_1, \ldots)$ is a sequence of binary (k+r)-tuples $y_j$ 14, such that the input-output map is linear (under addition mod 2) and time-invariant. The encoder E starts in a definite state, called the zero state, and remains in the zero state as long as the inputs $x_j$ are all zero, during which time the outputs $y_j$ also remain all zero. The output (k+r)-tuples $y_j$ select a sequence of cosets 16 of $\Lambda'$ in $\Lambda$ (for the partition 18 $\Lambda/\Lambda'$) according to some labeling scheme.

The trellis code $C(\Lambda/\Lambda';C)$ then consists of all permissible sequences c of elements of $\Lambda$ that fall in a sequence of cosets of $\Lambda'$ that could be selected by the encoder E; i.e., that have labels that are in code sequences in the convolutional code C. Thus $C(\Lambda/\Lambda'; C)$ is in general a proper subset of the lattice $\Lambda^\infty$, because some sequences in $\Lambda^\infty$ are not permitted in the trellis code C. There is a trivial case in which C is $\Lambda^\infty$, which exhibits $\Lambda^\infty$ as a degenerate 'one state' linear trellis code.

(Conventional codes often use signal points from a translate $\Lambda + a$ of $\Lambda$. We regard the sequences in such a code as translates $C(\Lambda/\Lambda';C) + a^\infty$ of the code sequences in $C(\Lambda/\Lambda';C)$, whose elements are constrained to be in $\Lambda$ itself.)

The redundancy r(C) of a trellis code $C(\Lambda/\Lambda';C)$ is defined as the sum of the redundancies of the lattice $\Lambda$ and the code C, $r(C) = r(\Lambda) + r$, and its normalized redundancy is defined as $\rho(C) = 2r(C)/N$. Its informativity is $k(C) = k(\Lambda') + k$, and its normalized informativity is $\kappa(C) = 2k(C)/N$. Since $Z^N/\Lambda/\Lambda'/R^\mu Z^N$ is a partition chain with orders $|Z^N/\Lambda| = 2^{r(\Lambda)}$, $|\Lambda/\Lambda'| = 2^{k+r}$, and $|\Lambda'/R^\mu Z^N| = 2^{k(\Lambda)}$, where $\mu$ is the depth of $\Lambda'$, and $|Z^N/R^\mu Z^N| = 2^{\mu N/2}$, we have $r(C) + k(C) = \mu N/2$.

Linear Trellis Codes

In a linear trellis code $C(\Lambda/\Lambda';C)$, the sum of any two code sequences is a code sequence.

A labeling of the cosets of $\Lambda'$ in $\Lambda$ is called linear if the label of the sum of two cosets of $\Lambda'$ is the sum (mod 2) of their (k+r)-bit labels, where the sum of two cosets of $\Lambda'$, say $\Lambda' + a$ and $\Lambda' + b$, is defined as the coset $\Lambda' + (a+b)$ that contains all sums of elements of the two cosets.

If the zero label corresponds to the zero coset of $\Lambda'$ ($\Lambda'$ itself), as is always true with a linear labeling, then the set of all sequences in $C(\Lambda/\Lambda';C)$ selected by the code sequence of zero valued elements in C is $(\Lambda')^\infty$, so $(\Lambda')^\infty$ is a subset of $C(\Lambda/\Lambda';C)$. Thus if $C(\Lambda/\Lambda';C)$ is a linear trellis code, then $\Lambda^\infty/C(\Lambda/\Lambda';C)/(\Lambda')^\infty$ is an infinite-dimensional lattice partition chain.

In the special case where both $\Lambda$ and $\Lambda'$ are mod-2 lattices, say $\Lambda_{(N,K)}$ and $\Lambda_{(N,K')}$, then it is always possible to choose the labeling so that $C(\Lambda_{(N,K)}/\Lambda_{(N,K')};C)$ is a linear trellis code. For then the (N,K') code must be a subcode of the (N,K) code, and the $2^{K-K'}$ cosets of $\Lambda_{(N,K')}$ in $\Lambda_{(N,K)}$ are isomorphic to the cosets of the (N,K') code in the (N,K) code. There is a linear map (mod 2) from binary (K-K')-tuples to coset representatives of the (N,K') code in the (N,K) code, which may also be taken as coset representatives of the cosets of $\Lambda_{(N,K')}$ in $\Lambda_{(N,K)}$. If the labeling is such a linear map, then $C(\Lambda_{(N,K)}/\Lambda_{(N,K')}; C)$ is a linear trellis code. In this case we call C a mod-2 trellis code, and $(Z^N)^\infty/\Lambda^\infty/C(\Lambda/\Lambda';C)/(\Lambda')^\infty/(2Z^N)^\infty$ is a lattice partition chain.

If C is a mod-2 trellis code, then it can always be represented as a code $C(Z^N/2Z^N;C')$ based on the $2^N$-way partition $Z^N/2Z^N$ and an augmented rate-k(C)/[k(C)+r(C)] convolutional code C', where $k(C) + r(C) = N$. With an appropriate labeling, C may then be described as the set of all integer N-tuple sequences that are congruent mod 2 to binary N-tuple sequences in the code C'. For simplicity, we shall hereafter consider all mod-2 trellis codes to be in this form. We say that the trellis code C is generated by the rate-k(C)/N convolutional code C'.

The Time-Zero Code and Lattice

For any rate-k/(k+r) convolutional encoder E, the time-zero code $C_0$ may be defined as the set of all $2^k$ output (k+r)-tuples $y_0$ that could be selected at time $j=0$ by the $2^k$ possible time-zero input k-tuples $x_0$. By linearity, $C_0$ is a (k+r, k) linear binary block code (assuming that all such $y_0$ are distinct).

Correspondingly, the time-zero lattice $\Lambda_0$ of C is defined as the union of the $2^k$ corresponding cosets of $\Lambda'$. (The definition of C given above is not sufficient to require this union to be a lattice, but in practice it always is.) Thus the time-zero lattice $\Lambda_0$ is a superlattice of $\Lambda'$ of order $2^k$, and a sublattice of $\Lambda$; since $|\Lambda/\Lambda'| = 2^{k+r}$, it follows that $|\Lambda/\Lambda_0| = 2^r$.

If $C(Z^N/2Z^N; C)$ is a mod-2 trellis code based on the partition $Z^N/2Z^N$ and a rate-k/N code C, then its time-zero lattice is a mod-2 lattice $\Lambda_0 = \Lambda_{(N,k)}$ comprising all integer N-tuples that are congruent mod 2 to a codeword in the time-zero code $C_0$, which is an (N,k) binary block code.

The time-zero code represents the set of possible output (k+r)-tuples $y_0 = y(x_0)$ when the encoder state is zero. For any encoder state $s_j$, if $y(0, s_j)$ is the encoder output when $x_j = 0$, then by linearity and time-invariance the output is $y(x_j, s_j) = y(x_j) + y(0, s_j)$ if the encoder input is $x_j$, so that the set of possible output (k+r)-tuples is a coset of the time-zero code $C_0$. Correspondingly, in any practical coset code C, the set of possible signal points corresponding to any encoder state $s_j$ is a union of $2^k$ cosets of $\Lambda'$ in $\Lambda$ that forms a coset of the time-zero lattice $\Lambda_0$ in $\Lambda$.

If $C(Z^N/2Z^N; C)$ is a mod-2 trellis code with a time-zero code $C_0$ and time-zero lattice $\Lambda_0 = \Lambda_{(N,k)}$, then a coset of $\Lambda_0$ is the set of all integer N-tuples that are congruent mod 2 to any word in a given coset of $C_0$, and we may take any set $[(N,N)/C_0]$ of coset representatives for the cosets of $C_0$ as a set $[Z^N/\Lambda_0]$ of coset representatives for the cosets of $\Lambda_0$ in $Z^N$.

Fundamental Regions of Linear Trellis Codes

For a linear trellis code C (an infinite-dimensional lattice), if R(C) is a fundamental region of C, then the set of translates of R(C) by c as c ranges through all code sequences in C is an exhaustive partition of sequence space $(R^N)^\infty$, as will be shown below. Many good trellis codes, such as the 4-state 2D Ungerboeck code (Ungerboeck, "Channel Coding with Multilevel/Phase Signals," cited above) and most of the Wei codes, Wei ("Trellis-coded Modulation with Multidimensional Constellations, *IEEE, Trans. Inf. Theory*, Vol. IT-33, pp. 177-195, 1987) are based on partitions of mod-2 lattices with linear labelings, and thus are linear.

Other known lattice-type trellis codes, such as the remaining Ungerboeck codes and most of the Calderbank-Sloane codes, (Calderbank and Sloane, "New Trellis Codes Based on Lattices and Cosets," *IEEE Trans. Inf. Theory*, vol. 25, no. 1, pp. 12-21, 1987), are based on partitions $\Lambda/\Lambda'$ in which $\Lambda'$ is a mod-4 binary lattice. The labelings used with these codes are not linear, but satisfy a weaker condition called 'regularity' which assures that the distribution of distances from a given code sequence c to all other code sequences in C is independent of c. When C has such a distance-invariance property, we expect that sequence space may be exhaustively partitioned into regions that are geometrically similar, each centered on one of the code sequences c in C, so that we may take the region centered on the zero sequence as a representative fundamental region.

Decoders

An exhaustive decoder of a trellis code C is any map c(r) from arbitrary sequences r in sequence space $(R^N)^\infty$ to sequences c in C. The decision region R(c) associated with any particular code sequence c is the set of all r that map to c. The apparent error, or simply error, associated with r is then $e(r) = r - c(r)$, and the error region associated with c (the set of apparent errors e(r) for all r such that c(r) = c) is then $R_e(c) = R(c) - c$. If we assume that every decision region R(c) includes c, then every error region $R_e(c)$ includes the zero sequence 0. The set of all decision regions R(c) for all c in C forms an exhaustive partition of sequence space $(R^N)^\infty$.

A fair, exhaustive decoder of a linear trellis code C is a map such that if r maps to c, then r+c' maps to c+c' for all c' in C. It follows that if the decision region corresponding to the code sequence 0 is R(0), then the decision region corresponding to any code sequence c is $R(c) = R(0) + c$, and there is a common error region $R_e(c) = R_e(0) = R(0)$ for all c in C. Thus there is an exhaustive partition of sequence space $(R^N)^\infty$ consisting of the translates R(0)+c of the common error region R(0) for all c in C.

If C is a linear trellis code, two sequences in $(R^N)^\infty$ will be said to be congruent mod C if their difference is an element of C. Since C is a group under sequence addition, congruence mod C is an equivalence relation and partitions sequence space $(R^N)^\infty$ into equivalence (congruence) classes. A fundamental region R(C) of a linear trellis code C is then a set of sequences that includes one and only one sequence from each congruence class mod C (i.e., a set of coset representatives for the cosets of C in $(R^N)^\infty$. Then every sequence r in $(R^N)^\infty$ can be uniquely expressed as a sum $r = c + e$ for some c in C and e in R(C); i.e., there is a coset decomposition which may be written as $(R^N)^\infty = C + R(C)$.

Clearly, R(C) is a fundamental region of a linear trellis code C if and only if it is the common error region R(0) of a fair, exhaustive decoder for C. Thus we may specify fundamental regions by specifying appropriate decoders.

Simple Fundamental Regions of a Linear Trellis Code

A simple fundamental region of a linear trellis code C may be specified by a 'hard-decision decoder' for C as follows.

Let $R_0$ be a simple fundamental region of the time-zero lattice $\Lambda_0$. Then, for any coset $\Lambda_0 + a$ of $\Lambda_0$, every point r in $R^N$ may be uniquely written as $r = (c+a) + e$, where $(c+a)$ is an element of $\Lambda_0 + a$ and e is an element of $R_0$. This specifies a fair, exhaustive decoder for the translate $\Lambda_0 + a$ of $\Lambda_0$ that has the common error region $R_0$.

At time $j=0$, the hard-decision decoder receives the first element $r_0$ of r, and uses the above decoder for $\Lambda_0$ to make a 'hard decision' on the first element $c_0$ of c. This determines an estimated state $s_1$ at time $j=1$ of the encoder E, which in turn determines the set of possible next elements $c_1$, a coset $\Lambda_0 + a(s_1)$ of the time-zero lattice $\Lambda_0$. Then, given the next element $r_1$ of r, the hard-decision decoder may use the above decoder for $\Lambda_0 + a(s_1)$ to make a hard decision on the next element $c_1$ of c, and so forth.

For any c, this hard decision decoder has a common error region equal to $(R_0)^\infty$, the set of all sequences of elements of $R_0$. It is therefore a fair, exhaustive decoder (albeit not a very good one), and $(R_0)^\infty$ is thus a simple fundamental region of the linear trellis code C.

The fundamental region $(R_0)^\infty$ is a Cartesian product of fundamental regions $R_0$, and clearly may be regarded as having a volume of $V(R_0) = V(\Lambda_0)$ per N dimensions. Any other fundamental region of C is congruent to $(R_0)^\infty$ mod C, and therefore may be regarded as having the same volume. Thus the fundamental volume of a trellis code C with time-zero lattice $\Lambda_0$ is $V(\Lambda_0)$ per N dimensions.

The Voronoi Region of a Linear Trellis Code

For an arbitrary set of sequences, there is some conceptual difficulty in specifying a minimum-distance sequence decoder, because the squared error (squared Euclidean distance) $\|e\|^2$ between given sequence r and every sequence in the set will usually be infinite. However, when the set of sequences is a trellis code C generated by a finite-state encoder E, a minimum distance decoder may be operationally specified as the code sequence c(r) generated by a Viterbi algorithm decoder for C with unlimited memory, when the decoder input is the sequence r. The Voronoi region $R_V(C)$ of a trellis code C may then be defined as the set of all r in $(R^N)^\infty$ that map to the code sequence 0; i.e., as the decision region R(0) of a minimum distance Viterbi algorithm decoder. If C is a linear trellis code, then this is the common error region R(0) of such a decoder for any code sequence c.

Issues such as what the decoder does when two paths of the trellis converge at some state with the same metric (squared distance), or when paths do not converge in their initial segments for an arbitrarily long time, basically involve what the decoder does in the case of ties, when the sequence r lies on the boundary between decision regions corresponding to different code sequences. It is clear that, as with Voronoi regions of lattices, these questions can be largely avoided by defining the Voronoi region $R_V(C)$ to include all of its boundary points. Since the boundary of the Voronoi region is a region of measure zero in sequence space, it usually will not matter how boundary ties are resolved. In constellation design, however, it may be necessary to pay special attention to boundary points and ties.

Finite-Memory Viterbi Decoders

A practical Viterbi algorithm has a finite decoding delay M. Such a decoder makes a hard decision on the first component $c_0$ of c, and thus on the state $s_1$ of the encoder, on the basis of the first $M+1$ components ($r_0, r_1, \ldots, r_M$) of r. Then, given the estimated state $s_1$, it makes a hard decision on $c_1$ based on ($r_1, r_2, \ldots, r_{M+1}$), and so forth. Such a decoder is suboptimum, but as M goes to infinity its performance approaches that of a Viterbi decoder with unlimited memory. Note also that for $M=0$, such a decoder reduces to the hard-decision decoder described above, with $R_0$ being the Voronoi region of the time zero lattice $\Lambda_0$. Thus there is a sequence of 'decision-feedback' Viterbi decoders with increasing decoding delay M, starting with the optimum hard decision decoder (zero delay) and approaching the optimum minimum distance sequence estimator (infinite delay). It is clear that performance must monotonically increase with M. As with other applications of maximum likelihood sequence estimation (e.g., convolutional codes, intersymbol interference), the performance of such finite-memory decision-feedback decoders can be analyzed using variants of techniques applicable to blocks of length $M+1$, so that infinite dimensional trellis codes can be analyzed by variants of techniques applicable to finite-dimensional lattices.

Later, we shall need the following lemma:

Lemma: The Voronoi region $R_V(C)$ of a trellis code $C(\Lambda/\Lambda';C)$ is contained in $[R_V(\Lambda')]^\infty$, the set of all sequences of elements of the Voronoi region $R_V(\Lambda')$ of $\Lambda'$.

The proof is that because C is a union of cosets of $(\Lambda')^\infty$, in principle one could realize a minimum-distance decoder for C by decoding each of the cosets of $(\Lambda')^\infty$ separately, and then choosing the closest of the resulting sequences. The common error region for a minimum-distance decoder of any coset of $(\Lambda')^\infty$ is $[R_V(\Lambda')]^\infty$, so the final error sequence must be contained in $[R_V(\Lambda)]^\infty$. Note that this proof does not depend on the linearity of C and thus is valid for general trellis codes.

An immediate corollary is that if N is even and $\Lambda_2'$ is the constituent 2D sublattice of $\Lambda'$, then $R_V(\Lambda')$ is contained in $[R_V(\Lambda_2')]^{N/2}$ (since $(\Lambda_2')^{N/2}$ is a sublattice of $\Lambda'$), and therefore the Voronoi region of C is contained in $([R_V(\Lambda_2')]^{N/2})^\infty$. If $\Lambda'$ is a binary lattice of depth $\mu$, therefore, the Voronoi region of C is contained in $[R_V(R^\mu Z^2)]^\infty$, an infinite Cartesian product whose constituents are two-dimensional squares of area $2^\mu$, centered on the origin.

Mapping Between Fundamental Regions

Figure 2:
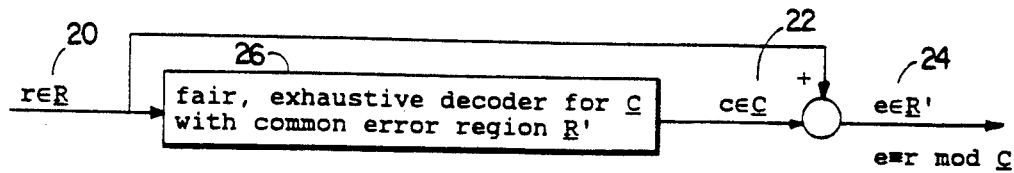
FIG. 2 is a block diagram of a mapping from one fundamental region of a trellis code to another.

Referring to FIG. 2, any fundamental region R 20 of C 22 may be mapped into any other fundamental region R' 24 by the map that takes a point of R to the unique point of R' in the same congruence class mod C. Operationally, this map may be performed by a fair, exhaustive decoder 26 for C with common error region R', with the input to the decoder being a point r in R, and the output being the error $e=r-c$, which must be the unique point that lies in the common error region R' and is congruent to r mod C. The map may of course be inverted by a decoder with common error region R.

Figure 3:
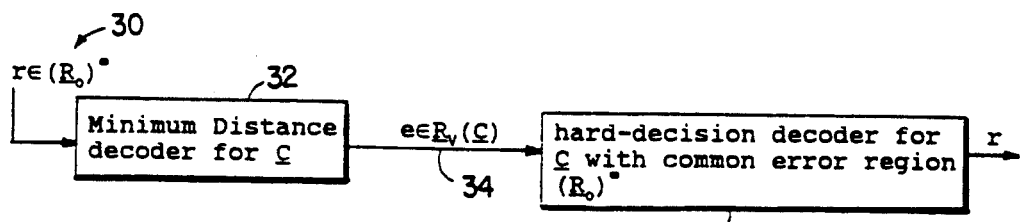
FIG. 3 is a block diagram of mappings from a simple fundamental region to a Voronoi region and vice versa.

Referring to FIG. 3, for example, we may take r to be a sequence from a simple fundamental region $(R_0)^\infty$ 30, and use a Viterbi decoder 32 to map r to a sequence e in the Voronoi region $R_V(C)$ 34 of C that is congruent to r; to invert this map, we use a simple hard-decision decoder 36, using a decoder for $\Lambda_0$ with common error region $R_0$, to recover the sequence r from e.

Shape Gain

The shape gain of a fundamental region of sequence space that is defined by a trellis code C and an associated decoder will be defined as follows.

Let $R_0$ be any fundamental region of the time-zero lattice $\Lambda_0$ of C, with volume $V(\Lambda_0)$. Define a uniform continuous probability distribution over $R_0$, with probability density $p(r)=1/V(\Lambda_0)$, and let this distribution define a corresponding uniform distribution over sequences r in $(R_0)^\infty$. Finally, define a uniform distribution over the sequences e in the fundamental region $R=R(0)$, the common error region of the decoder, as the distribution induced by the decoder map from r to e. We assume that the mean P(R) of the norm $\|e_j\|^2$ of the N dimensional components $e_j$ of e is well defined under this uniform distribution over R, at least as $j\to\infty$.

A practical method of estimating P(R) is by Monte Carlo simulation, using a pseudo-random uniform distribution over a discrete but dense set of points uniformly distributed across $R_0$, and a decoder that maps a sequence of these points into the corresponding sequence in $R=R(0)$.)

The normalized second moment of R is then defined as $G(R)=[P(R)/N]/[V(R_0)]^{2/N}$, where $P(R)/N$ is the average power per dimension, and $[V(R_0)]^{2/N}$ is a normalizing factor that scales as the square of a linear dimension, like P(R). If $R_0$ is an N-cube of side R and $R=(R_0)^\infty$, then $P(R)=NR^2/12$ and $V(R_0)=R^N$, so $G(R)=1/12$, which we define as the baseline normalized second moment $G_0=1/12$. The shape gain $\gamma_s(R)$ is then defined as the ratio $\gamma_s(R)=G_0/G(R)$, or $\gamma_s(R)=1/[12G(R)]$.

For a hard-decision decoder based on a fundamental region $R_0$ of the time-zero lattice $\Lambda_0$ of C, the normalized second moment and shape gain reduce to the corresponding parameters $G(R_0)$ and $\gamma_s(R_0)$ of the N-dimensional region $R_0$. In particular, since a Viterbi algorithm with delay zero is a hard-decision decoder with $R_0=R_V(\Lambda_0)$, the Voronoi region of $\Lambda_0$, the shape gain of a trellis code C with such a decoder is the same as the shape gain $\gamma_s(\Lambda_0)$ of the Voronoi region of the time-zero lattice $\Lambda_0$ of C. Since a Viterbi decoder with delay M cannot perform worse than one with less delay, the average power P(R) must decrease monotonically with M, and therefore the shape gain increases monotonically from $\gamma_s(\Lambda_0)$ with M. We assume that this sequence of shape gains approaches a limit, and identify this limit as the shape gain $\gamma_s(C)$ of the trellis code C.

Constellation Expansion Ratio

We take as an initial constellation a set of N-dimensional points from the region $R_0$, whose volume is $V(R_0)=V(\Lambda_0)$. If we use a minimum-distance sequence decoder, then the common error region $R=R(0)$ will be the Voronoi region of C. By the Lemma, this region is contained in $[R_V(\Lambda')]^\infty$, so the final constellation is a set of N-dimensional points from the region $R_V(\Lambda')$, whose volume is $V(\Lambda')$. Assuming that the final constellation fills $R_V(\Lambda')$, the final constellation occupies a volume which is a factor of $V(\Lambda')/V(\Lambda_0) = |\Lambda_0/\Lambda'| = 2^k$ times as large as that occupied by the initial constellation in N-space $R^N$, where k is the informativity of the convolutional code C. We may therefore define $2^k$ as the shaping constellation expansion ratio in N dimensions.

In two dimensions, the final constellation is contained within $R_V(\Lambda_2')$, where $\Lambda_2'$ is the constituent 2D sublattice of $\Lambda'$. The Cartesian product $(\Lambda_2')^{N/2}$ has a fundamental volume which is $V[(\Lambda_2')^{N/2}]/V(\Lambda') = |\Lambda'/(\Lambda_2')^{N/2}|$ times as large as that of $\Lambda'$ in N-space, or $2^{k(\Lambda')}$ times as large, if $\Lambda'$ is a binary lattice of informativity $k(\Lambda')$. Thus $V[(\Lambda_2')^{N/2}]$ is a total of $2^{k(C)}$ times as great as $V(\Lambda_0)$ in N-space, where $k(C) = k + k(\Lambda')$ is the informativity of the code C. Normalized to two dimensions, the constellation expansion ratio is $[2^{k(C)}]^{2/N} = 2^{\kappa(C)}$, where $\kappa(C) = 2k(C)/N$ is the normalized informativity of the code C. We denote this constellation expansion ratio by $CER_s(C) = 2^{\epsilon(C)}$, since it is due to the use of C for constellation shaping. (By contrast, when C is used for coding, the associated coding constellation expansion ratio is $CER_c(C) = 2^{\rho(C)}$.)

Construction of Trellis Constellations

A linear trellis code can be used in the construction of so-called trellis constellations, which we also call 'trellis shaping.' We denote the trellis code by $C_s(\Lambda_s/\Lambda_s'; C_s)$; where the subscripts stand for 'shaping' (to distinguish, as explained below, from the codes $C_c(\Lambda_c/\Lambda_c'; C_c)$ to be used for coding), where $C_s$ is now a rate-$k_s/(k_s+r_s)$ code. For large numbers of bits per symbol, we can achieve the shape gain $\gamma_s(C_s)$ of $C_s$, at the cost of a shaping constellation expansion ratio of $CER_s(C_s)$.

(We assume without loss of generality that both $C_s$ and $C_c$ are based upon lattice partitions in the same number of dimensions, N. For if $\Lambda_s$ and $\Lambda_s'$ are N-dimensional and $\Lambda_c$ and $\Lambda_c'$ are M-dimensional, then we can use the Cartesian product codes $C_s^M$ and $C_c^N$, which are based upon the M-dimensional partitions $(\Lambda_s)^M/(\Lambda_s')^M$ and $(\Lambda_c)^N/(\Lambda_c')^N$, respectively, to arrive at shaping and coding codes of the same dimension.)

Let $\Lambda$ be any superlattice of $\Lambda_s$. If $\Lambda_{0s}$ is the time-zero lattice of $C_s$, then $\Lambda$ is also a superlattice of $\Lambda_{0s}$. Assuming that all lattices are binary lattices, the order $|\Lambda/\Lambda_{0s}|$ of the partition $\Lambda/\Lambda_{0s}$ is $2^b$ for some integer b. Then there are exactly $2^b$ points from any coset $\Lambda + a$ of $\Lambda$ in any fundamental region $R_0$ of $\Lambda_{0s}$, one in each of the $2^b$ cosets of $\Lambda_{0s}$ of which $\Lambda + a$ is the union.

Referring to FIG. 4, a trellis constellation with points from $\Lambda + a$ that can represent b bits per N dimensions can therefore be constructed as follows. Let each b-bit data word 40 specify one of the $|\Lambda/\Lambda_{0s}| = 2^b$ points 42 from $\Lambda + a$ in some simple fundamental region $R_0$ of $\Lambda_{0s}$. We call this $2^b$-point, N-dimensional constellation the initial constellation $C_{init}$. The set $(C_{init})^\infty$ of all sequences r 44 of constellation points $r_j$ is then capable of uniquely representing each possible sequence of b-bit data words. Then decode such a sequence r in $(C_{init})^\infty$ with a fair, exhaustive decoder 46 for the shaping code $C_s$, with common error region R(0). Such a decoder will map r into the unique sequence e in R(0) 48 that is congruent to r mod $C_s$. Then e is the transmitted sequence. The set of all possible $e_j$ is called the final constellation $C_{fin}$, so e is an element of $(C_{fin})^\infty$. The sequence r can be recovered from e by a simple hard-decision decoder 50 based on the simple fundamental region $R_0$ of $\Lambda_0$, and the original b bits 40 can be recovered once we know $r_j$ by an inverse map 42.

Normally decoder 46 is a minimum-distance decoder for $C_s$ (or a close approximation thereto). Then the common error region R(0) is the Voronoi region $R_V(C_s)$ of $C_s$ (or a close approximation thereto). As discussed above, the final constellation $C_{fin}$ then has nominally $|\Lambda/\Lambda_s'|/|\Lambda/\Lambda_{0s}| = |\Lambda_{0s}/\Lambda_s'| = 2^{k_s}$ times as many points as the initial constellation $C_{init}$ in N dimensions. (We say 'nominally' because of possible boundary ties.) However, because e is chosen as the sequence of least power in the congruence class that contains r, a power savings (measured by the shape gain) is in fact achieved.

Example Based on Ungerboeck 2D Code

One well-known trellis code is the Ungerboeck 4-state 2D code (Ungerboeck, "Channel Coding . . . ," supra) which we denote as $C_U$. In coset code notation, $C_U$ is based on the 4-way lattice partition $\Lambda/\Lambda' = Z^2/2Z^2$ and on a certain rate-$\frac{1}{2}$ 4-state binary convolutional code C. $C_U$ consists of all integer sequences that are congruent mod 2 to code sequences in C. Since the code C is linear under mod 2 addition, the sum of two sequences in $C_U$ is in $C_U$, so $C_U$ is a group under sequence addition and thus an infinite-dimensional lattice.

(Conventionally the coordinates of an integer code sequence from $C_U$ are offset by $\frac{1}{2}$ for transmission, so that the 2D signal points are drawn from the half integer grid $Z^2 + (\frac{1}{2},\frac{1}{2})$; because we require $C_U$ to be a group under sequence addition, we regard the conventional code as a translate, or coset, of $C_U$.)

Referring to FIG. 5, to send b = 3 bits per two dimensions, first map each 3-bit word 52 into one of eight 2D points $r_j$ 54 (the mapping is defined by the three-bit label of each point 54 in the Figure) which form an initial constellation 56. Constellation 56 consists of the eight elements of the translate $(Z/2+\frac{1}{4})^2$ of the lattice $(Z/2)^2$ that lie within the simple fundamental region 55 $[0,2) \times [0,1)$ of the lattice $RZ^2$, which is the time-zero lattice of $C_U$. The time-zero lattice $RZ^2$ is the union of two cosets A, D of the lattice $2Z^2$, where the diamonds 63 indicate points of the two cosets A and D. Referring to FIG. 5A, the partitioning $(Z/2)^2/RZ^2$ is an eight-way partition which can be refined into the chain of two-way partitions $(Z/2)^2/R(Z/2)^2/Z^2/RZ^2$. Note that the Ungerboeck code sublattice $\Lambda' = 2Z^2$ is also a sublattice of the time-zero lattice $\Lambda_0 = RZ^2$.

Referring to FIG. 5B, in the corresponding trellis 70, at each time j, j+1, j+2, . . . , there are four possible states 72 (labeled 1, 2, 3, and 4). Each branch 74 represents a coset of $2Z^2$. Each coset $2Z^2$ (A, B, C, or D of FIG. 5) appears in two of the branches extending between possible states at a time j and the possible states at a next time j+1. Each encoder state is associated with one of the cosets of $RZ^2$, namely either $RZ^2$, or the translate $RZ^2 + (1,0)$. (The translate consists of the cosets B and C of $2Z^2$, indicated by the squares labeled B and C on FIG. 5.)

State 1 or state 2 is thus reachable only from prior state 1 or state 3 via branches labeled A or D (corresponding to $RZ^2$), and state 3 or state 4 is reachable only from prior state 2 or 4 via branches labeled B or C (corresponding to the translate $RZ^2 + (1,0)$).

In operation, the map of FIG. 5 first maps each three bits of data 52 to the corresponding point 54 in constellation 56. Then the decoder 58, in accordance with the trellis of FIG. 5B, decodes the resulting sequence of points to a code sequence c of points in the four subsets A, B, C, D on a maximum likelihood sequence estimation basis, using the Viterbi algorithm. Finally, the error sequence between r and c is derived and the sequence of error values $e_j$ (which are points in the final constellation 64) is used for transmission.

Decoder 58 could have any selected delay M before making a final decision of which final constellation signal point is to be transmitted.

Let the resulting sequence r 57 be decoded by any minimum distance decoder 58 for $C_U$ with delay M, and let the resulting error sequence e 60 be the transmitted sequence. The set of all possible points $e_j$ 62 produced by this decoder is the final constellation 64. If the decoder for $C_U$ is a minimum-distance Viterbi decoder, then the final constellation is the 16-point constellation shown. To recover r from e, we may use a 'hard-decision decoder' to map independently each component $e_j$ of e back into one of the 8 points $r_j$ in the initial constellation as shown in FIG. 4, with little complexity and no delay.

Simulations have shown that the code $C_U$ yields a shape gain of 0.94 db with a delay-15 decoder and 0.97 dB as M goes to infinity.

C Shaping Gain Combined with Coding Gain

The above example illustrates an important property of trellis constellations: the mapping from the sequence r to the sequence e only affects the 'most significant bits'. Because c is an integer sequence, the 'fractional parts' of the components $e_j$ of the sequence e must be the same as those of r. Thus if we regard the $2^b$ points in the initial constellation as being specified by (a) $b-1$ bits that specify the 'fractional parts' of the two coordinates, and (b) one final bit that specifies whether the point is in the square $[0,1) \times [0,1)$ or the translated square $[1,2) \times [0,1)$ of FIG. 5, it is easy to see that the former $b-1$ bits are immediately recoverable from the transmitted sequence e, with no delay and no error propagation. (As explained below, the recovery of the final bit requires a transmitter precoding operation to avoid error propagation.)

An important consequence of this property is that the 'least significant bits' may be encoded by another trellis code $C_c$ to obtain sequence minimum squared distance $d_{min}^2(C_c)$ which is greater than the minimum squared distance between points in the initial or final constellations; because these bits are not affected by the shaping mapping from r to e of FIG. 5, this sequence distance $d_{min}^2(C_c)$ is preserved, and a decoder for $C_c$ may be used on the noisy received sequence to form the receiver's estimate of e, so that the coding gain $\gamma_c(C_c)$ of the code $C_c$ is achieved. Thus the shaping operation is completely compatible with a separate coding operation, and together they achieve a total coded modulation gain combination of the shape gain $\gamma_s(C_U)$ (in this example) with the coding gain $\gamma_c(C_c)$.

Ungerboeck Code Example of Combined Coding and Shaping

For example, let us use as $C_c$ a scaled version of the same Ungerboeck code $C_U$, which has $d_{min}^2(C_U)=4$, redundancy $r(C_U)=\rho(C_U)=1$ bit per two dimensions, and thus a coding gain $\gamma_c(C_U)=2^{-\rho}d_{min}^2$ of a factor of 2, or 3.01 dB. More precisely, let us use the scaled version of this code, say $2^{-m-1}C_U$, which is based on the same code C, and on the scaled lattice partition $\Lambda_c/\Lambda_c'=2^{-m-1}Z^2/2^{-m}Z^2$, rather than on $Z^2/2Z^2$. The scaled code sequences c are those sequences that are congruent mod $2^{-m}$ to code sequences in C scaled by $2^{-m-1}$. The scaled code $2^{-m-1}C_U$ consists of sequences of points from a translate of $2^{-m-1}Z^2$, say $(2^{-m-1}Z+2^{-m-2})^2$, and has minimum squared distance $d_{min}^2(C_c)=2^{-2m}$ between scaled code sequences, which remains 4 times better than the minimum squared distance $2^{-2m-2}$ between constellation points. The coding gain $\gamma_c(C_U)=2$ is unaffected by scaling.

Because scaled code sequences are from, e.g., $(2^{-m-1}Z+2^{-m-2})^2$, the initial sequence r in FIG. 5 may in fact be a code sequence from the scaled code $2^{-m-1}C_U$, with points from a $2^{2m+3}$-point initial constellation $C_{init}$.

Figure 6:
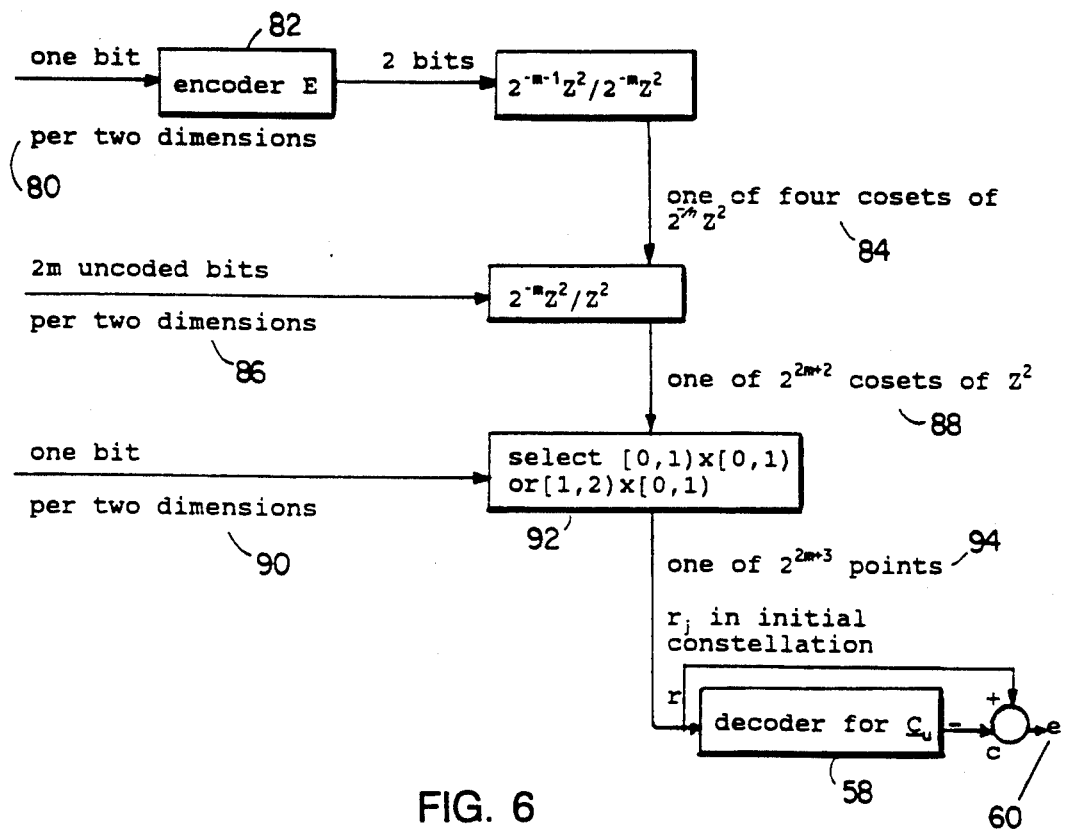
FIG. 6 is a block diagram of the Ungerboeck 4-state 2D mapping code combined with a coding operation based on a scaled version of the Ungerboeck code.

Referring to FIG. 6, in a coded modulation system employing the Ungerboeck 4-state 2-D code that incorporates both coding and shaping, one bit per two dimensions 80 enters a rate-$\frac{1}{2}$ encoder E 82 for the binary convolutional code C, and the two resulting coded bits select one of the 4 cosets of $2^{-m}Z^2$ 84 whose union is $(2^{-m-1}Z+2^{-m-2})^2$. A further 2m uncoded bits 86 select one of the $2^{2m}$ cosets of $Z^2$ 88 whose union is the selected coset of $2^{-m}Z^2$ (the combined selection results in one of $2^{2m+2}$ cosets of $Z^2$), and a final bit 90 selects 92 either the square $[0,1) \times [0,1)$ or the translated square $[1,2) \times [0,1)$, thus determining a point $r_j$ in the initial constellation 94. A decoder for $C_U$ 58 as before then converts the sequence r of initial constellation points into a transmitted sequence e 60.

Figure 7:
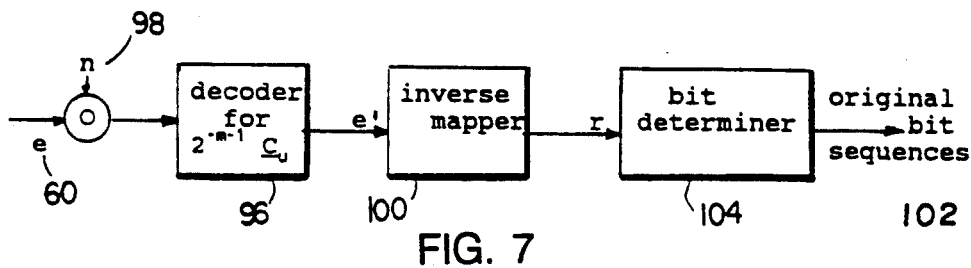
FIG. 7 is a block diagram of a receiver for the sequence e of FIG. 6.

Referring to FIG. 7, a receiver for such a coded modulation system operates as follows. First, a decoder 96 for the scaled code $2^{-m-1}C_U$ estimates the transmitted sequence e (corrupted by noise sequence n 98) by maximum likelihood sequence estimation. If this estimated sequence e' is correct, then there is an inverse map 100 to the initial sequence r, and from this the original bit sequences 102 can be determined 104 as in FIG. 4. (Below we discuss how to prevent error propagation.)

In summary, the coded modulation system of FIG. 6 takes in $2m+2$ bits per two dimensions and produces a sequence e from the final constellation, which is the set of $2^{2m+4}$ points from $(2^{-m-1}Z+2^{-m-2})^2$ which lie in the square region $[-1,1] \times [-1,1]$. The total constellation expansion ratio, compared to a $2^{2m+2}$-point uncoded square constellation, is thus a factor of 4, of which a factor of 2 is due to coding, and a factor of 2 to shaping. A total gain of 3.95 dB may be achieved, of which 3.01 dB is due to coding and 0.94 dB to shaping.

(While shape gains are ultimately limited to 1.53 dB, which is much smaller than typical coding gains, we have found that after the initial 3-4 dB of coding gain it takes of the order of a doubling of coding complexity to achieve each 0.4 dB increase in effective coding gain, so that at some point it is easier to achieve further gains by more complex shaping rather than by more complex coding. In this example, for instance, the total gain is about the same as that obtainable with a 16-state Ungerboeck code used for coding, with no shaping.)

Combining Shaping with Coding, in General

In general, let $C_c(\Lambda_c/\Lambda_c'; C_c)$ be a trellis code to be used for coding, and let $C_s(\Lambda_s/\Lambda_s'; C_s)$ be another (linear) trellis code to be used as the basis for a trellis constellation to be used with $C_c$. If $\Lambda_c$, $\Lambda_c'$, $\Lambda_s$, and $\Lambda_s'$ are all N-dimensional binary lattices, then because $2^n Z^N$ is a sublattice of $\Lambda_c'$ for some n, if we scale the code $C_c$ by $2^{-m-n}$ for any $m \geq 0$ (i.e., replace $C_c$ by $2^{-m-n}C_c$, the code based on the scaled lattice partition $2^{-m-n}\Lambda_c/2^{-m-n}\Lambda_c'$ and the same convolutional code $C_c$), then $2^{-m-n}\Lambda_c'/2^{-m}Z^N/Z^N/\Lambda_s$ is a lattice partition chain. (Equivalently, we could scale $C_s$ by $2^{m+n}$.)

The code sequences of $2^{-m-n}C_c$ are the sequences in a coset of $(2^{-m-n}\Lambda_c)^\infty$ that lie in one of the sequences of cosets of $(2^{-m-n}\Lambda_c')^\infty$ that could be selected by a code sequence from $C_c$. They can therefore be defined as those sequences r from a coset of $(2^{-m-n}\Lambda_c)^\infty$ that satisfy a certain set of constraints on congruence mod $(2^{-m-n}\Lambda_c')^\infty$. Because $(\Lambda_s)^\infty$ is a sublattice of $(2^{-m-n}\Lambda_c')^\infty$ for $m \geq 0$, any sequence e that is congruent to r mod $C_s$ (and thus, a fortiori, mod $(\Lambda_s)^\infty$) will remain in the same congruence class as r mod $(2^{-m-n}\Lambda_c')^\infty$, and will thus remain a legitimate code sequence in $2^{-m-n}C_c$. Thus the transmitted sequences e produced by a decoder for $C_s$ operating on code sequences r from $2^{-m-n}C_c$ remain code sequences in $2^{-m-n}C_c$. This means that the minimum squared distance between the possible transmitted sequences e is still $d_{min}^2(2^{-m-n}C_c)$, and that the coding gain $\gamma_c(2^{-m-n}C_c) = \gamma_c(C_c)$ is still achieved. It also means that a decoder for $2^{-m-n}C_c$ can be used at the receiver to estimate e.

Figure 8:
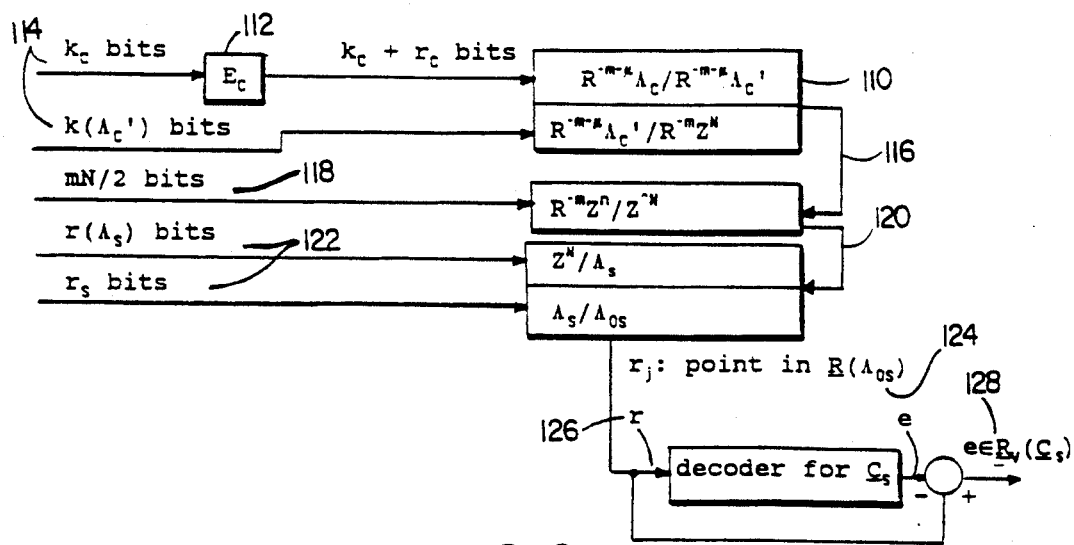
FIG. 8 is a block diagram of a modulation system combining coding and shaping.

Referring to FIG. 8, in general, the code $C_c$ is a general coset code based on a partition $\Lambda_c/\Lambda_c'$ of N-dimensional binary lattices, with N even, and a rate-$k_c/(k_c+r_c)$ encoder $E_c$ 112. If the depth of $\Lambda_c'$ is $\mu_c = \mu$, then the informativity $k(\Lambda_c')$ satisfies $2^{k(\Lambda_c')} = |\Lambda_c'/R^\mu Z^N|$, and the informativity $k(C_c)$ of the code $C_c$ is $k(C_c) = k_c + k(\Lambda_c')$. If the code $C_c$ is replaced by the scaled code $R^{-m-\mu}C_c$ for $m \geq 0$, then $k(C_c)$ data bits 114 per N dimensions select a coset 116 of $R^{-m}Z^N$ in some coset of $R^{-m-\mu}\Lambda_c$ 110. A further mN/2 uncoded bits per N dimensions 118 select a coset of $Z^N$ in the selected coset of $R^{-m}Z^N$. Finally, if the redundancy of the shaping code is $r(C_s) = r_s + r(\Lambda_s)$, so that $2^{r(C_s)} = |Z^N/\Lambda_s| |\Lambda_s/\Lambda_{0s}|$, then a final $r(C_s)$ bits 122 per N dimensions select a coset of the time-zero lattice $\Lambda_{0s}$ in the selected coset of $Z^N$, which determines a point $r_j$ 124 in a predetermined fundamental region $R(\Lambda_{0s})$ of the time-zero lattice. Thus the initial constellation $C_{init}$ consists of the $|R^{-m-\mu}\Lambda_c/\Lambda_{0s}| = 2^{k(C_c)+r_c+mN/2+r(C_s)}$ points of $R^{-m-\mu}\Lambda_c + a$ that lie within $R(\Lambda_{0s})$. A sequence r 126 of such points is mapped into the sequence e 128 congruent to r mod $C_s$ that lies within the Voronoi region of $C_s$. The final constellation $C_{fin}$ is then the set of nominally $|\Lambda_c/\Lambda_s'| = 2^{k(C_c)+r_c+mN/2+r(C_s)+k_s}$ points of $\Lambda_c + a$ that lie within the Voronoi region $R_V(\Lambda_s')$ of $\Lambda_s'$. The constellation expansion ratio in N dimensions is thus $2^{r_c+k_s}$, because the system transmits $k(C_c)+mN/2+r(C_s)$ bits per N dimensions.

The constituent 2D final constellation $C_{2,fin}$ is a set of points from a coset of $\Lambda_{2c}$ that lie within the Voronoi region $R_V(\Lambda_{2s}')$ of $\Lambda_{2c}$, where $\Lambda_{2c}$ is the constituent 2D lattice of $\Lambda_c$, and $\Lambda_{2s}'$ is the constituent 2D sublattice of $\Lambda_s'$. Thus the size $|C_{2,fin}|$ of $C_{2,fin}$ is nominally $|\Lambda_{2c}/\Lambda_{2s}'| = |R^{-m-\mu_c}Z^2/R^{\mu_s}Z^2| = 2^{(m+\mu_c+\mu_s)N/2}$, where $\mu_s$ is the depth of $\Lambda_s'$. Since $k(C_c)+r(C_c) = \mu_c N/2$ and $k(C_s)+r(C_s) = \mu_s N/2$, the constellation expansion ratio in two dimensions is $2^{2r(C_c)/N} \cdot 2^{2k(C_s)/N} = 2^{\rho(C_c)} \cdot 2^{\kappa(C_s)} = CER_c(C_c) \cdot CER_s(C_s)$.

Algebraic Theory, Duality, and Error Propagation

In this section we develop elements of an algebraic theory of lattice-type trellis codes which applies to both coding and shaping operations. In both cases, we are interested in preventing unlimited error propagation at the receiver, which means that all elements of the receiver involved in the inverse map from the estimated e to the corresponding bit sequences (e.g., blocks 100, 104 of FIG. 7) should be feedbackfree. The question of when feedbackfree inverses exist is essentially algebraic.

The algebraic theory also naturally introduces notions of duality; the elements of a shaping code are inherently dual to those of a coding code.

Algebraic Theory of Convolutional Codes Trellis Constellations

A rate-$k/(k+r)$ binary convolutional code C is generated by a k input, $(k+r)$-output finite state sequential circuit, called an encoder E, that is linear over the binary field $F = GF(2)$. The inputs to such a circuit are a sequence x of binary k tuples, where x is an element of $(F^k)^\infty$ and the outputs are a sequence y of binary $(k+r)$ tuples, where y is an element of $(F^{k+r})^\infty$, called a code sequence. The code C is the set of all possible such code sequences.

Because the encoder is linear over $F = GF(2)$, it may be characterized by a k-by-$(k+r)$ generator matrix G, consisting of k generators $g_i$, $1 \leq i \leq k$. The generator $g_i$ is the output code sequence of $(k+r)$ tuples if the inputs are all-zero except for a single 1 on the $i^{th}$ input at time zero—i.e., $g_i$ is the response to a unit sequence $1 = (1,0,0 \ldots)$ on the $i^{th}$ input. Because of linearity and time-invariance, the code sequence y corresponding to any input sequence x is then $y = \Sigma_{1 \leq i \leq k} x_i g_i = xG$. (Here sequence multiplication is defined in the standard way as convolution; under this definition, $F^\infty$ is a ring, and indeed a principal ideal domain.)

Because the encoder is finite-state, the elements of G must be sequences that can be expressed as a ratio of two polynomials $a(D)/b(D)$, in D-transform notation—i.e., that are elements of the ring of rational functions F(D), where $F = GF(2)$. If all elements of G are actually polynomials—i.e., are elements of the ring of polynomials F[D]—then G is said to be polynomial, or feedbackfree.

There are two canonical forms for encoders for a given convolutional code C. A minimal encoder is one with a generator matrix G for which (a) all elements of G are polynomials;

(b) the k-by-k minors of G (determinants of all k-by-k submatrices) have no common factor;

(c) the high order coefficient matrix of G is nonsingular over GF(2).

Because a minimal encoder has a polynomial G, it has an obvious feedbackfree realization involving k shift registers of lengths $\nu_i$, $1 \leq i \leq k$, where $\nu_i$ is the degree of the generator $g_i$, namely the maximum degree of the $k+r$ polynomial elements of $g_i$. The overall constraint length is $\nu = \Sigma \nu_i$, which is also the maximum degree of any k-by-k minor of G, and the encoder has $2^\nu$ states. It can be shown that $2^\nu$ is the least number of states in any encoder that generates the code C.

A second canonical form is a systematic encoder, which is an encoder with a generator matrix G which has a k-by-k submatrix which is an identity matrix $I_k$. By permutation of the order of the outputs, such a G can be written as $G = [I_k P]$, where the k-by-r parity-check matrix P in general consists of rational functions and is not feedbackfree.

For example, a general rate-½ code C has a minimal encoder E defined by the generator matrix $G=[g_1(D), g_2(D)]$, where $g_1(D)$ and $g_2(D)$ are two polynomials with no common factor. It can be realized by a single shift register of length $\nu$, where $\nu=\max[\deg g_1(D), \deg g_2(D)]$. The corresponding systematic encoder is $G=[1,g_2(D)/g_1(D)]$, which can also be realized by a circuit with $\nu$ memory elements with feedback.

If x and y are sequences of binary n-tuples—i.e., elements of $(F^n)^\infty$—their inner product (x, y) is defined as $\Sigma_{1\leq i\leq n} x_i y_i$, which is a binary sequence—i.e., an element of $F^\infty$. Two such sequences are orthogonal if their inner product is the zero sequence. The dual code $C^\Delta$ to a rate-k/(k+r) convolutional code C is then the set of all sequences of binary (k+r)-tuples that are orthogonal to all code sequences in C.

A syndrome-former H for a rate-k/(k+r) code C is a set of r sequences of (k+r)-tuples $h_i'$, $1\leq i\leq r$, such that the inner product (y, $h_i'$) of any code sequence y in C with any of the syndrome-former sequences $h_i'$, is zero. This occurs if and only if $GH^T=0$, where the (k+r)-by-r matrix $H^T$ is the transpose of H—i.e., if and only if the k-by-r matrix of inner products $(g_i, h_i')$ is all-zero. The r-by-(k+r) matrix H is the generator matrix for a rate-r/(k+r) convolutional code which is the dual code $C^\Delta$ to C. (As an encoder, H has r inputs and k+r outputs; as a syndrome-former, $H^T$ has k+r inputs and r outputs.)

If $G=[I_k P]$ is the generator matrix of a systematic encoder for C, then $H=[P^T I_r]$ is the generator matrix of a systematic encoder for $C^\Delta$. H can also be converted to minimal (feedbackfree) form. Its r-by-r minors are identical to the k-by-k minors of and H can be realized with the same number $\nu$ of memory elements as G. (If G is the generator matrix for a rate-k/(k+1) code C, then H is the generator matrix for a code $C^\Delta$ whose rate is 1/(k+1), and its single generator h completely determines C).

For example, for a rate-½ code C, if $G=[g_1(D), g_2(D)]$, then $H=[g_2(D), g_1(D)]$ (minimal form), or $H=[g_2(D)/g_1(D), 1]$ (systematic form) [or $H=[1, g_1(D)/g_2(D)]$ (alternative systematic form)]. It is readily verified that for any of these forms $GH^T=0$. Note (from the minimal form) that the dual $C^\Delta$ of a rate-½ code C is the same code, except with the two outputs interchanged, so that rate-½ codes are effectively self-dual.

A minimal syndrome-former H can be augmented with combinational circuitry (so that there is no increase in the number of states) to become a (k+r)-input, (k+r)-output circuit, with k additional generators $(g^{-1})_i^T$, $r+1\leq i\leq k+r$, that form a k-by-(k+r) polynomial matrix $(G^{-1})^T$ such that $GG^{-1}=I_k$; i.e., the (k+r)-by-k matrix $G^{-1}$ is a right inverse for G. Furthermore, the (k+r)-by-(k+r) polynomial matrix $A=[G^{-1}H^T]$ has determinant 1, so that it is invertible, with polynomial inverse $A^{-1}=[G^T H^{-1}]^T$. (Such an invertible polynomial matrix is called a (k+r)-by-(k+r) scrambler.)

Ungerboeck Code Example

For example, the Ungerboeck 4-state 2D code $C_U$ is the mod-2 trellis code that is generated by the rate-½ 4-state convolutional code C whose generator matrix is $G=[1+D^2, 1+D+D^2]$. The minimal syndrome former for C is $H^T=[1+D+D^2, 1+D^2]^T$, and a right inverse of $G^{-1}=[D^2, 1+D+D^2]^T$. The matrix $$A = \begin{matrix} D^2 & 1+D+D^2 \\ 1+D+D^2 & 1+D^2 \end{matrix} = [G^{-1}H^T]$$

has determinant 1 and inverse $$A^{-1} = \begin{matrix} 1+D^2 & 1+D+D^2 \\ 1+D+D^2 & D^2 \end{matrix} = \begin{bmatrix} G \\ (H^{-1})^T \end{bmatrix}$$

Figure 9:
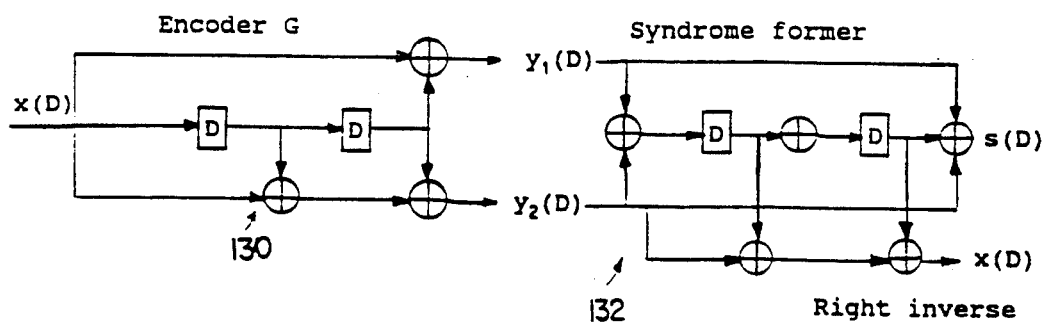
FIG. 9 is a block diagram of an encoder, syndrome former, and right inverse for the code used in the Ungerboeck 4-state, 2D trellis.

Referring to FIG. 9, encoder G 130 and the combined syndrome-former/right inverse 132 $A=[G^{-1}H^T]$ are 4-state feedbackfree circuits.

Let z be any sequence of (k+r)-tuples. Then $zA=[zG^{-1}, zH^T]=[x(z), s(z)]$ is a sequence of (k+r)-tuples composed of input k-tuples x(z) and syndrome r-tuples s(z), In turn, z can be recovered from [x(z), s(z)] by $$z=[x(z), s(z)]A^{-1}=x(z)G+s(z)(H^{-1})^T=y(z)+t(z),$$

where $y(z)=x(z)G=zG^{-1}G$ is a code sequence in C, and $t(z)=s(z)(H^{-1})^T=zH^T(H^{-1})^T=z(H^{-1}H)^T$ is a coset representative of the coset of the code C that is identified by the syndrome s(z). The (k+r)-by-(k+r) matrices $G^{-1}G$ and $(H^{-1}H)^T$ are orthogonal projection operators that project sequences in $(F^{k+r})^\infty$, regarded as a linear space (free $F^\infty$-module) of dimension k+r over the ring $F^\infty$, onto orthogonal linear subspaces of dimensions k and r, respectively. This is a coset decomposition $(F^{k+r})^\infty = C+[(F^{k+r})^\infty/C]$ in which the set of $[(F^{k+r})^\infty/C]$ of coset representatives t(z) is itself a linear subspace of $(F^{k+r})^\infty$.

For example, for the 4-state rate-½ Ungerboeck example code, $G = [1+D^2, 1+D+D^2];$
$H = [1+D+D^2, 1+D^2];$
$H^{-1} = [1+D+D^2, D^2]^T;$
$G^{-1} = [D^2, 1+D+D^2]^T;$ $$G^{-1}G = \begin{matrix} D^2+D^4 & D^2+D^3+D^4 \\ 1+D+D^3+D^4 & 1+D^2+D^4 \end{matrix};$$

$$(H^{-1}H)^T = \begin{matrix} 1+D^2+D^4 & D^2+D^3+D^4 \\ 1+D+D^3+D^4 & D^2+D^4 \end{matrix}$$

Note that both $G^{-1}G$ and $(H^{-1}H)^T$ have rank 1, and that $G^{-1}G + (H^{-1}H)^T = I_2$.

Because a convolutional code C is a group under sequence addition over F, we may define two binary (k+r)-tuple sequences as congruent mod C if their difference is an element of the convolutional code C, and the cosets of a convolutional code C as the sets of congruence classes mod C. It is easy to see that a coset of C is the set of binary (k+r)-tuple sequences z such that $zH^T=s$, where s is a given r-tuple sequence, called the syndrome sequence. If $t=s(H^{-1})^T$, then from the above, the (k+r)-tuple sequence t is a coset representative sequence for the coset C+t that is associated with the syndrome sequence s. The r by-(k+r) matrix $(H^{-1})^T$ may therefore be used to specify a coset representative generator circuit, which, given a syndrome sequence s, generates a corresponding coset representative sequence t.

For the example code, $(H^{-1})^T = [1+D+D^2, D^2]$ is such a coset representative generator circuit. If we do not care about feedback, then we may also consider the circuits $[1/(1+D+D^2), 0]$ or $[0, 1/(1+D^2)]$ as coset representative generator circuits $(H^{-1})^T$, since the transpose of either of these matrices is a right inverse for $H=[1+D+D^2, 1+D^2]$; then the elements $t_j$ of the coset representative sequence $t$ are always in the set $\{[0, 0], [1, 0]\}$ or the set $\{[0, 0], [0, 1]\}$, respectively. Thus by 'precoding' the syndrome sequence $s$ by multiplication by $1/(1+D+D^2)$ or $1/(1+D^2)$, we obtain a sequence $t$ of coset representatives that is always one of a set of coset representatives for the time-zero block code $C_0$, which in this case is the (2,1) repetition code.

In general, by use of a linear transformation involving feedback, the elements $t_j$ can always be confined to a set of $2^r$ coset representatives for the time zero code $C_0$ in the set of all binary $(k+r)$-tuples. (Proof: at least one of the r-by-r submatrices of H is invertible, since the greatest common divisor of the r-by-r minors of a minimal encoder H is 1; the inverse of this matrix can be used as the precoder.)

Algebraic Theory of Mod-2 Trellis Codes

Since mod-2 trellis codes are isomorphic to convolutional codes, their algebraic theory is essentially the same as that of convolutional codes.

Specifically, we have noted that a mod-2 trellis code C can always be regarded as being based on the lattice partition $\Lambda/\Lambda' = Z^N/2Z^N$, and may be defined as the set of all integer N-tuple sequences $c$ that are congruent mod 2 to code sequences $y$ in some rate-k/N convolutional code C, so we may denote C as $C(Z^N/2Z^N; C)$.

The theory of the previous section then follows unchanged. A minor modification must be made in the definitions of inner product, orthogonality, and duality so as to apply to integer sequences rather than binary sequences, but as we shall now show, the required change does not affect the isomorphism.

If $x$ and $y$ are sequences of real N-tuples—i.e., elements of $(R^N)^\infty$—their inner product $(x, y)$ is defined as the real sequence $\Sigma_{1 \leq i \leq N} x_i y_i$, an element of $R^\infty$. If $x$ and $y$ are sequences of integer N-tuples, then their inner product $(x, y)$ is an integer sequence. Two sequences are strictly orthogonal only if their inner product is the zero sequence. However, they are said to be orthogonal mod-2 if their inner product is any even integer sequence—i.e., an element of $(2Z)^\infty$.

The dual trellis code $C^\Delta$ to a mod-2 trellis code C may then be defined as the set of all sequences of real N-tuples that are orthogonal mod 2 to all code sequences in C. As a trivial example, if C is the set $(Z^N)^\infty$ of all sequences of integer N-tuples, then $C^\Delta$ is $(2Z^N)^\infty$, and vice versa. Since every mod-2 trellis code C includes the set $(2Z^N)^\infty$, its dual $C^\Delta$ must be a subset of $(Z^N)^\infty$, since $(2Z^N)^\infty$ is orthogonal mod 2 to any integer sequence, the dual $C^\Delta$ must include $(2Z^N)^\infty$.

It is easy to see that if C is generated by the rate-k/N code C, then $C^\Delta$ is the mod-2 trellis code that is generated by the dual rate-r/N code $C^\Delta$ to C, where $r = N - k$. First, as we have just seen, $C^\Delta$ must be a set of integer N-tuple sequences. Second, if $c$ is a sequence in C that is congruent mod 2 to a sequence $y$ in C, let $d$ then be any sequence of integer N-tuples, and let $z$ be the sequence of binary N-tuples to which $d$ is congruent mod 2. Then the inner product $(c, d)$ is congruent mod 2 to the inner product $(y, z)$, which is the all-zero sequence if and only if $z$ is a sequence in the dual code $C^\Delta$. Thus (c,d) is an element of $(2Z)^\infty$ if and only if $d$ is in the mod-2 trellis code generated by $C^\Delta$, namely $C^\Delta$, QED.

A mod-2 trellis code C is a group under real sequence addition, and its cosets are the sets of congruence classes mod C. If $r$ is any sequence of real N-tuples with elements $r_j$ which are elements of $R^N$, then there is a unique sequence $z$ of binary N-tuples with elements $z_j$ in $\{0, 1\}$ and a unique sequence $f$ of fractional N-tuples with elements $f_j$ in $[0, 1)$ such that $r$ is congruent to $z + f$ mod 2. A coset of C may then be specified by a binary r-tuple syndrome sequence $s$ and a fractional sequence $f$, and consists of all $r$ congruent to $z + f$ mod 2 such that $zH^T = s$, where $H^T$ is a syndrome-former for the code C that generates C. For if $r$ is any such sequence and $c$ is any sequence in C that is congruent mod 2 to a code sequence $y$ in C, then $r+c$ is congruent to $(z+y)+f$ mod 2, where the sequence $z$ and $y$ may be added modulo 2, and since $z+y$ is a binary N-tuple sequence in the same coset of C as $z$, it has the same syndrome sequence $(z+y)H^T = zH^T = s$.

Generation of Trellis Constellations Based on Mod-2 Trellis Codes

It follows that a trellis constellation based on a mod-2 trellis code $C(Z^N/2Z^N; C)$ may be generated as follows.

First, let $\Lambda$ be a binary lattice which is a superlattice of $Z^N$—e.g., $2^{-m}Z^N$ or $R^{-m}Z^N$, for $m \geq 0$. If $|\Lambda/Z^N|$ is the order of the partition $|\Lambda/Z^N|$, then there are $[\Lambda/Z^N]$ elements of any coset $\Lambda+a$ of $\Lambda$ in any fundamental region of $Z^N$, and in particular in the half open N-cube $[0,1)^N$. A functional sequence $f$ may then be specified by a sequence of binary ($\log_2 [\Lambda/Z^N]$)-tuples—i.e., by $\log_2 [\Lambda/Z^N]$ bits per N dimensions.

Second, a syndrome sequence $s$ may be specified as a sequence of binary r-tuples, where $r = N-k$ is the redundancy of the rate-k/N convolutional code C. The syndrome sequence $s$ may be converted to a coset representative sequence $t = s(H^{-1})^T$ by an r-input, N-output coset representative generator circuit $(H^{-1})^T$, where the N-by-r matrix $H^{-1}$ is a right inverse to an r-by-N minimal generator matrix H of the dual rate-r/N code $C^\Delta$ to C. (If desired, all but r of these outputs may be constrained to zero.)

Figure 10:
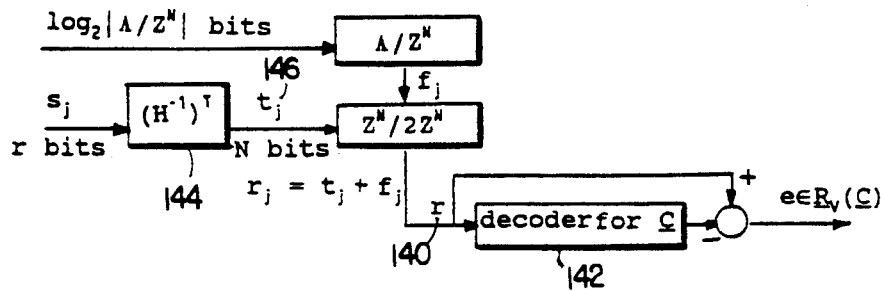
FIG. 10 is a block diagram illustrating the generation of a trellis constellation based on a mod-2 trellis code.

Referring to FIG. 10, the sequence $r = t + f$ 140, with $t$ now regarded as a sequence of integer N-tuples, is then a coset representative for a coset of the trellis code C. A minimum-distance decoder 142 for C can then find the sequence $e$ of least average power that is congruent to $r$ mod C, as we have seen before.

If we are not concerned about feedback (and there is no reason that we should be in the transmitter), then $(H^{-1})^T$ 144 can be chosen so that the output N-tuples $t_j$ 146 of the coset representative generator circuit are coset representatives for the $2^r$ cosets of the time-zero code $C_0$ in the set (N, N) of all binary N-tuples, and thus, as integer N-tuples, also coset representatives for the $2^r$ cosets of the time zero lattice $\Lambda_0$ in $Z^N$, rather than cosets of $\Lambda'$ (as shown in FIG. 10).

Figure 11:
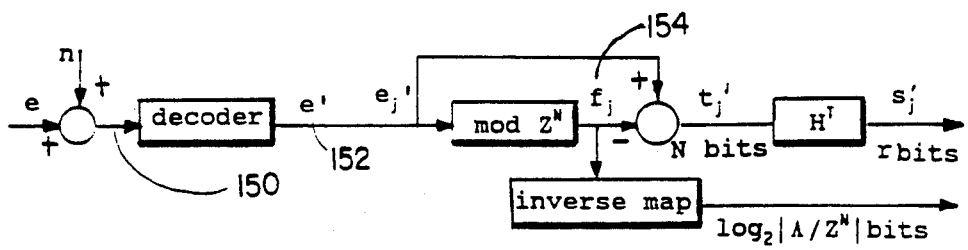
FIG. 11 is a block diagram of a receiver for the FIG. 10 constellation.

Referring to FIG. 11, let $e + n$ be the received sequence 150, where $n$ is a noise sequence introduced by the communications channel. The receiver first generates an estimated sequence $e'$ 152, which in the absence of coding may simply be the result of a symbol-by-symbol decision as to which element of $\Lambda + a$ is closest to each received N-tuple $e_j + n_j$. Given adequate signal-to noise margin, most of these symbol decisions will be correct, but we must assume that there will occasionally be an error. Therefore the receiver must be able to recover the original bit sequences in such a way that (a) if e'=e, then the correct bit sequences are recovered: (b) if $e'_j$ is not equal to $e_j$ only for a single symbol, or more generally only for a short time, then the correct bit sequences are recovered except for a short time starting at the time of first error. In other words, error propagation must be limited.

As noted above, the sequence of elements of e mod $Z^N$ is the same as that of r, namely the fractional sequence f. Therefore we may recover the elements of f by the symbol-by-symbol operation $f_j'=e_j'$ mod $Z^N$ 154; i.e., by taking the fractional parts of the estimated sequence e'. In turn, each $f_j'$ determines a corresponding binary ($\log_2 [\Lambda/Z^N]$)-tuple. There can be errors in $f_j'$ only where there are errors in $e_j'$, so error propagation is totally absent.

The sequence t' of integer parts $t_j'=e_j'-f_j'$ of the received sequence e' may be passed through a syndrome-former $H^T$ to form an estimated syndrome sequence $s'=t'H^T$, whose elements $s_j$ are binary r tuples that are estimates of the corresponding input r-tuples $s_j$. If H is chosen to be feedbackfree, as is always possible, then a brief run of errors in $e_j'$ and thus possibly $t_j'$ can lead only to a somewhat longer run of errors in $s_j'$. In fact, errors in $s_j$ can occur only for $\delta$ = max deg $h_{ij}$(D) time units after the last error in $e_j'$, where $\delta$ is the maximum degree of any polynomial in the r-by-N matrix H. Thus some error propagation may occur, but it is strictly limited.

Construction for Lattice-Type Trellis Codes with Trellis Constellations

We are now able to show a construction that combines a lattice-type trellis code $C_c$ used for coding with a mod-2 trellis code $C_s$ used for shaping. The construction is completely symmetrical, and nicely illustrates the duality between coding and shaping.

Figure 12:
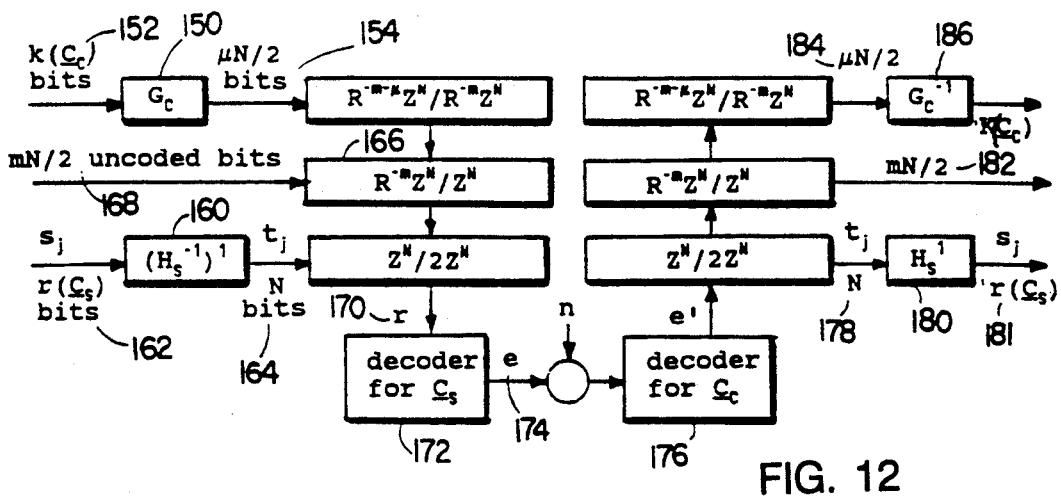
FIG. 12 is a block diagram of a general construction for a modulation system with both coding and shaping.

Referring to FIG. 12, assume that the code $C_c$ is based on a partition $\Lambda_c/\Lambda_c'$ of binary N-dimensional lattices, where N is even, the order of the partition is $|\Lambda_c/\Lambda_c'|2^{k_c+r_c}$, and the depth of the lattice $\Lambda_c'$ is $\mu_c$ (called simply $\mu$ in this section). The code $C_c$ is scaled by $R^{-m-\mu}$, where $m \geq 0$, so that $R^{-m}Z^N$ is a sublattice of $R^{-m}\Lambda_c'$ of order $2^{k(\Lambda_c')}$, where $k(\Lambda_c')$ is the informativity of $\Lambda_c'$. The $(k_c+r_c)$-bit labels for the cosets of $\Lambda_c'$ in $\Lambda_c$ are generated by a rate-$k_c/(k_c+r_c)$ encoder $E_c$ for the code $C_c$ with generator matrix $G_c$ 150. Since $\Lambda_c$ and $\Lambda_c'$ are binary lattices, we may if we like take $\Lambda_c$ as $R^{-m-\mu}Z^N$ and $\Lambda_c'$ as $R^{-m}Z^N$, in which case the encoder has $k_c+k(\Lambda_c')=k(C_c)$ inputs 152 and $k_c+r_c+k(\Lambda_c')+r(\Lambda_c)=\mu N/2$ outputs.

The code $C_s$ is based on a partition $\Lambda_s/\Lambda_s'$ of mod-2 N-dimensional lattices, where the order of the partition is $|\Lambda_s/\Lambda_s'|=2^{k_s+r_s}$, the depth of the lattice $\Lambda_s'$ is $\mu_s=2$, and the order of the partition $|Z/\Lambda_s]$ is $2^{r(\Lambda_s)}$, where $r(\Lambda_s)$ is the redundancy of $\Lambda_s$. The $(k_s+r_s)$-bit labels for the cosets of $\Lambda_s'$ in $\Lambda_s$ are generated by a rate-$r_s/(k_s+r_s)$ coset representative label generator with generator matrix $(H_s^{-1})^T$ 160. Since $\Lambda_s$ and $\Lambda_s'$ are mod-2 lattices, we may if we like take $\Lambda_s$ as $Z^N$ and $\Lambda_s'$ as $2Z^N$, in which case the coset representative label generator has $r_s+r(\Lambda_s)=r(C_s)$ inputs 162 and $k_s+r_s+k(\Lambda_s)+r(\Lambda_s)=N$ outputs 164.

The central (scaling) section 166 merely uses mN/2 uncoded bits 168 to identify a coset of $Z^N$ in $R^{-m}Z^N$, where m may be any non-negative integer.

Thus a total of $k(C_c)+mN/2+r(C_s)$ bits enter the system per N dimensions and are converted into a sequence of multi-part labels that specify a sequence of cosets of $2Z^N$ in $R^{-m-\mu}Z^N$, or equivalently a coset representative sequence r 170, where each $r_j$ is an element of a set of $2^{m+\mu+2}$ coset representatives for the cosets of $2Z^N$ in $R^{-m-\mu}Z^N$. A decoder for $C_s$ 172 then finds the sequence e 174 of least average power in the set of sequences that are congruent to r mod $C_s$.

At the receiver, a decoder for $C_c$ 176 operates on $e+n$, where n is an additive white Gaussian noise sequence, to find the closest code sequence e' in $C_c$. The components of $e_j$ of e' then determine the coset representative sequence r'. The components $r_j'$ of r' may be mapped back into corresponding multi-part labels, which comprise estimates of the various bit sequences at the transmitter. The sequence t' 178 of binary N-tuples representing cosets of $2Z^N$ in $Z^N$ is passed through a feedbackfree syndrome-former $H_s^T$ 180 to form a sequence $s'=t'H_s^T$ of estimated syndrome $r(C_s)$-tuples 181. The sequence of (mN/2)-tuples representing cosets of $Z^N$ in $R^{-m}Z^N$ is taken directly as a estimate of the corresponding input (mN/2)-tuples 182. And the sequence of binary ($\mu N/2$) tuples 184 representing cosets of $R^{-m}Z^N$ in $R^{-m-\mu}Z^N$ is passed through a feedback-free right inverse $G_c^{-1}$ 186 to form a sequence of estimated information $k(C_c)$-tuples. Because all maps at the receiver are feedbackfree, error propagation is limited.

This picture shows that coding with $C_c$ and shaping with $C_s$ are dual in many ways. The encoder $G_c$ in the transmitter has $k(C_c)$ inputs; the encoder $H_s^T$ for the dual code $C^\Delta$ is used in the receiver as a syndrome former with $r(C_s)$ outputs. (The informativity k(C) and redundancy r(C) of a code C are dual quantities.) The corresponding right inverses $G_c^{-1}$ and $(H_s^{-1})^T$ are similarly in dual positions, with $(H_s^{-1})^T$ used as a $r(C_s)$-input coset representative sequence generator. Correspondingly the constellation expansion ratios in two dimensions due to coding and shaping are $CER_c(C_c)=2^{\rho(C_c)}$ and $CER_s(C_s)=2^{\kappa(C_s)}$, respectively. The main complexity of the coding and shaping operations lies in the decoder for $C_c$ and the decoder for $C_s$, respectively, which operate respectively on the output of the transmitter and the input to the receiver. Apart from the fact that we have restricted the shaping code $C_s$ to be linear, therefore, we have a completely symmetrical and dual picture.

Wei Code Example of Combined Coding and Shaping in Four Dimensions

The Wei 4D codes (Wei, "Trellis-Coded Modulation with Multidimensional Constellations," IEEE Trans. Inform. Theory, Vol. IT-33, pp. 483-501, 1987) have good practical characteristics. In particular, there are 8-state and 16-state codes based on the partition $Z^4/RD_4$ and rate-$\frac{2}{3}$ convolutional encoders that achieve $d_{min}^2=4$ with only one redundant bit per four dimensions, so that the normalized redundancy $\rho$ is $\frac{1}{2}$, and a nominal (fundamental) coding gain of $\gamma_c=2^{-\rho}d_{min}^2=2^{3/2}$ (4.52 dB) is obtained with a coding constellation expansion ratio of only $CER_c=2^\rho=2^{\frac{1}{2}}=1.414$. The 16-state code has a normalized error coefficient of only $N_0=12$, whereas the 8-state code has $N_0=44$. These codes are mod-2 (and depth-2) codes and may equivalently be regarded as being based on the partition $Z^4/2Z^4$ with augmented rate-$\frac{2}{3}$ convolutional codes C.

The duals to the Wei codes are good candidates for shaping codes. The dual Wei 4D codes may be regarded as being based on the partition $Z^4/2Z^4$ with rate-$\frac{1}{3}$ convolutional codes $C^\Delta$ with the same number of states as their dual rate-$\frac{3}{4}$ codes C. Their normalized informativity $\kappa$ is $\frac{1}{2}$, and thus their shaping constellation expansion ratio is $CER_s = 2^\kappa = 2^{\frac{1}{2}} = 1.414$.

Figure 13:
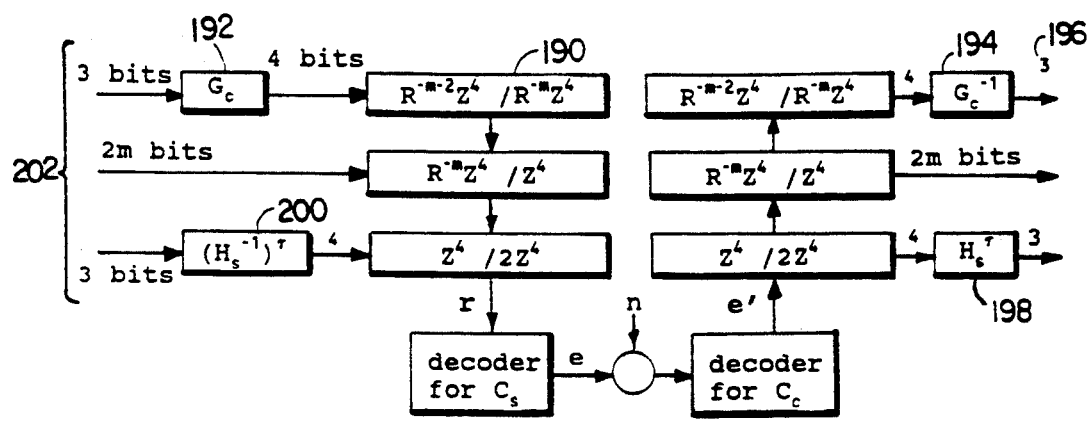
FIG. 13 is a Wei code embodiment of FIG. 12.

Referring to FIG. 13, Wei code $C_c$ for coding is scaled by $R^{-m-2}$ so that it is based on the partition $R^{-m-2}Z^4/R^{-m}Z^4$ 190. The rate-$\frac{3}{4}$ binary encoder $G_c$ for C 192 is used in the transmitter for encoding, and a feedbackfree 4×3 right inverse $G_c^{-1}$ 194 is used in the receiver to recover the input information 3-tuples 196. The 4×3 syndrome-former $H_s^T$ for the dual code $C^\Delta$ 198 is the transpose of a minimal encoder $G_c$ for its dual C, and the 3×4 coset representative generator $(H_s^{-1})^T$ 200 is the transpose of a corresponding right inverse $G_c^{-1}$ (though it need not be feedbackfree). The total number of bits 202 transmitted is $2m+6$ per four dimensions, or $m+3$ bits per two dimensions, so that any integer number of bits per two dimensions (not less than three) may be transmitted. The final constellation (in two dimensions) consists of the nominally $2m+4$ points of a translate of $R^{-m-2}Z^2$ that lie in the Voronoi region of $2Z^2$, and the total constellation expansion ratio is thus only 2, of which $2^{\frac{1}{2}}$ is due to coding and $2^{\frac{1}{2}}$ to shaping. (This compares to a ratio of 4 in the 2D Ungerboeck example.)

Minimal rate-$\frac{3}{4}$ generator matrices $G_c$ and right inverses $G_c^{-1}$ for the 8-state and 16-state Wei codes C are shown in FIGS. 14 and 15. The transposes of these matrices are syndrome former matrices $H_s^T$ and coset representative generator matrices $(H_s^{-1})^T$ for the dual Wei codes $C^\Delta$. For reference, the minimal rate-$\frac{1}{4}$ generator matrix $G_s = H_c$ of the dual code $C^\Delta$ and a feedbackfree right inverse $G_s^{-1} = H_c^{-1}$ are also given for each case.

For both of these examples, the code C generated by $G_c$ has Hamming distance $d_H = 4$. The final generator ([1111]) has no memory and serves simply to select one of the two cosets of $2Z^N$ in $RD_4$ (by selecting one of the two codewords of the (4,1) repetition code). The 8-state code has 5 weight-4 words, one of length 1 ([1111]) and four of length 2 ([1100,1010] and their complements); the 16-state code has one weight-4 word ([1111]). For both, the time-zero block code is the (4,3) single-parity-check code. In both cases, the code $C^\Delta$ generated by $H_c$ has the (4,1) code as its time-zero block code, and all 4-tuples are in the (4,3) single parity check code (so all selected integer 4-tuples are in $D_4$).

By simulation, we have determined that the 8-state dual Wei code achieves about 0.90 dB shape gain for M=7 (a decoding window of 16 QAM symbols), and 1.05 dB as M approaches infinity, better asymptotically than the 4-state Ungerboeck code, and with much reduced constellation expansion. The 16-state Wei code achieves 1.10 dB as $M \to \infty$.

Coding Gain of Wei Code Example

The normalized redundancy of the coding code is $r'(C_c) = \frac{1}{2}$, so the coding constellation expansion ratio is $CER_c(C_c) = 2^{\frac{1}{2}} = 1.414$. The normalized informativity of the shaping code is $k(C_s) = \frac{1}{2}$, so the shaping constellation expansion ratio is $CER_s(C_s) = 2^{\frac{1}{2}} = 1.414$. As previously noted, simulations have shown that the shape gain of this code exceeds 1.0 dB as the shaping decoding delay M becomes large.

The combined effects of coding and shaping yield a total constellation expansion ratio of $CER_s(C_s) \cdot CER_c(C_c) = 2$. The nominal coding gain of this code is $2^{3/2}$ (4.52 dB), and its effective coding gain is about 4.2 dB, since its normalized error coefficient is 12. Thus, the total coding gain due to the code and the constellation is about 5.2 dB.

Constellation Boundary Constraints

In most practical applications, it is desirable to keep the final constellation size small and the constellation boundary circular in order to reduce the peak-to-average ratio (PAR). This will improve the performance against impairments such as nonlinear distortion or phase jitter.

In trellis shaping using trellis codes that are based on partitions of binary lattices, the elements $e_j$ of the transmitted sequence belong to a 2D constellation that lies within a square boundary. Trellis shaping expands the size of the 2D constellation a factor of $2^{k(C_s)}$. It is possible to reduce the constellation expansion, and obtain a more circular boundary by applying constraints to the decoder 46 (FIG. 4). For example, the decoder can be constrained in such a way that it only selects code sequences c (from the shaping code $C_s$) which result in transmitted sequences $e = r - c$ whose elements $e_j = r_j - c_j$ have magnitudes no greater than some predetermined radius $R_c$; i.e., $|e_j| = r_j - c_j| \leq R_c$. When $R_c$ is reasonably large (e.g., $R_c$ is large enough that for every state at least one branch is always allowed), the decoder can proceed without violating the constraint. However, if $R_c$ is too small, it may be forced to select a code sequence that does not satisfy this constraint.

This type of constraint can be incorporated into a Viterbi-type decoder very easily by deemphasizing those branches of the trellis whose minimum mean-squared error (MSE) metrics exceed $R_c^2$, by multiplying them with an appropriately chosen number Q. The larger Q gets, the harder the constraint becomes. This reduces the probability of choosing points lying outside the constraint circle. When Q is sufficiently large, and $R_c$ is not very small, points outside the constraint circle will never be selected. Note that if $R_c$ is too small, one should not disallow branches, because this may force the decoder to choose an illegal sequence as a code sequence, and then the initial sequence r cannot be correctly recovered in the receiver.

When the transmitted sequence e is filtered before transmission over the channel, it may be beneficial to apply the constraint in higher dimensions (on groups of successive elements of the sequence e), in order to minimize the PAR after the filtering.

For example, the constraint may be applied four dimensionally. This can be incorporated into the decoder (for decoding the 8-state dual Wei code) as follows: First, compute 4D branch metrics as usual based on mean-squared error; then compare these against the threshold $R_c^2$. Branch metrics which exceed the threshold are multiplied by some factor Q (typically a power of 2) to deemphasize the associated branches. When Q is sufficiently large, the decoder will avoid selecting these branches, unless it is forced to do so (that is, all paths have been deemphasized). Again, if $R_c^2$ is large enough that for every state at least one branch is allowed, for large enough Q, the decoder will never pick two successive symbols $e_{2j}$ and $e_{2j+1}$ with total energy greater than $R_c^2$; i.e., $|e_{2j}|^2 + |e_{2j+1}|^2 \leq R_c^2$.

Modem Implementation of 8-state 4D Dual Wei Code

We now show how to use a four-dimensional 16-state Wei code for coding (denoted as $C_c$) and a four-dimensional 8-state dual Wei code for shaping (denoted as $C_s$)

and send 7 bits per two dimensions. The code $C_s$ is based on a rate-$\frac{1}{4}$ convolutional encoder and the partition $Z^4/2Z^4$. It has the time zero lattice $\Lambda_0=RD_4$. The code $C_c$ is based on a rate-$\frac{3}{4}$ convolutional encoder and it is scaled such that it uses the partition $2^{-3}Z^4/2^{-2}Z^4$. It adds one redundant bit every four dimensions. Note that a fundamental region of the time-zero lattice $RD_4$ of $C_s$ will contain exactly $2^{2\times7+1}$ points from any coset of the scaled lattice $2^{-3}Z^4$; i.e., $|2^{-3}Z^4/RD_4|=2^{15}$.

Referring to FIG. 17, in a modem transmitter 210, in each (2D) signaling interval a scrambler 236 receives 7 bits from a data terminal equipment (DTE) 238. The scrambled bits are delivered to a binary encoder 240 in groups of fourteen so-called I-bits 242, labeled I6(2j) through I0(2j) and I6(2j+1) through I0(2j+1), at two successive times 2j and 2j+1.

Referring to FIG. 18, the I-bits I2(2j)I1(2j) are taken to represent an integer mod 4 and differentially encoded by a coding differential encoder 244 to produce two differentially encoded bits ID2(2j)ID1(2j) according to the relation ID2(2j)ID1(2j)=I2(2j)I1(2j)+$_4$ ID2(2j−2)ID1(2j−2) where +$_4$ represents mod-4 addition.

The bits ID1(2j) and I0(2j) enter a rate-$\frac{2}{3}$ binary convolutional encoder 246, which produces a redundant bit Y0(2j). Referring to FIG. 19, encoder 246 includes a sequential circuit having four delay-2 shift registers 248 and three mod-2 adders 250. This encoder can also be realized using other circuits.

Referring again to FIG. 18, the bits ID2(2j)ID1(2j)I0(2j) and the redundant bit Y0(2j) enter a bit converter 252 that generates four output bits Z1(2j)Z0(2j)Z1(2j+1)Z0(2j+1) according to the following table:

Referring to FIG. 20, the I-bits I2(2j+1)I1(2j+1)I0(2j+1) enter a rate-$\frac{3}{4}$ inverse syndrome former $(H^{-1})^T$ 254 which produces two pairs of S-bits; S1(2j)S0(2j) and S1(2j+1)S0(2j+1). As discussed earlier, $(H^{-1})^T$ is included to limit error propagation.

The 16 bits generated in this manner are mapped into two initial signal points r(2j) and r(2j+1) chosen from a 256-point two-dimensional square signal set which lies on the grid $2^{-3}Z^2+(2^{-4},2^{-4})$. First, the six-tuple Z bits are used to select a signal point from the 64-point quadrant-1 signal constellation shown in FIG. 21. This signal set is divided into four subsets (262, 264, 266, 268) which are cosets of $2^{-2}Z^2$. These are indicated by different shadings in FIG. 21. The signal points are labeled such that Z1 and Z0 select one of the cosets according to the labeling shown in the lower left corner of FIG. 21. The labeling of the remaining bits Z5Z4Z3Z2 is shown only for coset 262. For other cosets, the labeling can be obtained from the rule that 90 degree rotation of a point around the center ($\frac{1}{2}$, $\frac{1}{2}$) of the quadrant-1 signal points results in the same labeling.

The Wei encoder ensures that the minimum distance between allowable sequences of quadrant-1 points is kept large.

The S-bits S1S0 determine the final quadrant of the initial point according to the rule:

| S1S0 | Quadrant |
| --- | --- |
| 00 | 1 |
| 01 | 4 |
| 10 | 2 |
| 11 | 3 |

| ID2(2j) | ID1(2j) | I0(2j) | Y0(2j) | Z1(2j + 1) | Z0(2j + 1) | Z1(2j) | Z0(2j) |
| --- | --- | --- | --- | --- | --- | --- | --- |
| 0 | 0 | 0 | 0 | 0 | 0 | 0 | 0 |
| 0 | 0 | 0 | 1 | 1 | 0 | 0 | 0 |
| 0 | 0 | 1 | 0 | 0 | 1 | 0 | 0 |
| 0 | 0 | 1 | 1 | 1 | 1 | 0 | 0 |
| 0 | 1 | 0 | 0 | 1 | 0 | 1 | 0 |
| 0 | 1 | 0 | 1 | 0 | 1 | 1 | 0 |
| 0 | 1 | 1 | 0 | 1 | 1 | 1 | 0 |
| 0 | 1 | 1 | 1 | 0 | 0 | 1 | 0 |
| 1 | 0 | 0 | 0 | 0 | 1 | 0 | 1 |
| 1 | 0 | 0 | 1 | 1 | 1 | 0 | 1 |
| 1 | 0 | 1 | 0 | 0 | 0 | 0 | 1 |
| 1 | 0 | 1 | 1 | 1 | 0 | 0 | 1 |
| 1 | 1 | 0 | 0 | 1 | 1 | 1 | 1 |
| 1 | 1 | 0 | 1 | 0 | 0 | 1 | 1 |
| 1 | 1 | 1 | 0 | 1 | 0 | 1 | 1 |
| 1 | 1 | 1 | 1 | 0 | 1 | 1 | 1 |

These output bits will be used to select one of 16 cosets of $2^{-2}Z^4$ whose union is the four-dimensional grid $2^{-3}Z^4+(2^{-4},2^{-4},2^{-4},2^{-4})$. Each such coset can be represented by a pair of cosets of $2^{-2}Z^2$ in the two-dimensional grid $2^{-3}Z^2+(2^{-4},2^{-4})$. These will be determined independently by Z1(2j)Z0(2j) and Z1(2j+1)Z0(2j+1). Note that the differential encoder 244, encoder circuitry 246, and the bit converter 252 together form the rate $\frac{3}{4}$ binary encoder $G_c$ 192 of FIG. 13.

The remaining I-bits I3(2j) through I6(2j) pass through unchanged, are relabeled as Z2(2j) through Z5(2j) and are combined with Z1(2j)Z0(2j) to form the six-tuple Z5(2j) ... Z1(2j)Z0(2j). Similarly, the I-bits I3(2j+1) through I6(2j+1) together with Z1(2j+1)Z0(2j+1) form the six-tuple Z5(2j+1) ... Z1(2j+1)Z0(2j+1).

Referring to FIG. 22, the signal points in quadrant 1 272 are moved to the quadrant chosen by the S-bits such that they remain in the same coset of $Z^2$. This is done by offseting the quadrant-1 point by (0,0), (0,−1), (−1,−1) or (−1,0). It follows that the translated final point is in the same coset of $2^{-2}Z^2$ as the quadrant-1 point. Therefore, the minimum distance between allowable sequences remains unchanged. The signal points obtained in this manner form the initial point sequence r.

Referring to FIG. 23, the sequence r is transformed into the transmitted sequence e by the decoder 294. To understand the function of the decoder 294, we must first consider the shaping code $C_s$. All possible sequences in this code are described by the trellis diagram of FIG. 24.

In FIG. 22, the code symbols chosen from the two-dimensional lattice $Z^2$ are indicated by squares, and only nine symbols are shown since others are irrelevant. These symbols are partitioned into four subsets which correspond to the (four) cosets of $2Z^2$ in $Z^2$ and are labeled as A, B, C and D as shown in the lower-left corner of FIG. 22.

Referring to FIG. 24, from any state there are two branches, each branch representing two two-dimensional cosets. For example, state 0 has two branches labeled A, A and B, B. Each pair of such cosets represents a coset of $2Z^4$ in $Z^4$. The decoder in FIG. 23 determines, via the Viterbi algorithm, the allowable code sequence c which is closest in the sense of squared Euclidean distance to the sequence r of initial signal points. The decoder operates recursively and in synchronism such that every two signaling intervals (or for every recursion) it releases two delayed decisions $c(2j-2M)$ and $c(2j+1-2M)$, where 2M is the decoding delay measured in number of signaling intervals.

The operation of the Viterbi algorithm is well-known. Here, it is slightly enhanced to insure that the computed code sequence c is indeed an allowable sequence from $C_s$, because otherwise the transmitted sequence cannot be correctly recovered. In each recursion, the Viterbi algorithm determines the most likely path and traces it back for 2M signaling intervals to determine the delayed code symbols which in turn correspond to a state-transition from some state u to state v, for example The enhanced Viterbi algorithm traces back other paths as well, to determine whether they also end with a state transition that goes to state v. A very large metric is assigned to those paths which do not satisfy this requirement. This insures that they will not become the most likely path in the next recursion and guarantees that only allowable code sequences are selected. The enhanced VA may be further modified to include constellation constraints.

Referring to FIG. 17, the error sequence $e=r-c$ is computed by a subtractor 241 and passed to a QAM modulator 243. The resulting pairs of successive QAM symbols are filtered by a transmit filter 245, and transmitted to a channel 247. Note that the elements $e(2j)$ and $e(2j+1)$ of the error sequence lie in the same coset of $Z^4$, and thus the same coset of $2^{-2}Z^4$, in $2^{-3}Z^4$, as the initial points $r(2j)$ and $r(2j+1)$. Therefore, the minimum distance between possible error sequences is the same as the minimum distance between initial sequences, but the required average power is reduced as explained earlier. Also note that the elements of the error sequence belong to the 256-point square signal set lying on the grid $2^{-3}Z^2+(2^{-4},2^{-4})$.

Referring to FIG. 25, in the receiver 281, a received signal 283 is passed through an equalizer 277, and then demodulated 279 to give the received sequence z 280 which approximately corresponds to the transmitted error sequence corrupted by noise. First, an estimate of the error sequence e' 278 is obtained by using a Viterbi algorithm decoder 281 for the 16-state Wei code $C_c$. This decoder is well-known; of course, it may take into account the square boundaries of the 256-point constellation from which the transmitted signal points are chosen.

Suppose $e'(2j)$ and $e'(2j+1)$ are the two estimates generated by the Viterbi decoder after a recursion. The decisions on the transmitted I-bits can be obtained from these as follows: First, to obtain the Z-bits, $e'(2j)$ and $e'(2j+1)$ are translated into quadrant 1, in such a way that they remain in the same coset of $Z^2$. Then, the Z-bits can be extracted using an inverse mapping in quadrant 1.

To obtain the S bits, we first label the quadrants (as before) according to

| Quadrant | SQ1SQ0 |
|---|---|
| 1 | 00 |
| 2 | 10 |
| 3 | 11 |
| 4 | 01 |

Then, we obtain two quadrant labels $SQ1(2j)SQ0(2j)$ and $SQ1(2j+1)SQ0(2j+1)$. It is easy to show that $SQ1(i)SQ0(i)=S1(i)S0(i)+_2B1(i)B0(i)$, where $i=2j$ or $2j+1$ and $+_2$ represents an exclusive-or operation. $B1(i)B0(i)$ represent a binary two-tuple corresponding to the two-dimensional coset (A=00, B=11, C=01 or D=10) of $2Z^2$ for the shaping code symbol c(i) chosen by the decoder for $C_s$; recall that $e(i)=r(i)-c(i)$. Referring to FIGS. 26 and 27, the labels $SQ1(i)SQ0(i)$ are then passed through a feedback-free rate-4/3 syndrome-former $H^T$ 256. The syndrome former has the property that any allowable sequence of coset labels $B1(i)B0(i)$ will produce an all-zero sequence at its output. Furthermore, $(H^{-1})^T H^T = I$, the identity matrix. Therefore, a sequence which first passes through $(H^{-1})^T$ and then through $H^T$ will be unchanged. Thus, at the output of the syndrome former we correctly obtain the transmitted bits $I2(2j+1)I1(2j+1)I0(2j+1)$, as long as the estimates e'(i) are correct. When there are occasional errors, they do not create catastrophic error propagation, because $H^T$ is feedback-free.

Referring again to FIG. 26, the remaining information bits are recovered by an inverse bit converter 286 and a coding differential decoder 288 which operates according to the relation: $I2'(2j)I1'(2j)=ID2(2j)ID1'(2j) -_4 ID2'(2j-2)ID1'(2j-2)$ where $-_4$ is a modulo 4 subtraction. Referring to FIG. 25, the I-bits are then descrambled in a descrambler 285 and delivered to the DTE.

Differential Coding for Shaping

Suppose the channel introduces a phase rotation of 90k degrees, k=1, 2, or 3. The translation of the error point into quadrant-1 is then rotated around the point ($\frac{1}{2}$, $\frac{1}{2}$) by the same amount. Since the Wei code is transparent to 90k degree phase rotations, the mapping used in the transmitter guarantees that the Z-bits can be correctly recovered. Unfortunately, this is not true for the quadrant labels SQ1SQ0.

To remedy this situation, the label sequence SQ1SQ0 can be generated according to the phase-invariant labeling shown in FIG. 28. In order to guarantee that the relationship $SQ1SQ0=S1S0+_2B1B0$ still holds, a differential encoding operation is necessary. This is done as follows: Referring to FIG. 29, for each signal point obtained through quadrant-1 mapping 258, we extract its subquadrant label SQ1SQ0 with a subquadrant extractor 306 according to FIG. 30. A shaping differential encoder 308 and a map into offsets 310 use the bits SQ1SQ0 and S1S0 to offset the quadrant-1 point into two new points r0(i) and r1(i), where i=2j or i=2j+1 such that they remain in the same coset of $Z^2$. This mapping can be described by the following two tables:

| SQ0 | SQ1 | S0 | S1 | D00 | D01 | D10 | D11 |
|-----|-----|----|----|-----|-----|-----|-----|
| 0 | 0 | 0 | 0 | 0 | 0 | 1 | 1 |
| 0 | 0 | 0 | 1 | 1 | 0 | 0 | 1 |
| 0 | 0 | 1 | 0 | 0 | 1 | 1 | 0 |
| 0 | 0 | 1 | 1 | 1 | 1 | 0 | 0 |
| 0 | 1 | 0 | 0 | 0 | 1 | 0 | 1 |
| 0 | 1 | 0 | 1 | 0 | 0 | 0 | 0 |
| 0 | 1 | 1 | 0 | 0 | 1 | 1 | 1 |
| 0 | 1 | 1 | 1 | 1 | 0 | 1 | 0 |
| 1 | 0 | 0 | 0 | 1 | 0 | 1 | 0 |
| 1 | 0 | 0 | 1 | 1 | 1 | 1 | 1 |
| 1 | 0 | 1 | 0 | 0 | 0 | 0 | 0 |
| 1 | 0 | 1 | 1 | 0 | 1 | 0 | 1 |
| 1 | 1 | 0 | 0 | 1 | 1 | 1 | 1 |
| 1 | 1 | 0 | 1 | 0 | 1 | 1 | 1 |
| 1 | 1 | 1 | 0 | 1 | 0 | 1 | 1 |
| 1 | 1 | 1 | 1 | 0 | 0 | 1 | 1 |

| Di0 | Di1 | Δi |
|-----|-----|------|
| 0 | 0 | $0.0 + j0.0$ |
| 0 | 1 | $0.0 - j1.0$ |
| 1 | 0 | $-1.0 + j0.0$ |
| 1 | 1 | $-1.0 - j1.0$ |

In the Viterbi algorithm, the point r0(i) is used for branches corresponding to cosets A and B, whereas r1(i) is used for branches corresponding to cosets C and D. It can be shown that if SQ1SQ0 is the subquadrant label of the received point, then SQ1SQ0=S1S0+$_2$B1B0. Therefore, by passing the subquadrant label (which is rotationally invariant) through the syndrome-former $H^T$ we can recover the bits I0(2j+1), I1(2j+1) and I2(2j+1), even in the presence of 90k degrees phase offset.

Bounds on shape gain of trellis constellations

As discussed earlier, the constituent 2D constellation $C_2$ of the final constellation $C_{fin}$ of a trellis constellation based on a trellis code $C(\Lambda/\Lambda'; C)$ satisfies the following constraints (where we assume that $Z^2$ is the constituent 2D lattice of $\Lambda$, and $R^\mu Z^2$ is the constituent 2D sublattice of $\Lambda'$, where $\mu$ is the depth of the partition $\Lambda/\Lambda'$):

1. The points of $C_2$ are drawn from a translate of a superlattice $R^{-m-\mu}Z^2$ of $Z^2$;

2. Each of the $2^{m+\mu}$ cosets of $Z^2$ in $R^{-m-\mu}$ has equal probability $2^{-m-\mu}$; that is, the sums of the probabilities of the points in the $2^\mu$ cosets of $R^\mu Z^2$ whose unions are each one of these cosets are equal;

3. The points of $C_2$ are bounded within the Voronoi region of $R^\mu Z^2$ (a square of area $2^\mu$).

FIG. 16 shows the maximum shape gain $\gamma_s$ (in dB) as a function of the normalized informativity $\kappa$, for $\mu=1$, 2, 3, and 4, and also for unlimited $\mu$ ($\mu=\infty$). Since $CER_s = 2^\kappa$, this curve also gives a bound on shape gain versus shaping constellation expansion ratio for trellis constellations, for various $\mu$. All curves start out (from $\kappa=0$) along the $\mu=\infty$ curve, but then diverge as the Voronoi constraints take effect. However, even for $\mu=2$, shape gains as large as 1.44 dB are in principle obtainable. (The curves are obtained by simulations with 16×16 final 2D constellations, so that the values are approximate, and the upper ends of the curves are truncated due to boundary effects.)

For $\kappa=0.5$ bits per two dimensions, where the shaping constellation expansion ratio is $CER_s=2^{\frac{1}{2}}\approx 1.4$, the maximum attainable shape gain is 1.35 dB, within 0.2 dB of the ultimate limit, and this may be achieved with a depth $\mu$ of 2. For $\kappa=0.25$ bits per two dimensions, where the constellation expansion ratio is $2^{\frac{1}{4}}\approx 1.2$, the maximum attainable shape gain is 1.12 dB, also attainable with $\mu=2$.

These curves suggest that it is not a serious restriction to consider only linear, and thus depth-2, trellis codes for shaping. They further suggest that a value of as low as $\kappa=\frac{1}{2}$ for normalized informativity, such as in the dual Wei 4D codes, may not seriously compromise performance. Indeed, a shape gain of 1.10 dB is obtained asymptotically with the 16-state dual Wei 4D code, which is within 0.25 dB of the upper bound on shape gain for this $\kappa$. The bound suggests that we could go to even smaller $\kappa$ and thus constellation expansion ratio $2^\kappa$; even for $\kappa=\frac{1}{4}$, we might be able to achieve of the order of 1 dB in shape gain.

Extension to Nonlinear Trellis Codes Using the Time Zero Lattice

While the previous section shows that linear (mod-2) trellis codes can achieve most of the shape gain possible, we shall now sketch briefly one method for extending the methods of this specification to nonlinear trellis codes C.

For known practical nonlinear trellis codes C, there is still an associated time zero lattice such that for any state $s_j$ of the encoder, the set of possible next signal points is a coset $\Lambda_0 + a(s_j)$ of the time-zero lattice $\Lambda_0$ of C.

A simple fundamental region of C may then again be specified by a hard-decision decoder for C that is based on any fundamental region $R_0$ of the time-zero lattice $\Lambda_0$ of C. Given the state $s_j$ at time j and any $r_j$ in $R^N$, this decoder finds the unique code symbol $c_j$ in $\Lambda_0+a(s_j)$ such that $r_j=c_j+e_j$, where $e_j$ is an element of $R_0$. The next state $s_{j+1}$ is then determined by $c_j$. Thus this hard-decision decoder decomposes any sequence r in sequence space $(R^N)^\infty$ into a sum $r=c+e$, where c is in C and e is in $(R_0)^\infty$.

We therefore say that $(R_0)^\infty$ is a simple fundamental region of the code C. The whole of sequence space $(R^N)^\infty$ is covered by the nonoverlapping translates $(R_0)^\infty +c$, where c ranges through all code sequences in C.

Consequently we may define the congruence class [e] as the set of all r in sequence space $(R^N)^\infty$ that are mapped to e by the above decoder, where e is any sequence in the simple fundamental region $(R_0)^\infty$. This is an appropriate generalization of the idea of a coset or translate C+e of a linear trellis code C, although the congruence classes do not in general form an algebraic group if C is nonlinear.

The general implementation of a trellis shaping system as shown in FIG. 4 et seq. follows as before. The data sequence is first mapped into an initial sequence i (r in FIG. 4) that lies in the simple fundamental region $(R_0)^\infty$. A decoder for C then finds a code sequence c in C such that the difference sequence $x=i-c$(e in FIG. 3) has an average power less than or equal to that of the initial sequence i. The difference sequence is transmitted. Note that x is in the congruence class [i]. Therefore the initial sequence i can be recovered from the transmitted sequence x by using the hard-decision decoder for C based on the fundamental region $R_0$ of the time-zero lattice of C that was first described above.

In general, we may define a fundamental region of a trellis code C as any region that contains one and only one sequence from each congruence class [e], for each e in $(R_0)^\infty$. In the implementation of the previous paragraph, the set of possible transmitted sequences x lies within such a fundamental region of C, because any decoder for C maps the initial sequence i (which is a sequence in $(R_0)^\infty$) into a transmitted sequence x in the congruence class [i]. A minimum-distance decoder for C would map i into the sequence x of least average power in the congruence class [i]. The set of such sequences x for all i in $(R_0)^\infty$ may be defined as the Voronoi region of the code C.

Hexagonal 2D Constellations

If we choose the shaping trellis code $C(\Lambda/\Lambda';C)$ as a code based on a partition $\Lambda/\Lambda'$ of so-called ternary or quaternary lattices whose constituent 2D lattice and sublattice $\Lambda_2$ and $\Lambda_2'$ are versions of the hexagonal 2D lattice $A_2$, then the final constellation $C_{fin}$ is bounded within a region $R_V(\Lambda_2')$ which is hexagonal rather than square. Such a constellation has the advantage of being more nearly spherical.

Trellis shaping on regions

Additional gain over the scheme of FIG. 12 can be achieved by organizing the signal point constellation into arbitrarily shaped regions. As above, we use a trellis code $C(\Lambda_c/\Lambda_c';C_c)$ for coding. For shaping, we use a rate-$k_s/(k_s+r_s)$ binary convolutional code $C_s$, whose code sequences y have symbols $y_k$ from a label alphabet $Y=F^{k_s+r_s}$ whose elements are the $2^{k_s+r_s}$ binary $(k_s+r_s)$-tuples.

We shall also define a set of $|Y|$ regions $\{R_s(y), y\epsilon Y\}$, whose labels are drawn from the label alphabet Y, where $|Y|$ is the size of the label alphabet. The label alphabet is an additive group under some addition operation, e.g., mod-2 addition of binary $k_s+r_s$-tuples. Each region $R_s(y)$ is arranged to contain the same number (say $2^n$) of points from each of the $|\Lambda_c/\Lambda_c'|$ cosets of $\Lambda_c'$ that are used in the code $C_c$.

Calderbank and Ozarow, "Non-equiprobable signalling on the Gaussian channel," to appear in the IEEE Transactions on Information Theory, suggest using regions $R_s(y)$ which are bounded by scaled versions of a single basic boundary shape—e.g., a circle—in order to minimize peak to-average power ratio. This is indicated schematically in FIG. 32a. Such regions may be constructed in a greedy fashion by taking the lowest-energy $2^n$ points from each of the cosets of $\Lambda_c'$ as the innermost region, the next-lowest-energy $2^n$ points from each coset as the next region, and so forth, as shown for a 256-point signal constellation in FIG. 32(b), where each unit square stands for one point in the half-integer grid $Z^2+(\frac{1}{2}, \frac{1}{2})$.

Each point 520 is labelled by an eight-bit, three-part label $(z_1, z_2, z_3)$, as follows:

(a) two bits $z_1$ designate one of the four regions (521, 523, 525, 527) $R_s(z_1)$.

(b) two bits $z_3$ designate one of the four cosets A, B, C, D of $2Z^2$ whose union is the half-integer grid $Z^2+(\frac{1}{2}, \frac{1}{2})$. In a coded system, an encoder for a depth-2 code $C_c$ (such as the 4-state 2D Ungerboeck code, or the 4D or 8D Wei codes) would select a sequence $z_3=\{z_{3j}\}$ and thus a sequence of cosets according to the code $C_c$.

(c) four bits $z_2$ designate one of the 16 points in the region designated by $z_1$ and the coset designated by $z_3$. These bits must be selected so that the group of four signal points obtained by rotating a given signal point by 0°, 90°, 180°, and 270° all have the same labels ($z_1$, $z_2$), while $z_3$ takes on all four possible values (as it automatically will in a 4-way partition of the half-integer grid). In preferred embodiments, the labels are ordered from least to greatest energy in regions 521 and 525, and in reverse order in regions 523 and 527.

Let $S=\{z_1\}$ be any set of allowed label sequences $z_1=\{z_{1j}\}$ that can be determined by $r_s$ bits per symbol interval. The set of label sequences may be fixed a priori or may depend on other inputs. A good choice for S is the set of coset leaders (minimum weight sequences) of the cosets $C_{s+2} t(s)$ of the convolutional code $C_s$. These may be determined by passing a sequence s of syndrome $r_s$-tuples $s_j$ through a coset representative generator circuit $(H_s^{-1})^T$, as in FIG. 12, to produce a coset representative sequence $t(s)=s(H_s^{-1})^T$; the coset leader $z_1$ of $C_{s+2} t(s)$ may then be determined by a minimum-weight decoder for $C_s$. In this decoder we may use any weights we like for the labels $z_{1j} \epsilon Y$.

Embodiment of Trellis Shaping on Regions

Referring to FIG. 31, trellis shaping on regions then works as follows. A sequence of binary $k_c$-tuples 502 is encoded in an encoder $G_c$ for $C_c$, and the resulting $(k_c+r_c)$-tuples 504 specify a sequence of cosets of $\Lambda_c'$. A second sequence of binary $r_s$-tuples s 508 is passed through a coset representative generator circuit $(H_s^{-1})^T$ to produce a coset representative sequence $t(s)=s(H_s^{-1})^T$. A minimum-weight decoder 509 for $C_s$ then determines the minimum-weight label sequence $z_1=y+_2 t(s), y \epsilon C_s$. In the process of decoding, the weight of a trellis branch labelled by $z_{1j}$ may depend only on $z_{1j}$, or it may also be allowed to depend on the other inputs ($z_{2j}$, $z_{3j}$). The selected label sequence z determines a sequence of regions $R_s(z_1)=\{R_s(z_{1j})\}$. Finally, a further sequence of binary n-tuples 510 selects a sequence e of individual signal points $e_j$ from the $2^n$ points in each selected coset of $\Lambda_c'$ in each region $R_s(z_{1j})$. Thus a total of $k_c+n+r_s$ bits are sent in each symbol interval.

At the receiver, a decoder 512 for $C_c$ can produce an estimate e', as in FIG. 11, and each term $e_j'$ can be decomposed into a label $z_{1j}'$ indicating the region in which it lies, $k_c+r_c$ bits indicating which coset of $\Lambda_c'$ it is in, and n bits indicating which of the $2^n$ points in this region and coset it is. If we use a feedbackfree right inverse 513 $G_c^{-1}$ and syndrome former 514 $H_s^T$, then error propagation is limited.

Weighting

The weight of each label $z_{1j}$ should be chosen to have some relation to the average power associated with the region $R_s(z_{1j})$, so that the selection of the sequence of regions $R_s(z_1)$ leads to a transmitted sequence e with low average power. If the selection of $z_1$ is made independently of other inputs, then a good choice for the weight of $z_{1j}$ is the average energy of the points in the region $R_s(z_{1j})$.

However, it is better to make a selection that is dependent on the other inputs, for then we know exactly which point $e_j$ in $R_s(z_{1j})$ will be selected if $z_{1j}$ is the selected label. In this case a good choice for the weight of $z_{1j}$ is $\|e_j\|^2$. Then a minimum-distance decoder for $C_s$ will choose the transmitted sequence e of least average power $\|e\|^2$, subject to the constraints imposed by the entire sequence of input $(k_c+n+r_s)$-tuples.

Selection of shaping bits—embodiment for a rate -$\frac{1}{2}$ code $C_s$

If, for example, the shaping code $C_s$ is the 4-state rate-$\frac{1}{2}$ convolutional code with generator matrix $G_s = [1+D^2, 1+D+D^2]$, then the minimal syndrome-former for this code is $H_s^T = [1+D+D^2, 1+D^2]$, and we may take $(H_s^{-1})^T$ as $[1/(1+D+D^2), 0]$. The syndrome sequence s of FIG. 31 is then put into a coset representative generator circuit 511 represented by the 1×2 transfer function matrix $(H_s^{-1})^T$ to produce a coset representative sequence $t = s(H_s^{-1})^T$, whose terms are binary 2-tuples $t_j$.

Under one alternative shaping method, illustrated in FIG. 33, the coset representative sequence t is then decoded by a minimum-weight Viterbi decoder 509 for the code $C_s$, where a branch in the trellis for $C_s$ that is labelled by the code 2-tuple $y_j$ is given a weight equal to the average energy of the region $R_s(y_j + 2t_j)$; if that branch is chosen, then the shaping bits are $z_{1j} = y_j + 2t_j$. Thus the minimum-weight decoder 509 finds the sequence $z_1 = y + 2t$ in the coset $C_s + 2t$ which leads to a sequence of regions $R_s(z_1)$ of minimum average energy, independent of the remaining label bits $(z_2, z_3)$. The sequence actually sent is the sequence e of signal points $e_j$ whose labels are $(z_1, z_2, z_3) = \{(z_{1j}, z_{2j}, z_{3j})\}$.

Under a second shaping method, illustrated in FIG. 34, the weight of a branch labelled by $y_j$ in the trellis for $C_s$ is made equal to the energy $\|e_j\|^2$ of the signal point $e_j$ whose label is $(y_j + 2t_j, z_{2j}, z_{3j})$, where $(z_{2j}, z_{3j})$ are the remaining labels for that symbol interval. If that branch is chosen, $e_j$ is sent. Thus this minimum-weight decoder 509 finds the sequence e of minimum average power that is designated by a label sequence of the form $(y + 2t, z_2, z_3)$ for some $y \in C_s$.

At the receiver, in either case, we first decode $e + n$ into an estimated sequence $e'$, and then decompose it into its constituent labels $(z_1', z_2', z_3')$. The estimated syndrome sequence $s' = z_1' H_s^T$ is obtained by passing $z_1'$ through a feedbackfree syndrome former circuit specified by the 2×1 transfer function matrix $H_s^T$ 514, as illustrated in FIG. 35.

Performance of Preferred Embodiment

Figure 32B:
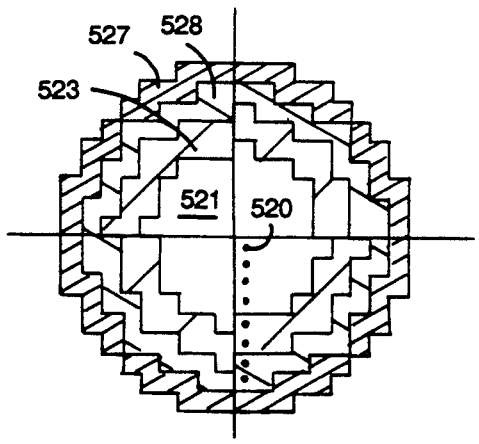

The method of trellis shaping on regions has been simulated with the 4-state binary convolutional code that generates the 4-state 2D Ungerboeck code, and with the 256-point quasicircular constellation divided into four rotationally invariant regions as in FIG. 32(b) where the regions are labelled $z_1 = 00, 01, 10$, and 11 from inner to outer.

It was found that with the optimum method, where the weight of a branch is equal to the energy $\|e_j\|^2$ of the signal point $e_j$ that would actually be sent if that branch were chosen, the labelling $(z_1, z_2, z_3)$ does affect performance (shape gain). The preferred labelling seems to be to use labels $z_2$ in increasing order of energy in the inner region 00 and the third region 10, and in decreasing order in the other two regions.

There is also a slight difference in performance if we interchange the two coded output bits (or equivalently interchange the region labels 01 and 10); so we choose the better ordering. With this embodiment, simulations show that a shape gain of 1.03 dB can be obtained—i.e., slightly greater than with the 4-state shaping code described earlier. The constellation expansion ratio is again 2. However, because the constellation is nearly circular rather than square, the peak-to-average power ratio is only about ¾ as large.

A further experiment has established that the constellation expansion and PAR can be further significantly reduced with very little effect on performance. The shaper was forbidden to use the outermost region 11.

Therefore the CER was reduced from 2 to 1.5, close to the value obtained with a 4D shaping code, and the PAR was similarly reduced. The shape gain was only slightly degraded, to 1.00 dB.

Correspondence of Methods

In fact, we can now see that the earlier encoders (e.g. FIGS. 8, 10, 12) may be regarded as encoders for trellis shaping on regions. If the shaping code is $C_s(\Lambda_s/\Lambda_s'; C_s)$, with $\Lambda_s$ a sublattice of $\Lambda_c'$ of order $|\Lambda_c'/\Lambda_s| = 2^n$, then any fundamental region of $\Lambda_s$ contains exactly $2^n$ points from any coset of $\Lambda_c'$. The Voronoi region $R_V(\Lambda_s')$ of $\Lambda_s'$ is the closure of a fundamental region $R_V(\Lambda_s')$ of $\Lambda_s'$, which is the union of $|\Lambda_s/\Lambda_s'|$ fundamental regions of $\Lambda_s$, namely the regions $R_s(y)$ consisting of the points in $R_V(\Lambda_s')$ labelled by y for all $y \in Y$.

For example, if $\Lambda_s = Z^2$ and $\Lambda_s' = 2Z^2$, then $R_V(2Z^2)$ is a square of side 2 centered on the origin (the outer boundary of FIG. 37). The system of FIGS. 10 or 12 selects a point from the coset $2Z^2 + f_j + t_j$ that lies in this region, where $t_j$ is the label 2-tuple and $Z^2 + f_j$ is the coset of $Z^2$ that is chosen by the upper sections. Thus the label 2-tuple selects the most significant bit of each coordinate (if $0 \leq f_j < 1$), and the regions $R_s(y)$ are the four quadrants of $R_V(2Z^2)$, as shown in FIG. 37.

Differential Coding for Trellis Shaping on Regions

It is desirable to partition $R_V(\Lambda_s')$ into $|\Lambda_s/\Lambda_s'|$ fundamental regions of $\Lambda_s$ that are invariant under a class of phase rotations, such as rotations by multiples of 90°. Then the bits $z_{1j}$ that specify the region can be recovered correctly even in the presence of such phase rotations. For example, FIGS. 28 and 38 show partitions of $R_V(2Z^2)$ into four fundamental regions of Z which have such rotational invariance.

Alternative Extension to Pseudo-Linear (Non-Linear Mod 4) Codes

We now consider nonlinear trellis codes that are based on isometric labellings, which we call pseudolinear codes. All known good mod-4 trellis codes, including all Ungerboeck codes other than the 4-state 2D Ungerboeck code, and most of the Calderbank-Sloane codes, are pseudolinear.

To define a pseudolinear code $C(\Lambda/\Lambda'; C)$, we use a convolutional code C whose sequences y have symbols $y_j$ chosen from a label alphabet Y of size $|\Lambda/\Lambda'|$ which is an additive group under some addition operation $+_2$—e.g., if $Y = F^{k+r}$, then $+_2$ denotes mod-2 addition of binary $(k+r)$-tuples. We also use an isometric labelling function b(y), defined as a map from Y to a set of $"\Lambda/\Lambda'|$ cosets $\{\Lambda' + b(y), y \in Y\}$ such that for every $z \in Y$ there exists an isometric transformation $U_z$ of $R^N$ such that $$\Lambda' + b(y +_2 z) = U_z[\Lambda' + b(y)].$$

(An isometric transformation $U_z$ is a transformation of real N-space $R^N$ that preserves distances—i.e., a combination of translations, rotations, and reflections.)

Let $t \in Y^\infty$ be any sequence of labels. We define the label translate $C(\Lambda/\Lambda'; C + 2t)$ of the trellis code $C(\Lambda/\Lambda'; C)$ as the union of the cosets $(\Lambda')^\infty + b(y +_2 t)$ for all $y \in C$. Since the labelling is isometric, $$\begin{aligned} C(\Lambda/\Lambda'; C +_2 t) &= U_{y \in C}[(\Lambda')^\infty + b(y +_2 t)] \\ &= U_{y \in C} U_t[(\Lambda')^\infty + b(y)] \\ &= U_t\{U_{y \in C}[(\Lambda')^\infty + b(y)]\} \end{aligned}$$

-continued
$$= U_t[C(\Lambda/\Lambda';C)].$$

where $U_t$ is the isometric transformation which is the composition of the transformations $\{U_{tj}\}$. Consequently any label translate of a code C has all of the same geometric properties as C; in particular, its Voronoi regions have the same shape as those of C. Therefore the shape gain of any label translate $C(\Lambda/\Lambda';C+2t)$ of C will be the same as that of C.

Any ordinary translate $C(\Lambda/\Lambda';C+2t)+a$ of a label translate $C(\Lambda/\Lambda';C+2t)$ clearly has the same geometrical invariance properties. If C is a linear code, then a label translate reduces to an ordinary translate of C.

A label translate $C(\Lambda/\Lambda';C+2t)$ is a function only of the coset $C+2t$ of the code C, which is most concisely specified by the syndrome sequence $s=tH^T$, where $H^T$ is a syndrome former for C.

We now show how label translates can be used in trellis shaping. The method basically is the same as that shown in FIG. 12, with the following modifications, shown in FIG. 36.

Instead of a linear code $C_s(\Lambda_s/\Lambda_s';C_s)$, we use a pseudolinear code $C_s(\Lambda_s/\Lambda_s':C_s)$ for shaping, where $C_s$ is a binary rate-$k_s/(k_s+r_s)$ convolutional code. As in FIG. 12, the two top encoder sections 601, 603 then select a sequence of cosets $\Lambda_s+d_j$ of $\Lambda_s$, which we denote as $(\Lambda_s)^\infty+d$, and a coset representative generator circuit $(H_s^{-1})^T$ 605 for $C_s$ generates a coset representative sequence $t(s)=s(H_s^{-1})^T$ 607 from a sequence s of syndrome $r_s$-tuples $s_j$.

The bottom (shaping) section then has the function of finding the sequence e of minimum average power in the translate $C_s(\Lambda_s/\Lambda_s':C_s+2t(s))+d$ of the label translate $C_s(\Lambda_s/\Lambda_s':C_s+2t(s))$ of $C_s$. This may be done by a Viterbi algorithm search 609 through a trellis which is the same as the trellis of the binary code $C_s$, except that a branch corresponding to a binary $(k_s+r_s)$-tuple $y_j$ is taken to represent the coset $\Lambda_s'+b(y_j+2t_j)+d_j$, and to have weight equal to the norm $\|e_j\|^2$ of a minimum norm element $e_j$ of this coset. The Viterbi algorithm determines the minimum-weight path through this trellis using these weights, which corresponds to a label sequence $z=y+2\,t(s)$, and the corresponding sequence $e=\{e_j\}$ 611 is the minimum-norm sequence in $C_s(\Lambda_s/\Lambda_s':C_s+2t(s))+d$. The sequence e is then transmitted, as shown in FIG. 36.

At the receiver, a decoder 613 for $C_c$ operates as in FIG. 12 to determine an estimate $e'$ of e then because the elements of $C_s(\Lambda_s/\Lambda_s'C_s+2\,t(s))$ are still elements of $(\Lambda_s)^\infty$, i.e., sequences of elements of $\Lambda_s$, the sequence d can be determined by taking residues $d_j'$ of $e_j'$ modulo $\Lambda_s$. The label sequence $z'$ is then determined by taking residues of $e_j'-d_j'$ modulo $\Lambda_s'$; i.e., by determining the sequence of cosets $(\Lambda_s')^\infty+b[z']$ in which $e'-d'$ lies. The label sequence $z'$ may then be passed through a syndrome-former $H_s^T$ 615 for $C_s$ to produce the syndrome sequence $s'=z'H^T$. If $e'=e$, then $z'=z=y+2t(s)$ and $s'=s$, and if $H^T$ is chosen to be feedbackfree, then error propagation is limited.

FIG. 36 reduces to FIG. 12 if $C_s=C_s(Z^N/2Z^N;C_s)$ and the labelling function is $b(y_j)=y_j$.

In summary, this variant of trellis shaping produces constellations in which the map from input bits to the transmitted sequence e is invertible with bounded error propagation, whose shaping complexity is that of a minimum-distance decoder for $C_s$, and which achieves the shape gain of the Voronoi region $R_V(C_s)$ of $C_s$.

Other embodiments are within the following claims.

We claim:

1. A method of mapping a digital data sequence into a signal point sequence for transmission, said signal point sequence belonging to a set of possible sequences of signal points, comprising receiving said digital data sequence, and selecting said signal point sequence from a subset of all said possible signal point sequences based on said digital data sequence, said subset being characterized in that all said possible signal points sequences in said subset lie in a fundamental region of a trellis code, said fundamental region being other than a simple Cartesian product of finite-dimensional regions.

2. A method of mapping a digital data sequence into a sequence of signal points for transmission, said sequence of signal points belonging to a set of possible sequences of signal points, comprising specifying a class of possible sequences based on said digital data, selecting said signal point sequence from said class, said selection being based on the respective average powers of said possible sequences of said class, said selection being based not only on a fixed-length block of said digital data, but also on other digital data.

3. The method of claim 2 wherein said class corresponds to a set of sequences specified by a finite-state trellis diagram of unbounded length.

4. The method of claim 2 or 3 wherein said selecting comprises applying a search procedure to said class.

5. The method of claim 4 wherein said search procedure comprises a Viterbi algorithm type search.

6. The method of claim 2 wherein the set of all possible sequences that could be selected from said class lies within a fundamental region of a trellis code, said fundamental region being other than a simple Cartesian product of finite-dimensional regions.

7. The method of claim 3 wherein there is a set of possible sequences which may be selected from said class and the set of all said possible sequences that could be selected from said class lies within a fundamental region of a trellis code, said fundamental region being other than a simple Cartesina product of finite-dimensional regions.

8. The method of claim 1 or 2 wherein said possible signal point sequences are code sequences from a translate of a code of the trellis or lattice type.

9. The method of claim 1, 6 or 7 wherein said fundamental region comprises approximately a Voronoi region of said trellis code.

10. The method of claim 1, 6 or 7 wherein said fundamental region comprises the set of said possible signal point sequences that are decoded to the zero sequence in said trellis code by a decoder for said code.

11. The method of claim 10 wherein said fundamental region comprises the set of said possible signal point sequences that are decoded to the zero sequence in said trellis code by an approximation to a minimum distance decoder for said code.

12. The method of claim 10 wherein said fundamental region comprises the set of said possible signal point sequences that are decoded to the zero sequence in said trellis code by a minimum distance decoder with delay M, wherein M is greater than or equal to 1.

13. The method of claim 10 wherein said fundamental region comprises the set of said possible signal point sequences that are decoded to a common error region by a fair, exhaustive decoder for said trellis code.

14. The method of claim 1 wherein said selecting comprises
mapping said digital data sequence into an initial signal point sequence belonging to and representing a congruence class of said trellis code, and
choosing a signal point sequence belonging to said congruence class and which has no greater average power than said initial signal point sequence.

15. The method of claim 14 wherein said mapping comprises mapping said digital data sequence into a sequence of signal points belonging to an initial constellation comprising points lying within a fundamental region of a time-zero lattice of said trellis code.

16. The method of claim 1 or 2 wherein said mapping includes applying a portion of the elements of said digital data sequence to a coset representative generator for forming a larger number of digital elements representing a coset representative sequence.

17. The method of claim 15 wherein said coset representative generator comprises a multiplication of a portion of the elements of said digital data sequence by a coset representative generator matrix $(H^{-1})^T$ which is inverse to a syndrome-former matrix $H^T$ for said code.

18. The method of claim 17 further comprising recovering the digital data sequence from a possibly noise-corrupted version of the signal point sequence, including decoding the signal point sequence to a sequence of estimated digital elements and forming a syndrome of fewer digital elements based on a portion of the estimated digital elements using a feedback-free syndrome former $H^T$.

19. A method of mapping a digital data sequence into a sequence of signal points to be sent, comprising
determining a class of possible sequences from which to select said sequence to be sent, based at least on digital data appearing in said digital data sequence up to a time j, and
for every time j, selecting said sequence to be sent from said class of possible sequences based on digital data appearing in said sequence after time j.

20. The method of claim 19 in which
the digital data sequence comprises a succession of data elements, and
the step of determining the class of possible sequences comprises mapping of each element into a point in an initial constellation.

21. The method of claim 19 or 20 in which the sequence of said points in said initial constellation into which said succession of data elements are mapped comprise a representative sequence of said class of possible sequences.

22. The method of claim 20 in which said mapping of each element of said succession of elements is done independently of said mapping of any other element of said succession of elements.

23. The method of claim 20 in which each element is a binary value and said initial constellation comprises $2^b$ points, where b is the number of bits in each said element of said sequence.

24. The method of claim 20 in which said initial constellation comprises a portion of a lattice or a translate of said lattice.

25. The method of claim 24 in which said portion comprises a fundamental region of a sublattice of said lattice.

26. The method of claim 25 in which said sublattice is a time-zero lattice of a trellis code.

27. The method of claim 20 in which the step of selecting said sequence to be sent comprises a decoding of a said sequence of points in said initial constellation by a decoder for a trellis code.

28. The method of claim 22 in which said possible sequence in said class lie in a fundamental region of said trellis code, said fundamental region comprises a common error region of said decoder, and said decoding comprises decoding said sequence of points in said initial constellation to error sequences within said common error region.

29. The method of claim 28 in which the sequences within said common error region comprise signal points that comprise a final constellation with more points than said initial constellation.

30. The method of claim 27 in which said representative points are decoded by a minimum-distance decoder for said code.

31. The method of claim 30 wherein said minimum-distance decoder has decoding delay M and $M \geq 1$.

32. A method of recovering a digital data sequence from a received sequence consisting of the sequence of signal points chosen to be sent in accordance with the method of claim 15 or 20, comprising
decoding the sequence of sent signal points to recover the sequence of points of the initial constellation, and
inverse mapping the sequence of points of the initial constellation to recover the digital data sequence.

33. The method of claim 32 in which decoding the sequence of sent signal points is done at time j based on said sent points only up to time j.

34. The method of claim 1, 6, 7, 26, or 27 wherein said trellis code is a linear trellis code.

35. The method of claim 1, 6, 7, 26, or 27 wherein said trellis code is a non-linear trellis code.

36. The method of claim 34 wherein said linear trellis code is a 4-state Ungerboeck code.

37. The method of claim 34 wherein said linear trellis code is a dual Wei code.

38. The method of claim 1, 6, 7, 26, or 27 wherein said trellis code is based on a partition of binary lattices.

39. The method of claim 1, 6, 7, 26, or 27 wherein said trellis code is based on a partition of ternary or quaternary lattices.

40. The method of claim 2 wherein each signal point in said sequence is selected from an N-dimensional constellation divided into regions containing predetermined possible signal points, the regions to which successive signal points in said sequence belong being determined in a manner tending to minimize the energy required to transmit the signal points.

41. A method of mapping a digital data sequence into a sequence of signal points for transmission, comprising
specifying a class of possible sequences based on said digital data,
selecting said signal point sequence from said class, said selection being based on the respective average powers of said possible sequences of said class,
each signal point in said sequence being selected from an N-dimensional constellation divided into regions containing predetermined possible signal points, the regions to which successive signal points in said sequence belong being determined in a manner tending to minimize the energy required to transmit the signal points, some said regions being other than fundamental regions of a lattice.

42. The method of claim 40 or 41 wherein at least some of said regions have different average powers.

43. The method of claim 42 wherein said regions are N-dimensional and are bounded approximately by N-spheres centered on the origin of the constellation.

44. The method of claim 43 wherein $N=2$ and there are four said regions.

45. The method of claim 40 or 41 wherein said constellation comprises a two-dimensional constellation of signal points lying on the half-integer grid $Z^2+(\frac{1}{2},\frac{1}{2})$.

46. The method of claim 40 or 41 wherein said regions are organized so that rotation of a signal point by 0, 90, 180, or 270 degrees produces another signal point in the same region.

47. The method of claim 40 or 41 wherein said regions have equal numbers of signal points.

48. The method of claim 40 or 41 further comprising determining the regions from which successive signal points in said signal point sequence are drawn based upon the average energies of signal points in said regions.

49. The method of claim 40 further comprising determining the regions from which successive signal points in said signal point sequence are drawn by decoding a sequence of values derived from said digital data sequence using a decoder for a convolutional code.

50. The method of claim 40 or 41 wherein each said region includes signal points belonging to different cosets of a lattice and each region has an equal number of signal points belonging to each respective said coset.

51. The method of claim 40 wherein said selection of said regions is based on a coset representative sequence generated by a coset representation generator in accordance with a convolutional code.

52. The method of claim 49 in which said decoding is by a minimum weight decoding technique.

53. The method of claim 52 wherein the decoding technique comprises assigning to a branch in a trellis corresponding to the code a weight equal to the average energy of the region of signal points corresponding to that branch of the trellis.

54. The method of claim 52 wherein the decoding technique comprises assigning to a branch in a trellis corresponding to the code a weight corresponding to the energy of a particular signal point within the region corresponding to that branch of the trellis.

55. The method of claim 50 wherein said coset representative generator effects a multiplication of a portion of the elements of said digital data sequence by a coset representative generator matrix $(H^{-1})^T$ which is inverse to a syndrome former matrix $H^T$ for said code.

56. The method of claim 45 further comprising recovering the digital data sequence from a possibly noise-corrupted version of the signal point sequence, including decoding the signal point sequence to a sequence of estimated digital elements and forming a syndrome of fewer digital elements based on a portion of the estimated digital elements using a feedback-free syndrome former $H^T$.

57. The method of claim 49 or 51 wherein said convolutional code is a 4-state Ungerboeck code.

58. The method of claims 1, 6, 7, 26, 27 in which said trellis code is a pseudo-linear trellis code.

59. The method of claim 1, 2, or 19 wherein the step of selecting said signal point sequence is further constrained so as to reduce the peak power of said signal point sequence where said peak power represents the maximum energy of said signal point sequence in some number of dimensions N.

60. The method of claim 59 wherein $N=2$.

61. The method of claim 59 wherein $N=4$.

62. The method of claim 59 wherein the signal points in said sequence belong to a 2D constellation and the step of selecting said signal point sequence is constrained so that the signal points in said sequence will usually be within some radius $R_c$ of the origin of said 2D constellation.

63. The method of claim 14 wherein the step of choosing a signal point sequence belonging to said congruence class is further constrained so as to reduce the peak power of said signal point sequence where said peak power represents the maximum energy of said signal point sequence in some number of dimensions N.

64. The method of claim 63 wherein $N=2$.

65. The method of claim 63 wherein $N=4$.

66. The method of claim 14 wherein the step of choosing a signal point sequence belonging to said congruence class comprises decoding said initial signal point sequence into a final signal point sequence comprising signal points belonging to a 2D constellation, said decoding being constrained so that only final signal point sequences whose signal points usually have magnitudes no greater than some predetermined radius $R_c$ from the origin of said constellation are used.

67. The method of claim 14 wherein the step of choosing a signal point sequence belonging to said congruence class comprises decoding said initial signal point sequence into a code sequence using a Viterbi algorithm, and in each recursion of the Viterbi algorithm, effecting an operation that will assure that said code sequence is an allowable sequence in said second code.

68. The method of claim 67 wherein said operation comprises adjusting the metrics of selected historical paths in the trellis of said Viterbi algorithm, so that none of said selected paths will become the most likely path in the next recursion of the Viterbi algorithm.

69. The method of claim 68 in which said historical paths are chosen based on whether they include particular state transitions at particular locations in the trellis of the Viterbi algorithm.

70. The method of claim 68 in which said operation comprises assigning a large metric to selected historical paths in said trellis.

71. The method of claim 1, 2, or 19, wherein said signal point sequence is selected in a manner to ensure that said digital data sequence can be recovered from a channel-affected version of said signal point sequence which has been subjected to one of a number of predetermined phase rotations.

72. The method of claim 15 wherein said step of mapping said digital data sequence into a sequence of signal points belonging to an initial constellation includes converting said data elements in said data sequence into groups of bits for selecting signal points from said initial constellation, and said groups of bits are arranged to ensure that said bits can be recovered from a channel-affected version of said transmitted sequence which has been subjected to phase rotations of one, two, or three times 90 degrees.

73. A modem for transmitting and receiving digital data sequences via a channel comprising means for mapping a said digital data sequence into a sequence of signal points to be sent, including a sequence selector for selecting said signal point sequence from a subset of all possible signal point sequences based on said digital data sequence, all said possible signal point sequences in said subset lying in a fundamental region of a trellis code, said fundamental region being other than a simple Cartesian product of finite-dimensional regions, a modulator for sending said signal points of said sequence via said channel, a demodulator for receiving a possibly channel-affected version of said signal point sequence from said channel, and means for recovering a digital data sequence from said possibly channel-affected version of said signal point sequence.

74. Apparatus for mapping a digital data sequence into a signal point sequence for transmission, comprising means for receiving said digital data sequence, and a sequence selector for selecting said signal point sequence from a subset of all possible signal point sequences based on said digital data sequence, all said possible signal point sequences in said subset lie in a fundamental region of a trellis code, said fundamental region being other than a simple Cartesian product of finite-dimensional regions.

75. Apparatus for mapping a digital data sequence into a signal point sequence for data transmission, comprising means for specifying a class of possible signal point sequences based on said digital data sequence, and means for selecting said signal point sequence from said class based on the respective average powers of said possible sequences of said class and based on not only a fixed-length block of the digital data.

* * * * *

UNITED STATES PATENT AND TRADEMARK OFFICE
CERTIFICATE OF CORRECTION

PATENT NO. : 5,150,381

DATED : September 22, 1992

INVENTOR(S) : G. David Forney, Jr.

It is certified that error appears in the above-indentified patent and that said Letters Patent is hereby corrected as shown below:

Col. 2, line 47, "finite dimensional" should be --finite-dimensional--;

Col. 10, line 29, "de" should be --code--;

Col. 13, line 51, "$[R_v(A)]$" should be --$[R_v(A')]$--;

Col. 14, line 15, after "Gain" delete --'-- and insert a paragraph;

Col. 17, line 29, delete "C";

Col. 17, line 45, "precoding" should be --'precoding'--;

Col. 17, line 60, after "gain" (first occurrence) insert --which is the--;

Col. 19, line 53, "f" should be --r--;

Col. 20, line 19, "k input" should be --k-input--;

Col. 20, line 19, "finite state" should be --finite-state--;

Col. 20, line 22, "k tuples" should be --k-tuples--;

Col. 21, line 36, after "of" insert --G,--;

Col. 22, line 64, "r by-(k+r)" should be --r-by-(k+r)--;

UNITED STATES PATENT AND TRADEMARK OFFICE
CERTIFICATE OF CORRECTION

PATENT NO. : 5,150,381
DATED : September 22, 1992
INVENTOR(S) : G. David Forney, Jr.

It is certified that error appears in the above-indentified patent and that said Letters Patent is hereby corrected as shown below:

Col. 23, line 17, "time zero" should be --time-zero--;

Col. 25, line 62, "($A_s$)" (second occurrence) should be --($A_s'$)--;

Col. 31, line 28, after "example" insert --.--;

Col. 34, line 24, "time zero" should be --time-zero--;

Col. 35, line 42, "peak to-average" should be --peak-to-average--;

Col. 37, line 64, "3/4" should be --2/3--;

Col. 39, line 51, after "$A_s'$" insert --:--;

Col. 43, claim 55, line 58, "syndrome former" should be --syndrome-former--;

Col. 46, claim 74, line 6, after "all" insert --said--;

Col. 46, claim 74, line 8, "point" should be --points--;

Signed and Sealed this

Thirteenth Day of September, 1994

Attest:

BRUCE LEHMAN

*Attesting Officer*     *Commissioner of Patents and Trademarks*